US012537771B1

(12) United States Patent
Pomeranz et al.

(10) Patent No.: US 12,537,771 B1
(45) Date of Patent: Jan. 27, 2026

(54) IN-NETWORK COMPUTING WITH REDUCTION OPERATION BY SWITCH

(71) Applicant: Habana Labs Ltd., Caesarea (IL)

(72) Inventors: Yanai Pomeranz, Tel Aviv (IL); Itay Zur, Hod Hasharon, IL (US); Shlomo Raikin, Zikhron Yaakov (IL)

(73) Assignee: Intel Overseas Funding Corporation, Chandler, AZ (US)

( * ) Notice: Subject to any disclaimer, the term of this patent is extended or adjusted under 35 U.S.C. 154(b) by 432 days.

(21) Appl. No.: 18/165,533

(22) Filed: Feb. 7, 2023

Related U.S. Application Data

(60) Provisional application No. 63/386,051, filed on Dec. 5, 2022.

(51) Int. Cl.
*H04L 47/129* (2022.01)
*H04L 47/32* (2022.01)
*H04L 47/34* (2022.01)

(52) U.S. Cl.
CPC ............ *H04L 47/129* (2022.05); *H04L 47/32* (2013.01); *H04L 47/34* (2013.01)

(58) Field of Classification Search
CPC ........ H04L 47/129; H04L 47/32; H04L 47/34
See application file for complete search history.

(56) References Cited

U.S. PATENT DOCUMENTS

| 7,002,926 | B1 * | 2/2006 | Eneboe | H04L 49/254 |
| | | | | 370/255 |
| 7,773,616 | B2 * | 8/2010 | Reilly | H04L 49/90 |
| | | | | 370/414 |
| 10,931,588 | B1 * | 2/2021 | Matthews | H04L 45/66 |
| 10,931,602 | B1 * | 2/2021 | Matthews | H04L 49/35 |
| 11,057,318 | B1 * | 7/2021 | Matthews | H04L 49/30 |
| 11,099,902 | B1 * | 8/2021 | Matthews | G06F 9/5027 |
| 11,328,222 | B1 * | 5/2022 | Matthews | H04L 47/32 |
| 2017/0118108 | A1 * | 4/2017 | Avci | H04L 45/36 |
| 2019/0079897 | A1 * | 3/2019 | Kochevar-Cureton | H04L 47/193 |
| 2020/0413422 | A1 * | 12/2020 | Jia | H04W 72/543 |
| 2021/0160318 | A1 * | 5/2021 | Sajeepa | G06F 3/0659 |
| 2021/0194831 | A1 * | 6/2021 | Huang | H04L 49/90 |
| 2021/0314404 | A1 * | 10/2021 | Glek | G06F 3/067 |
| 2022/0060418 | A1 * | 2/2022 | Le | H04L 45/38 |

(Continued)

FOREIGN PATENT DOCUMENTS

| CN | 112153691 B * | 4/2022 | H04W 28/04 |
| WO | WO-2021195988 A1 * | 10/2021 | H04L 47/10 |

*Primary Examiner* — Wutchung Chu
(74) *Attorney, Agent, or Firm* — Akona IP PC

(57) ABSTRACT

A switch can perform reduction operation in a network of compute blocks. The switch receives data packets from some compute blocks and stores the data packets in one or more buffers. In response to receiving by the switch a new data packet, the switch determines whether the buffers have sufficient storage to store another data packet. In embodiments where the buffer does not have sufficient storage, the switch aggregates the data packets in the one or more buffers to form a partially aggregated data packet and transmit the partially aggregated data packet to the next hop. In embodiments where the buffer has sufficient storage to store another data packet, the switch stores the new data packet in the one or more buffers and may aggregate all the data packets to form a fully aggregated data packet. The switch may use a CSN window to control the reduction operation.

23 Claims, 34 Drawing Sheets

(56) References Cited

U.S. PATENT DOCUMENTS

| | | | |
|---|---|---|---|
| 2022/0147804 A1* | 5/2022 | Guan | G06F 5/10 |
| 2022/0255721 A1* | 8/2022 | Ren | G06F 9/30178 |
| 2022/0321499 A1* | 10/2022 | DiFerdinando | H04L 45/66 |
| 2023/0209393 A1* | 6/2023 | Sen | H04W 76/15 |
| | | | 370/329 |
| 2023/0327996 A1* | 10/2023 | Klenk | H04L 47/2441 |
| | | | 370/235 |

\* cited by examiner

IN-NETWORK COMPUTING WITH REDUCTION OPERATION BY SWITCH

CROSS REFERENCE TO RELATED APPLICATION

This application claims the benefit of U.S. Provisional Patent Application No. 63/386,051, filed Dec. 5, 2022, which is incorporated by reference in its entirety.

TECHNICAL FIELD

This disclosure relates generally to in-network computing, and more specifically, in-network computing with reduction operation by switch.

BACKGROUND

In-network computing, also known as in-network computation or NetCompute, refers to the execution of programs on network devices. Examples of network devices include switches, network interface card (NIC), and so on. In-network computing have been applied to various applications. One of the applications is data reduction, where a network device can be used to aggregate data from multiple sources and to reduce the amount of data sent from the network device onward.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
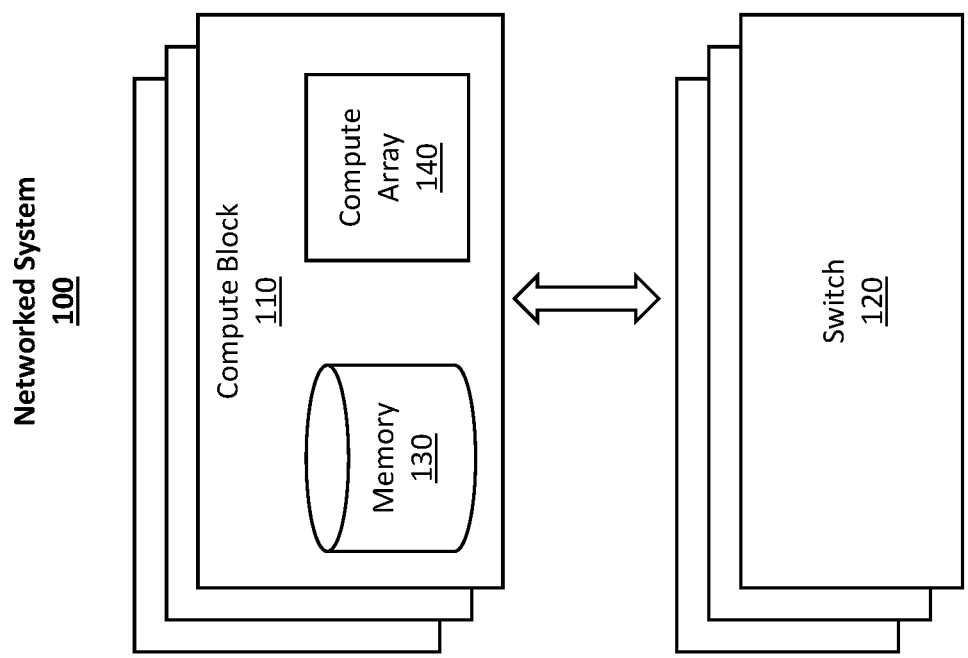
FIG. 1 is a block diagram of a networked system, in accordance with various embodiments.

In-network computing for collective reduction operations is an acceleration done over network entities to low the computation load from endpoints. Reduction operation is an operation performed on data packets (also referred to as "packets"), such as an operation of aggregating (e.g., summing) the elements from two packets and generating a new aggregated packet. The data packets may be received from multiple sources, such as multiple work entities in the networked system. A work entity (also referred to as "worker") can perform computation and generate data packets. A work entity may include one or more processing devices, such as CPU (central processing unit), GPU (graphical processing unit), VPU (versatile processing unit), and so on. With reduction operation, in-network computing can reduce the required bandwidth for transmitting the packets from the work entities to a target entity. The target entity (also referred to as "target") may also include one or more processing devices.

The packet reduction can be done by switches in the networked system. The target will receive the aggregated packet instead of the individual packets generated by the workers. The packet reduction can also reduce the computational load from the target. The target, after receiving the aggregated packet, can perform computation on the aggregated packet. The target can generate a data packet to be provided to other entities in the networked system. The data packet can be aggregated with one or more other data packets and in that case, the target becomes a worker. The computations done by the worker and target may be deep learning operations in a DNN, such as convolutions (also referred to as "convolutional operations"), pooling operations, elementwise operations, other types of deep learning operations, or some combination thereof.

Many currently available reduction operations are done by the target. Each worker can send its data to the target, passing through the switch to be aggregated at the memory of the target. The bandwidth between the switch and the target usually needs to be proportional to all the workers' data. Compared with these technologies, it is more advantageous to have the switch perform the reduction operations. The switch aggregates data packets from different workers and transmits an aggregated data packet to the target. The bandwidth between the switch and the target usually needs to be proportional to a single worker's data. Thus, the bandwidth requirement can be reduced by performing the reduction operations within the switch.

However, currently available solutions for reduction operations by switch requires the switch to allocate buffers for the reduction operations. These solutions suffer from a number of drawbacks. One drawback is inherent latency variance between different workers. The buffers in the switch are allocated for the duration of the reduction flow and therefore, cannot be used for other traffic until the reduction is over.

Another drawback is deadlock. Some topologies can have multiple communications groups. A communication group includes one or more sets of workers that are related to the same tenant. The tenant may be mapped to a user, a group of users, an organization, and so on. Within the same tenant, the workers can be synchronized for various operations. In topologies with multiple communication groups, deadlocks can occur. For instance, a switch's buffers between two communication groups can oversubscribe. In an example, a tree topology includes leaf A, which aggregates for Tenant 1, and leaf B, which aggregates for Tenant 2. Both tenants are connected to both leaf switches. Leaf A receives the packet from Tenant 1 and waits for the second packet to arrive. Leaf B receives the packet from Tenant 2 and waits for the second packet to arrive. When Leaf A and Leaf B are with no free buffers, they cannot pass the packets from the opposite tenants to the switch of the other leaf for aggregation, and deadlock occurs. Another drawback is transport awareness. Some solutions require aggregating packets and sending the header, as opposed to sending both the header and data. These solutions need to maintain the connection that is open at the transport layer.

Embodiments of the present disclosure may improve on at least some of the challenges and issues described above by providing in-network computing with reduction operations performed by switches that can determine to close an aggregation based on buffer shortage and can transmit a partially aggregated packet to the target.

In various embodiments of the present disclosure, a networked system includes a plurality of workers, one or more switches, and one or more targets. A worker can provide a data packet including a header and actual data for computation. The data packet is to be provided to the target for further computation. A switch may aggregate packets from multiple workers and form a single aggregated packet to reduce bandwidth requirement for transmitting the data and reduce the computation load of the target. A switch in the present disclosure can use a CSN window to track its collective reduction operations in the networked system. The CSN window includes one or more collective sequences, each of which may be for a respective collective reduction operation of a computation cycle. Each collective sequence includes bits corresponding to the workers in the communication group, respectively. The switch can use the collective sequence to track whether it has received a packet from a respective worker for the computation cycle. For instance, the switch may set a bit of a worker in a collective sequence after it receives a packet from the worker for the collective sequence. The switch may maintain multiple CSN windows for multiple communication groups or multiple tenants, where each CSN window corresponds to a different communication group or a different tenant. In some embodiments, the CSN window of a communication group is independent from the CSN window of another communication group.

Collective sequences in the CSN window can be arranged in an order. The CSN window may be a sliding window. For instance, after the first collective sequence is completed (e.g., all the bits in the first collective sequence are set), the CSN window may advance to remove the first collective sequence and add a new collective sequence at the end. The CSN window may have a predefined size that equals the number of collective sequences in the CSN window at a time. In an example where the CSN window has a size of 6, the CSN window may start with collective sequences with CSNs of 0 through 5. After the collective sequence of CSN=0 finishes, the CSN window may advance to collective sequences with CSNs of 1 through 6. After the collective sequence of CSN=1 finishes, the CSN window may advance to collective sequences with CSNs of 2 through 7. This sliding process can continue. In some embodiments, even though not all the bits in a collective sequence are set, a subsequent collective sequence, which has a CSN within the CSN range at the time, can be started. For instance, when the CSN window has CSNs from 2 to 7, a subsequent collective sequence having a CSN of 7 or smaller can be started, but a subsequent collective sequence having a CSN of 8 cannot be started and needs to wait for the CSN window to advance from the CSN range of 2 to 7 to the CSN range of 3 to 8.

With such a CSN window, the switch does not have to (even though it can) aggregate packets from all the workers in the communication group before it forwards the data to the next hop. The switch may close a collective sequence in the CSN window before all bits in the collective sequence are set and sends a partially aggregated packet (which combines the data from some but not all the workers in the communication group for the same computation cycle) or unaggregated packet (i.e., the packet from the worker) to the next hop. The next hop, which may be a target or another switch, may perform further aggregation. In certain situations, the switch can form the fully aggregated packet, which combines the data from all the workers in the communication group for the same computation cycle. The target may eventually obtain a fully aggregated packet of the communication group (i.e., a packet that combines the data from all the workers in the communication group for the computation cycle), which may be formed by the target itself or received from a switch communicatively connected to the target.

In embodiments where the switch sends out a partially aggregated packet or unaggregated packet, further aggregation may be performed at the next hop, which may be another switch or a target. The switch may maximize the number of packets it aggregates but may determine not to aggregate a packet to improve the efficiency or capability of the networked system. For example, the switch may determine not to aggregate a packet in embodiments where there is no free buffer to store the packet within the switch. As another example, the switch may determine not to aggregate a packet in embodiments where it takes too long for the worker to send the packet to the switch.

The switch can also facilitate acknowledgements to avoid deadlocks or unnecessarily re-sending packets by workers and to handle packet drops. For instance, the switch may process an acknowledgement of the next hop for receiving a packet from the switch. The switch can process the acknowledgement and send acknowledgement to the worker (s) that provided that data in the packet. After receiving the acknowledgement from the switch, the worker can stop the timer, which, if passed, can cause the worker to re-send the same data to the switch. With the acknowledgement mechanism, for a packet that was dropped, the worker will not receive the acknowledgement and will not stop the timer. When the timer is passed, the worker will re-send the packet so that the target will eventually still receive the data from the worker.

Compared with some currently available solutions where the switch always generates fully aggregated packets, the present disclosure provides more flexibility that makes the switch more compatible with networked systems including workers with latency variance, e.g., inherent latency variance between the workers that can cause the workers to send packets to the switch at different times. Also, the switch can be more compatible with various networked systems despite its memory capacity. For instance, the switch can be used for collective reduction operations in a networked system with multiple communication groups that could oversubscribe the memory (e.g., buffers) of the switch. The switch, after receiving a packet, can determine whether it has sufficient buffer to store a packet. In embodiments where the switch runs out of buffer, the switch can forward the packet to the next hop and does not have to aggregate the packet within the switch. The switch can operate in a way to avoid deadlocks in both losses and lossy fabric, even if there are packet drops.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example Networked System

FIG. 1 a block diagram of a networked system 100, in accordance with various embodiments. The whole networked system 100 or a part of the networked system 100 may be implemented in the computing device 1400 in FIG. 14. The networked system 100 is a system with entities in communication through a network. The networked system 100 includes a plurality of compute blocks 110 (individually referred to as "compute block 110") and a plurality of switches 120 (individually referred to as "switch 120"). For the purpose of illustration, FIG. 1 shows three compute blocks 110 and three switches 120. In other embodiments, alternative configurations, different or additional components may be included in the networked system 100. For instance, the networked system 100 may include a different number of compute blocks 110 or switches 120 from the number shown in FIG. 1. In some embodiments, the networked system 100 may include a single switch 120. Further, functionality attributed to a component of the networked system 100 may be accomplished by a different component included in the networked system 100 or a different system.

Each compute block 110 can perform computation and generate data. A compute block 110 may be a worker or target in a reduction flow. The same compute block 110 may be a worker in a reduction flow but be a target in another reduction flow. A compute block 110 may send data to another compute block 110 through a switch. A compute block 110 may also receive data generated by one or more other compute blocks 110 and perform computation on the data. In some embodiments, one or more of the compute blocks 110 may be used to run a DNN, e.g., the DNN 1100 in FIG. 11. For instance, one or more compute blocks may perform a deep learning operation in a DNN. Each compute block 110 includes a memory 130 and a compute array 140.

The memory 130 may store data generated by or used by the compute array 140. The memory 130 is local to the compute block 110 and may be referred to as a local memory. In the embodiments of FIG. 1, the memory 130 is inside the compute block 110. In other embodiments, the memory 130 may be outside the compute block 110. The memory 130 and the compute array 140 can be implemented on the same chip. In some embodiments, the memory 130 includes one or more SRAMs (static random-access memories). The memory 130 may include one or more buffers, one or more cache memories, one or more register files, or some combination thereof.

The compute array 140 can perform computation, e.g., deep learning operations. Example deep learning operations include convolutions (also referred to as "convolutional operations"), pooling operations, elementwise operations, other types of deep learning operations, or some combination thereof. The compute array 140 includes a plurality of compute units. The compute units may be arranged in columns, or columns and rows. In an example, the compute array 140 receive an input tensor and a weight tensor of a convolution in a DNN and performs MAC (multiply-accumulate) operations with the input tensor and weight tensor. The result of the MAC operations may be an output tensor, which can be further computed, e.g., by the compute array 140 or another compute array. The input tensor, weight tensor, and output tensor may be stored in the memory 130. The input tensor may be a data packet received by the compute block 110 from a switch 120. The data packet may be generated by the switch 120 through a reduction operation and may include data from a plurality of data packets. These data packets may be generated by other compute blocks 110, e.g., by performing one or more deep learning operations in a preceding layer of the DNN. The output tensor may be a data packet that the compute block 110 sends to a switch 120 for being provided to another compute array 140 for further computation, e.g., for the deep learning operation in the next layer of the DNN. More details about compute array 140 are described below in conjunction with FIG. 12.

In some embodiments (e.g., embodiments where a compute block 110 is a target), the compute block may have some or all of the functions of a switch 120, which are described below. The compute block 110 may include at least one of the components of the switch 120 in FIG. 2.

Each switch 120 can perform collective reduction operations to reduce bandwidth requirement, computation load, or both. A switch 120 is in communication with some or all of the compute blocks 110. In some embodiments, a switch 120 may be in communication with three or more compute blocks 110, one of which may be a target and the others are workers. The switch 120 may also be in communication with one or more other switches 120. The switch can receive data from or send data to an entity (e.g., a compute block 110 or another switch 120) that is in communication with the switch 120.

In a collective reduction operation, the switch 120 can aggregate packets received from multiple sources and generate an aggregated packet. The switch 120 can forward the aggregated packet to the next hop in the networked system 100. Compared with forwarding the packets, forwarding the aggregated packet requires less bandwidth. The next hop may be a compute block 110 or another switch 120 that is in communication with the switch 120. In embodiments where the next hop is a compute block 110 (e.g., a target), the compute load of the compute block 110 can be reduced as the compute block 110 can process a single packet (i.e., the aggregated packet) as opposed to multiple packets. The switch 120 can also forward packets to the next hop without aggregation.

Each switch 120 is associated with one or more buffers. The buffers may be inside the switch 120. The switch may determine whether to aggregate packets based on availability of the buffer(s). In an example where there is available buffer at the switch 120, the switch may keep the aggregation open. When the aggregation is open, the switch 120 can aggregate a newly receive packet with one or more previously received packets. In an example where there is no available buffer, the switch 120 may close the aggregation even though the switch 120 has not received packets from all the workers. The switch 120 may form a partially aggregated packet with the packets it has received before the aggregation was closed and send the partially aggregated packet to the next hop. The switch 120 may receive a packet after the aggregation is closed and in that case, the switch 120 may forward the packet to the next hop without reduction. Alternatively, the switch 120 may keep the packet (e.g., store it in a buffer associated with the switch 120). The switch 120 may perform another reduction operation by aggregating the packet with one or more other packets that were not included in closed reduction operation.

The switch 120 may facilitate multiple collective reduction operations. For each collective reduction operation, the switch 120 may receive packets from at least some of the workers in communication with the switch 120. The switch 120 may use a CSN window to manage the collective reduction operations. Certain aspects of the switches 120 are described below in conjunction with FIG. 2.

Figure 2:
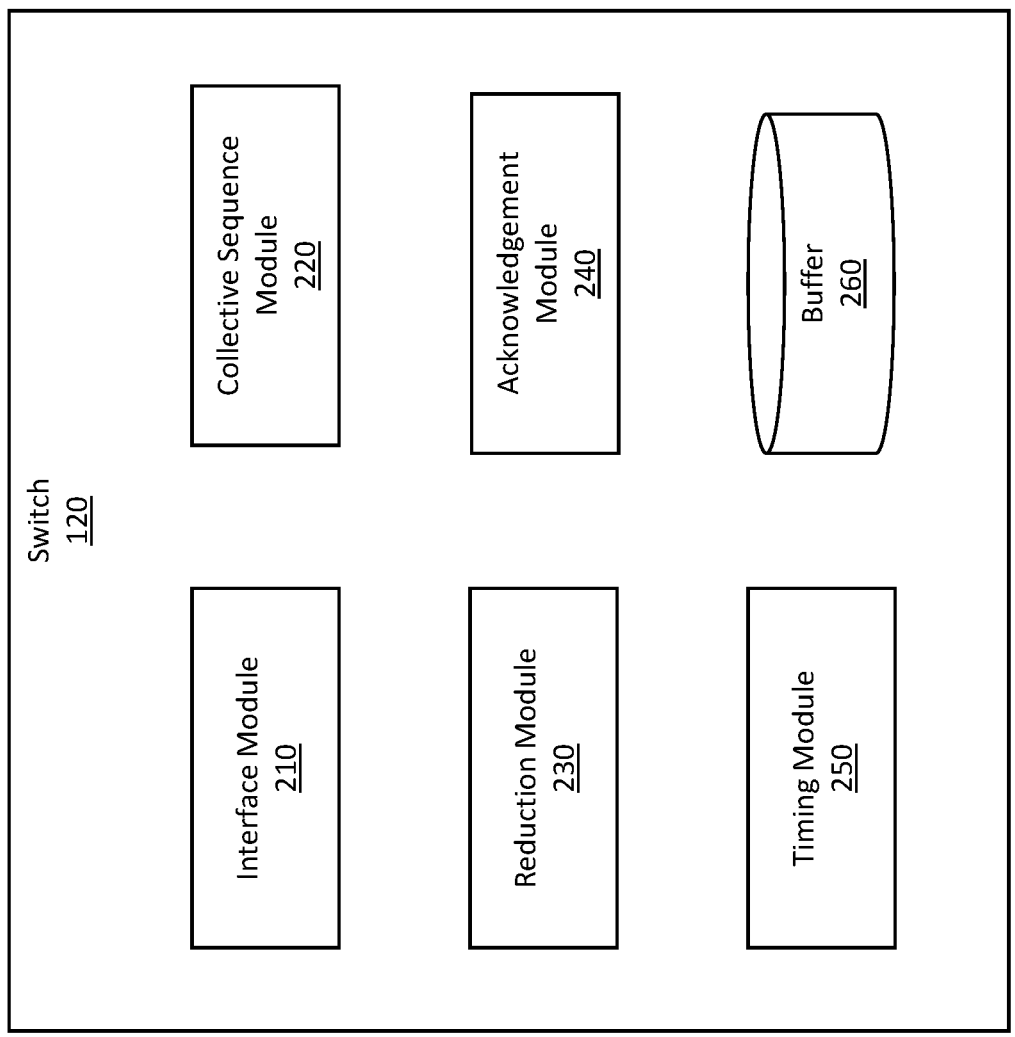
FIG. 2 is a block diagram of a switch, in accordance with various embodiments.

FIG. 2 a block diagram of a switch 120, in accordance with various embodiments. The switch 120, as described above, may be in communication with compute blocks 110 or one or more other switches 120 in the networked system 100. The switch 120 is capable of collective reduce operations. In the embodiments of FIG. 2, the switch 120 includes an interface module 210, a collective sequence module 220, a reduction module 230, an acknowledgement module 240, a timing module 250, and a buffer 260. In other embodiments, alternative configurations, different or additional components may be included in the switch 120. For instance, the switch 120 may include multiple buffers, each of which may store a single packet at a time. Further, functionality attributed to a component of the switch 120 may be accomplished by a different component included in the switch 120, a compute block 110, or a different system. The switch 120 may be implemented in hardware, software, firmware, or some combination thereof.

The interface module 210 facilitates communications of the switch 120 with other entities in the networked system 100. For example, the interface module 210 facilitates receipt of packets by the switch 120 from compute blocks 110 or one or more other switches 120. As another example, the interface module 210 facilitates transmission of packets from the switch 120 to one or more compute blocks 110 or one or more other switches 120. The data transfer to or from the switch 120 may be through wired or wireless connection of the switch 120 with the other entities. The interface module 210 may store received packets in the buffer 260, e.g., based on instructions from the reduction module 230.

The collective sequence module 220 manages one or more CSN windows. In some embodiments (e.g., embodiments where the switch 120 is coupled to a single communication group), the collective sequence module 220 manages a single CSN window. In other embodiments (e.g., embodiments where the switch 120 is coupled to multiple communication groups), the collective sequence module 220 manages a plurality of CSN windows, each of which may be for collective reductions operations for a different communication group. Collective reductions operations for different communication groups may be independent of each other. In some embodiments, a communication group includes workers providing packets that can be aggregated (but are not always aggregated) into one packet. Packets from workers in different communication groups or in different tenants cannot be aggregated into one packet. The collective sequence module 220 may manage different CSN windows separately.

In some embodiments, a CSN window may include one or more collective sequences. A collective sequence corresponds to a respective collective reduction operation of the switch 120. The collective sequence may be a sequence of bits, each of which corresponds to a different one of the workers in the communication group associated with the switch 120. The collective sequences in the CSN window can be identified based on their CSNs.

The collective sequences may be arranged in an order and the CSNs may have ascending values. In an example, the CSN of the first collective sequence is 0, the CSN of the second collective sequence is 1, the CSN of the third collective sequence is 2, and so on. Data packets received by the switch 120, e.g., through the interface module 210, may include CSNs. For instance, a CSN may be included in a header of a data packet. The collective sequence module 220 may identify the collective sequence in the CSN window for the packet based on the CSN in the header of the packet. The header may also include information identifying the worker from which the packet is received, and the collective sequence module 220 may use the information to identify the bit in the collective sequence for the packet. In some embodiments, packets including the same CSN can be aggregated (but may not be aggregated in certain situations, e.g., lack of available buffer), while packets including different CSNs will not be aggregated. In some embodiments, the collective sequence module 220 may manage a dynamic CSN window for a communication group. The collective sequences in the CSN window can be changed, e.g., by sliding the CSN window In some embodiments, the CSN window includes a fixed number of collective sequences. The fixed number defines the size of the CSN window. The collective sequences present in the CSN window are also referred to as open collective sequences or active collective sequences, which be used (e.g., by the reduction module 230) to determine whether to aggregate packets. The CSNs of the open collective sequences define an open CSN range or an active CSN range. As the open collective sequence are arranged in order, the open CSN range starts with the CSN of the first open collective sequence and ends with the CSN of the last open collective sequence in the CSN window. For an open collective sequence, the collective sequence module 220 may set bits for packets received by the switch 120. For instance, after a packet is received, the collective sequence module 220 identifies a bit in the current collective sequence based on the worker from which the packet was received. The collective sequence module 220 may set the bit, e.g., by changing the value of the bit from zero to one. In some embodiments, the collective sequence module 220 sets the bit in response to the receipt of the packet. In other embodiments, the collective sequence module 220 sets the bit based on an instruction from the reduction module 230. The collective sequence module 220 can set the bit for a packet no matter whether the packet is aggregated with one or more other packets or is forwarded to the next hop without reduction.

The collective sequence module 220 may close a collective sequence after one or more conditions are met. The one or more conditions may include: all the available bits in the collective sequence have been set, all packets associated with the collective sequence have arrived at the switch 120, no buffer is available at the switch (which may require that at least one buffer needs to be freed for a new aggregation), a network timer has been reached (which may indicate that it takes too long for all the packets associated with the collective sequence to arrive at the switch 120), other conditions, or some combination thereof. Collective sequences may be completed out of order. For instance, the collective sequence of CSN=2 may be completed before the collective sequence of CSN=0.

After the collective sequence module 220 closes the collective sequence, the collective sequence module 220 may advance the CSN window. For instance, the closed collective sequence is removed from the CSN window, and a new open collective sequence may be added to the end of the CSN window. The open CSN range of the CSN window is therefore updated. In some embodiments, the collective sequence module 220 may advance the CSN window by N collective sequences, where N is an integer greater than one, and each of the CSNs in the CSN window can be increased by N. The collective sequence module 220 may advance the CSN window in order. In the example where the collective sequence of CSN=2 is completed before the collective sequence of CSN=0, the collective sequence module 220 may not advance the CSN window until the collective sequence of CSN=0 is completed as the collective sequence of CSN=0 is the first collective sequence in the CSN window.

The reduction module 230 perform collective reduction operations. The reduction module 230 can determines whether to aggregate received packets, e.g., based on a CSN window managed by the collective sequence module 220 and availability of the buffer 260. In some embodiments, the reduction module 230 may determine whether the packet is for the collective sequence that is active, e.g., at the time the packet is received. The reduction module 230 may compare the CSN in the packet ("packet CSN") with the open CSN range of the CSN window, or with the lowest CSN of the CSN window (i.e., the CSN of the first open collective sequence). The reduction module 230 may determine that the packet CSN is below the CSN window (i.e., below the open CSN range) based on a determination that the packet CSN is less than the lowest CSN of the CSN window. In response to a determination that the packet CSN is below the open CSN range (indicating that the packet is for a collective sequence that may have been closed by the collective sequence module 220), the reduction module 230 may determine not to aggregate the packet with any other packets, e.g., to avoid aggregating the packet multiple times. The reduction module 230 may and forward the packet to the next hop.

In response to a determination that the packet CSN is not below the open CSN range, the reduction module 230 may further determine whether the packet CSN is above the open CSN range, e.g., by determining whether the packet CSN is greater than the largest CSN in the CSN window (i.e., the CSN of the last open collective sequence). The reduction module 230 may determine that an error has occurred based on a determination that the packet CSN is above the active CSN range, as the worker sending the packet should be aware of the CSN window size and should not include a CSN higher than the open CSN range. The reduction module 230 may drop the packet. The packet may not be stored in the buffer 260, aggregated with another packet, or forwarded to the next hop.

For a packet having a CSN that is within the open CSN range, the reduction module 230 may further determine whether the bit for the worker sending the packet has been set. After determining that the bit has been set (e.g., by the collective sequence module 220), the reduction module 230 may further determine whether the packet is in the switch 120, e.g., whether it is stored in the buffer 260 either as a separate packet or as part of an aggregated packet. In response to determining that the packet is in the switch 120, the reduction module 230 may drop the packet. Otherwise, the reduction module 230 may forward the packet to the next hop without aggregation.

After determining that the bit has not been set, the reduction module 230 refers to the availability of the buffer 260. The reduction module 230 determines whether the buffer 260 available to store the packet. For instance, the reduction module 230 determines whether the free storage size of the buffer 260 is no less than the size of the packet. In embodiments where the buffer 260 can store the packet, the reduction module 230 stores the packet in the buffer 260 and will aggregate the packet with one or more other packets. The reduction module 230 may also instruct the collective sequence module 220 to set the bit for the packet.

The reduction module 230 may further determine whether the packet is the last packet. For instance, the reduction module 230 may determine that the packet is the last packet based on a determination that the other bits in the collective sequence have been set. Otherwise, the packet is not the last packet as the switch 120 may receive, e.g., from another worker, a packet for the active collective sequence later. In embodiments where the packet is not the last packet, the reduction module 230 may expect to receive one or more other packets for the active collective sequence. The reduction module may instruct the collective sequence module 220 to set the bit for the packet and store the packet in the buffer 260 for reduction. The packet may be combined with one or more other packets that are received later.

In embodiments where the packet is the last packet, the reduction module 230 may generate an aggregated packet that includes data in all the packets that have been received for the collective sequence. The reduction module 230 can forward the aggregated packet to the next hop. The reduction module 230 can also instruct the collective sequence module 220 to close the collective sequence and advance the CSN window.

The reduction module 230 may update the header in a packet after the reduction module 230 aggregates the packet with one or more other packets and before the reduction module 230 transmits the aggregated packet (either a partially aggregated packet or a fully aggregated packet) to the next hop. The packet may include the header and actual data. The actual data may be data to be used for computation. The header may include a plurality of fields providing various information about the packet, such as a field specifying the CSN of the packet, a field identifying one or more workers (e.g., workers that generated the actual data in the packet), data offset (i.e., offset of where the actual data that needs to be reduced is stored in the packet), reduction opcode (e.g., data type, command, etc.), a field identifying the communication group that the worker belongs to (e.g., Group ID), a field indicating the size of the header, other fields, or some combination thereof. A field may have one or more bits. The reduction module 230 may update one or more fields of the header. For instance, the reduction module 230 may update the field identifying workers. The reduction module 230 may modify the field to reflect the worker of the packet and the one or more workers of the one or more other packets. In some embodiments (e.g., embodiments where the aggregation results in a partially aggregated packet and the reduction module 230 later combines the partially aggregated packet with another packet), the reduction module 230 may further update the field to which workers were part of the most recent aggregation.

The acknowledgement module 240 processes acknowledgements received from the target and issues acknowledgements to the workers. In some embodiments, after the reduction module 230 sends a packet (fully aggregated packet, partially aggregated packet, or unaggregated packet) to the target, the acknowledgement module 240 may receive an acknowledgement from the target, e.g., through the interface module 210. The acknowledgement confirms the receipt of the packet by the target. In other embodiments, after the reduction module 230 sends a packet to another switch and the other switch sends the packets to the target, the other switch may multicast an acknowledgement from the target to the acknowledgement module 240.

The acknowledgement module 240 may also identify one or more workers for the acknowledgement from the target. In an embodiment where the acknowledgement from the target is for an aggregated packet, the acknowledgement module 240 identifies the workers that sent the switch 120 the packets used to form the aggregated packet. In an embodiment where the acknowledgement from the target is for an unaggregated packet, the acknowledgement module 240 identifies the worker that sent the switch 120 the unaggregated packet. The acknowledgement module 240 further multicasts the acknowledgement from the target to the identified worker(s). In some embodiments, the acknowledgement module 240 may generate multiple copies of the acknowledgement and send each copy to a different worker that have provided a packet associated with the acknowledgement. The acknowledgement can confirm the target's receipt of the data provided by the worker.

The timing module 250 controls aggregation done by the reduction module 230 based on a timer. In some embodiments where there is no timer for aggregation but the buffer 260 have sufficient free storage, the reduction module 230 may keep waiting for a packet (e.g., the last packet for a collective reduction operation). The worker may not send the packet to the switch 120, e.g., because the worker had sent a packet that was dropped. As the reduction module 230 waits for the last packet and does not send out any packet to the target, the target does not issue any acknowledgement. The acknowledgement module 240 also does not issue any acknowledgement to any of the workers since the acknowledgement module 240 does not receive any acknowledgement from the target. Timeout (e.g., network timeout) can occur at the workers, and all the workers (including workers whose packets have been received and aggregated by the switch 120) will re-send packets to the switch 120. This will cause unnecessary bandwidth usage and computation load of the workers.

The timing module 250 can prevent occurrence of the problem by using the time. The timer may specify a predetermined duration of time, which may be shorter than the network timeout. The timing module 250 may determine whether the timer has been reached since the reduction module 230 sent out the last packet. In response to determining that the timer has been reached, the timing module 250 instructs the reduction module 230 to send out the aggregated packet that is currently available, even though it is a partially aggregated packet. After the reduction module 230 sends out the partially aggregated packet, the target can issue an acknowledgement, and the acknowledgement module 240 can then provide acknowledgements to the workers whose packets have been aggregated into the partially aggregated packet. These acknowledgements will prevent the workers from re-sending their packets. The worker, whose packet is not aggregated into the partially aggregated packet, will not receive the acknowledgement and therefore, can still re-send its packet after the network timeout.

Figure 3:
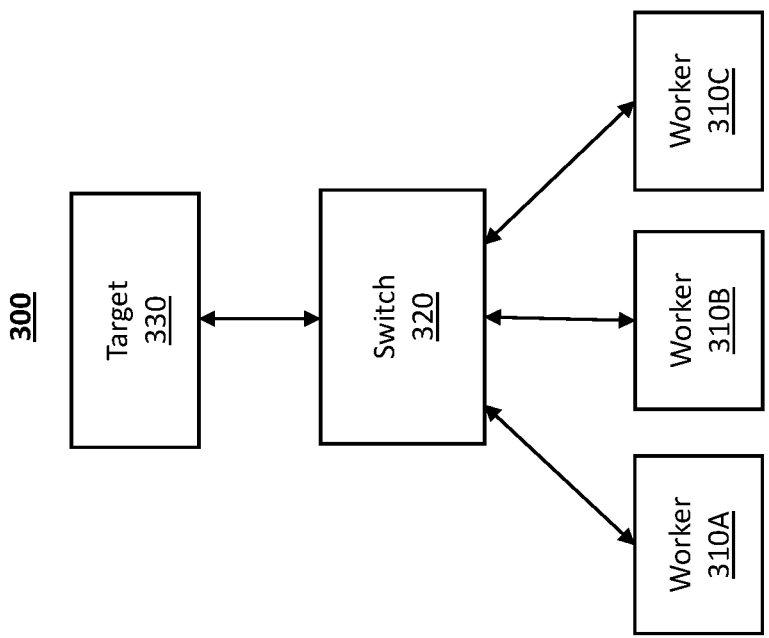
FIG. 3 illustrates an example networked system facilitating data reduction by a switch, in accordance with various embodiments.

FIG. 3 illustrates an example networked system 300 facilitating data reduction by a switch 320, in accordance with various embodiments. The networked system 300 may be an embodiment of the networked system 100 in FIG. 1. As shown in FIG. 3, the networked system 300 includes workers 310A-310C (collectively referred to as "workers 310" or "worker 310"), the switch 320, and a target 330. The switch 320 is communicatively connected to the workers 310 and the target 330. In other embodiments, the networked system 300 may include fewer, more, or different components. Also, the connections between the components may be different.

Each worker 310 may be an embodiment of the compute block 110 in FIG. 1. In some embodiments, every worker 310 may generate a data packet in one computation cycle and send the data packet to the switch 320. The three workers 310 may generate three packets, each of which is from a different worker 310. The workers 310 constitute a single communication group, and data packets from the three workers 310 can be aggregated into a single packet by the switch 320 through a collective reduction operation.

The switch 320 performs data reduction on packets received from the workers 310. In an embodiment, the switch 320 generates a single packet by combing three packets received from the three workers 310, respectively. The switch 320 sends the single packet to the target 330, as opposed to sending three packets. Thus, the bandwidth requirement can be reduced. Also, the computation load of the target 330 can be reduced. In another embodiment, the switch 320 generates a single packet by combing two packets received from two workers 310 (e.g., the workers 310A and 310B), respectively. The switch 320 sends the single packet (i.e., a partially aggregated packet) to the target 330, as opposed to sending two packets. For a packet from the third worker 310 (e.g., the worker 310C), the switch 320 may determine not to aggregate the packet with the partially aggregated packet and may forward the packet to the target 330. In yet another embodiment, the switch 320 may determine not to aggregate any packets and forward three packets to the target 330.

As data in the three packets from the three workers 310 is forwarded to the target either as one packet or multiple packets, the switch 320 finishes one collective reduction operation. The switch 320 may start another collective reduction operation as it receives new packets from the workers 310. The switch 320 can manage its collective reduction operations by using a CSN window.

The target 330 receives one or more packets from the switch 320. The target 330 may perform computation on the data in the packet(s). In some embodiments, the target 330 can send an acknowledgement to the switch 320 after the target receives a packet. The target may send an acknowledgement for every packet it receives, no matter whether the packet is a fully aggregated packet, a partially aggregated packet, or a packet that has not been aggregated and was generated by a worker 310. After the switch 320 receives the acknowledgement from the target 330, the switch 320 may forward the acknowledgement to the worker(s) 310.

In some embodiments (e.g., embodiments where the switch 320 fail to aggregate all the three packets from the workers 310), the target 330 may aggregate multiple packets received from the switch 320. For example, the target 330 receives two packets from the switch 320: one packet including data from two of the three workers 310 and another packet including data from the third worker 310. The target 330 may generate a single packet that includes data in the two packets. In another example, the target 330 receives three packets from the switch 320, each packet is generated by a different worker 310. The target 330 may generate a single packet that includes data in the three packets.

The target 330 may aggregate packets in the same or similar way how the switch 320 aggregates packets. For instance, the target 330 may perform some or all of the actions taken by a switch 120 that are described above in conjunction with FIGS. 1 and 2. In some embodiments, to avoid aggregation within the target 330, an additional switch (not shown in FIG. 3) may be added between the switch 320 and the target 330. The additional switch, which is the last switch connected to the target (i.e., in direct communication with the target) can aggregate packets that are not aggregated within the switch 320 and make sure the target 330 receives one packet for every cycle. In other embodiments, the switch 320 is the last switch as shown in FIG. 3.

Figure 4:
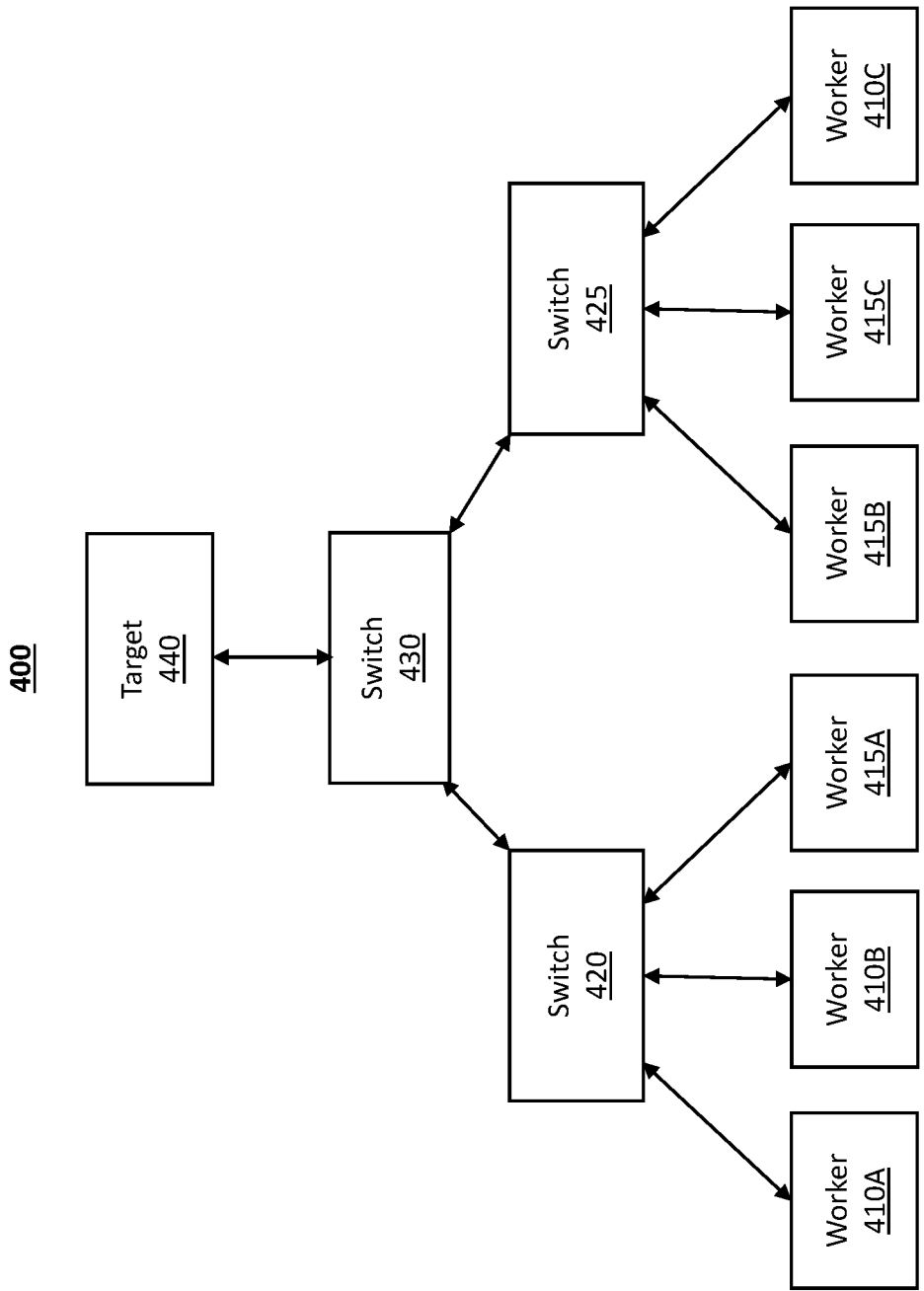
FIG. 4 illustrates another example networked system facilitating data reduction by switches, in accordance with various embodiments.

FIG. 4 illustrates another example networked system facilitating data reduction by switches 420, 425, and 430 in accordance with various embodiments. The networked system 400 may be an embodiment of the networked system 100 in FIG. 1. As shown in FIG. 4, the networked system 400 includes workers 410A-410C (collectively referred to as "workers 410" or "worker 410"), workers 415A-415C (collectively referred to as "workers 415" or "worker 415"), the switches 420, 425, and 430, and a target 440. In other embodiments, the networked system 400 may include fewer, more, or different components. Also, the connections between the components may be different.

Each worker 410 or 415 may be an embodiment of the compute block 110 in FIG. 1. In some embodiments, every worker 410 or 415 may generate a data packet in one computation cycle and send the data packet to the switch 420 or 425. The three workers 410 constitute a first communication group of the networked system 400. The three workers 410 may generate three packets, each of which is from a different worker 410. Data packets from the three workers 410 can be aggregated into a single packet within the switch 430 through a collective reduction operation. The three workers 415 constitute a second communication group that is separate from the first communication group. The three workers 415 may generate three packets, each of which is from a different worker 415. Data packets from the three workers 415 can be aggregated into a single packet within the switch 430 through a collective reduction operation. The two communication groups may be associated with identifiers (e.g., Group IDs) that can be used to distinguish the communication groups from each other. The collective reduction operations for the two communication groups are independent. There may be two separate CSN windows used for the two communication groups, respectively. The two CSN windows can operate independently from each other.

The switch 420 is communicatively connected to the workers 410A, 410B, and 415A. In some embodiments, the switch 420 may perform data reduction on packets received from the workers 410A and 410B, which will be a partially aggregated packet for the first communication group as the worker 410C is not communicatively connected to the switch 420 and the switch 420 cannot receive packets from the worker 410C. The switch 420 can provide the partially aggregated packet to the switch 430, within which a fully aggregated packet for the first communication group may be generated. The switch 420 can also provide a packet from the worker 415A to the switch 430, and the switch 430 may aggregate the packet with packets received from the workers 415B and 415C (or a partially aggregated packet) through the switch 425.

Similarly, the switch 425 is communicatively connected to the workers 415B, 415C, and 410C. In some embodiments, the switch 425 may perform data reduction on packets received from the workers 415B and 415C, which will be a partially aggregated packet as the worker 415A is not communicatively connected to the switch 425 and the switch 425 cannot receive packets from the worker 415A. The switch 425 can provide the partially aggregated packet to the switch 430, within which a fully aggregated packet for the first communication group may be generated. The switch 425 can also provide a packet from the worker 410C to the switch 430, and the switch 430 may aggregate the packet with packets received from the workers 410A and 410B (or a partially aggregated packet) through the switch 425. The switch 430 may send packets for the two communication groups to the target 440.

The target 440 receives one or more packets from the switch 430. The target 440 may perform computation on the data in the packet(s). In some embodiments, the target 440 can send an acknowledgement to the switch 430 after the target receives a packet. The target 440 may send an acknowledgement for every packet it receives, no matter whether the packet is a fully aggregated packet, a partially aggregated packet, or an unaggregated packet. After the switch 430 receives the acknowledgement from the target 440, the switch 430 may forward the acknowledgement to the switch 420 or 425 (or both), which can further forward the acknowledgement to the corresponding workers 410 or 415 (or both).

In some embodiments (e.g., embodiments where the switch 430 fail to aggregate all the three packets from the three workers 410 or 415), the target 440 may aggregate multiple packets received from the switch 430. For example, the target 440 receives two packets from the switch 430: one packet including data from two of the three workers 410 or 415 and another packet including data from the third worker 410 or 415. The target 440 may generate a single packet that includes data in the two packets. In another example, the target 440 receives three packets from the switch 430, each packet is generated by a different worker 410. The target 440 may generate a single packet that includes data in the two packets. The target 440 may aggregates packets in the same or similar way how the switch 430 aggregates packets. For instance, the target 440 may perform some or all of the actions taken by a switch 120 that are described above in conjunction with FIGS. 1 and 2. In some embodiments, the target 440 may aggregate the actual data in the packets and perform computation on the actual data without aggregating or changing any of the headers of the packets.

As there are two communication groups in the networked system 400, the switches 420, 425, and 430 and the target 440 may each maintain two CSN windows, each of which is for a different communication group. The reduction operations for the two communication groups may be independent from each other. Also, the two CSN windows may be managed separately.

Example CSN Window

Figure 5:
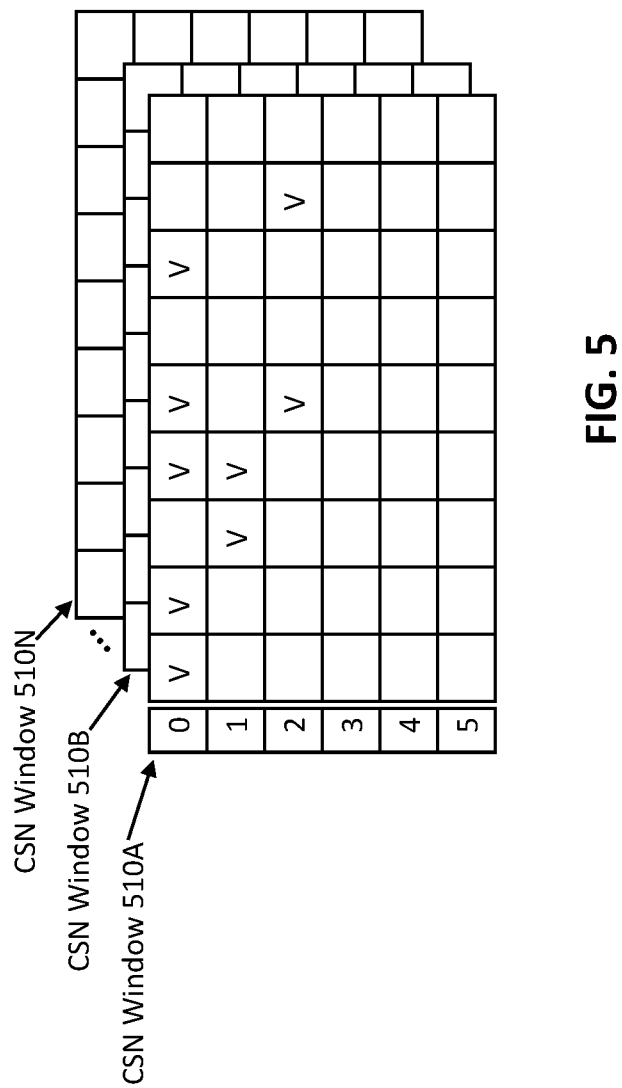
FIG. 5 illustrates an example collective sequence number (CSN) window, in accordance with various embodiments.

FIG. 5 illustrates example CSN windows 510A-510C, in accordance with various embodiments. The CSN windows 510A-510C are collectively referred to as "CSN windows 510" or "CSN windows 510." The CSN windows 510 may be used for controlling collective reduction operations by a switch or target in a networked system. Each CSN window 510 may correspond to a different communication group in the networked system. The collective reduction operations for different communication groups can be separate, and the CSN windows 510 can be separate from each other. For instance, an update (e.g., setting bit, advancing collective sequence, etc.) in a CSN window 510 may not influence another CSN window 510.

Each CSN window 510 is shown as a table in FIG. 5. The table has six rows and nine columns. Each element in the table may represent a bit. Each row represents a collective sequence that includes nine bits. Each bit may have a value of zero or one and correspond to a different worker in the networked system. The bits in the same column may correspond to the same worker. Each collective sequence is for controlling a collective reduction operation. Thus, the CSN window 510 can be used to control six collective reduction operations by the switch or target. Each collective sequence has a CSN. The six collective sequences have CSNs from 0 to 5, so the open CSN range is [0, 5] and the CSN window size is 6. In other embodiments, a CSN window 510 may include a different number of collective sequences or a different number of bits for a collective sequence.

As shown in FIG. 5, the CSN window 510A has five open collective sequences. The bits in the open collective sequences can be set. For instance, after a packet is received by the switch or target, the one or more bits corresponding to the one or more workers that provide the data in the packet can be set. For example, a bit may be set by changing the value of the bit from zero to one. As another example, a bit may be set by changing the value of the bit from one to zero. In FIG. 5, the table elements marked with "V" represent bits that have been set. As shown in FIG. 5, the collective sequence of CSN=0 has five set bits, the collective sequence of CSN=1 has two set bits, and the collective sequence of CSN=2 has two set bits. More bits can be set later as more packets are received.

The CSN window 510A will advance after the collective sequence of CSN=0 is closed. The collective sequence of CSN=0 may be closed after all the bits in the collective sequence are set. In some embodiments, the collective sequence can be closed even before all the bits are set. For example, the collective sequence may be closed after a determination that there is no more buffers at the switch and an aggregation of the received packets (even though not all packets are received) is needed to empty at least one buffer. As another example, the collective sequence may be closed after a determination that a network timer has been reached, which indicates that the time for receiving a packet is longer than desired, so the switch should not wait any more. The switch can form a partially aggregated packet and close the collective sequence.

The CSN window 510A will advance by removing the collective sequence of CSN=0 and adding the collective sequence of CSN=6. The open CSN range will be changed to [1, 6]. In some embodiments, the collective sequence of CSN=0 may be closed after another collective sequence is closed, but the CSN window 510A may not advance until the collective sequence of CSN=0 is closed as it is the first collective sequence.

Example Header

Figure 6:
FIG. 6 illustrates an example header of a data packet, in accordance with various embodiments.

FIG. 6 illustrates an example header 600 of a data packet, in accordance with various embodiments. The header 600 includes six fields: 610, 620, 630, 640, 650, and 660. The field 610 specifies a size of the header, such as the number of bits or bytes taken by the header. The field 620 may be a code that indicates data type of the actual data in the data packet, a command, or other information. The field 630 is the CSN of the data packet and can be used to determine whether or how to aggregate the packet with one or more other packets. The field 640 specifies a Group ID that identifies which communication group (or which tenant) the packet is for. The field 640 can be used to find the right CSN window for a reduction operation associated with the packet. The field 650 specifies an offset, e.g., offset of where the actual data that needs to be reduced is stored in the packet. The field 660 describes which worker(s) were part of the aggregation up to this point. The field 660 can be updated after an aggregation is done and before the aggregated packet is sent to the next hop.

The types of fields and the order of the fields in FIG. 6 are used for illustration purpose. The header 600 may include fewer, more, or different fields. Also, the fields may be arranged in a different order from the order shown in FIG. 6.

Example Collective Reduction Operations

Figure 7A:
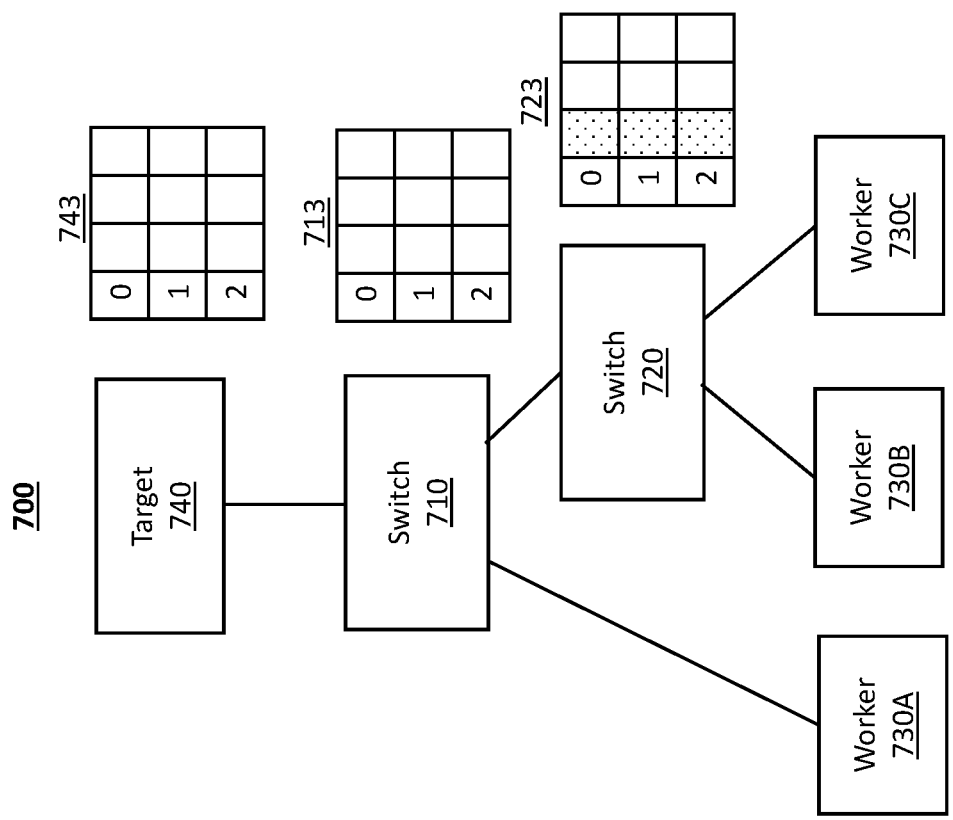
FIGS. 7A-7G illustrates a collective reduction operation for a single communication group in a networked system, in accordance with various embodiments.

FIGS. 7A-7G illustrates a collective reduction operation for a single communication group in a networked system 700, in accordance with various embodiments. The steps of the collective reduction operation shown in FIGS. 7B-7G are shown for the purpose of illustration. In other embodiments, the collective reduction operation may include different steps. As shown in FIG. 7A, the networked system 700 includes switches 710 and 720, workers 730A-730C (collectively referred to as "workers 730" or "worker 730"), and a target 740. The switch 710 or 720 may be an embodiment of the switch 120 in FIGS. 1 and 2, the switch 320 in FIG. 3, or the switch 420, 425, or 430 in FIG. 4. Each worker 730 may be an embodiment of the compute block 110 in FIG. 1, the worker 310 in FIG. 3, or the worker 410 or 415 in FIG. 4. The target 740 may be an embodiment of the compute block 110 in FIG. 1, the target 330 in FIG. 3, or the target 440 in FIG. 4. In the embodiments of FIGS. 7A-7G, the worker 730A is communicatively connected to the switch 710. The workers 710B and 710C are communicatively connected to the switch 720. The switch 710 is communicatively connected to the switch 720 and the target 740.

The workers 730 constitute a single communication group. Through the collective reduction operation, three packets from the three workers 730 can be aggregated into a single packet, which will be available for target 740 to perform further computation. The collective reduction operation includes one or more aggregations done by the switch 710, the switch 720, the target 740, or some combination thereof. As shown in FIG. 7A, the switch 710 is associated with a CSN window 713. The switch 720 is associated with a CSN window 723. The target 740 is associated with a CSN window 743. The CSN window 713, 723, or 743 may be an embodiment of the CSN window 500 in FIG. 5. The CSN windows 713, 723, and 743 can be used to track the progress of the collective reduction operation. The CSN windows 713 and 743 each include three open collective sequences that can be used for the collective reduction operations. The first collective sequence having a CSN of zero is used for the collective reduction operation shown in FIGS. 7B-7G. The second and third collective sequences may be used for other collective reduction operations. Each collective sequence includes three bits for the three workers 730, respectively. As the switch 720 is not communicatively connected to the worker 730A, each collective sequence in the CSN window 723 have two available bits and the bit for the worker 730A is disabled, meaning the bit cannot be set. In some embodiments, the CSN window 723 may not even include the bit for the worker 730A.

Figure 7B:
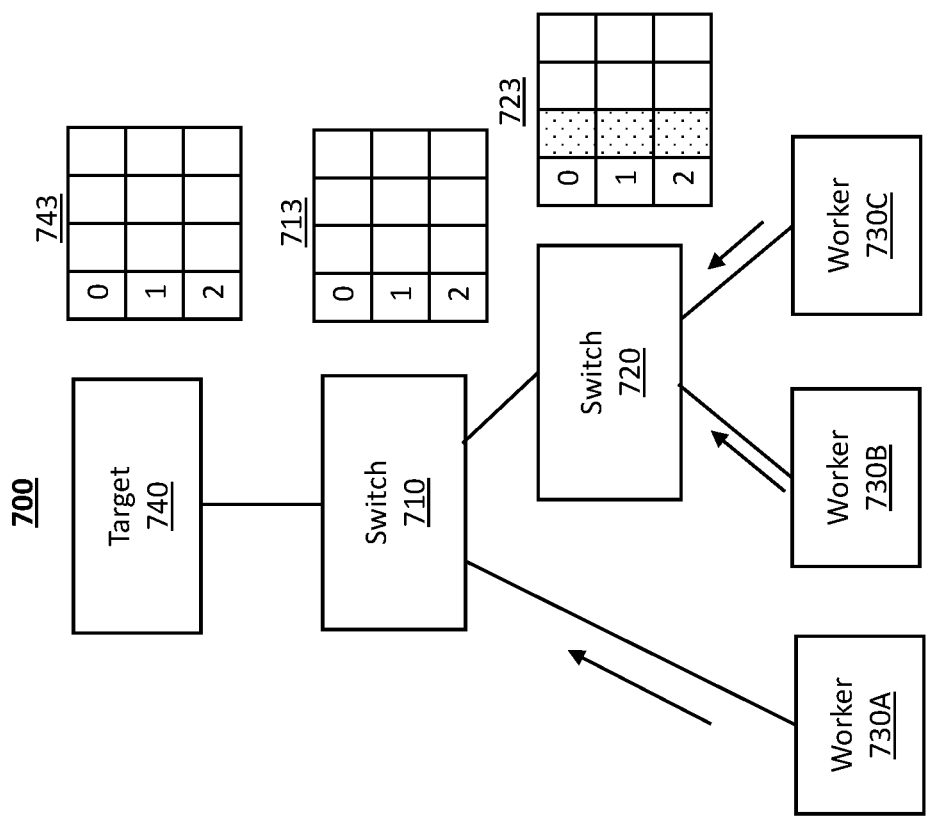

In FIG. 7B, the worker 730A sends a packet to the switch 710. The workers 710B and 710C each send a packet to the switch 720. Each packet may include a header, an example of which is the header 600 in FIG. 6. The header includes a CSN (i.e., 0) for the collective reduction operation. The packets from all the three workers 730 in this cycle have the same CSN, which indicates that they are for the same collective sequence and the same collective reduction operation. The header also includes information identifying the worker of the packet. Each packet also includes actual data in addition to the header. The actual data may be generated by the corresponding worker through computation done by the worker, e.g., a deep learning operation in a layer of a DNN. The actual data is to be provided to the target 740 for further computation, e.g., another deep learning operation in the layer of the DNN or in the next layer of the DNN.

Figure 7C:
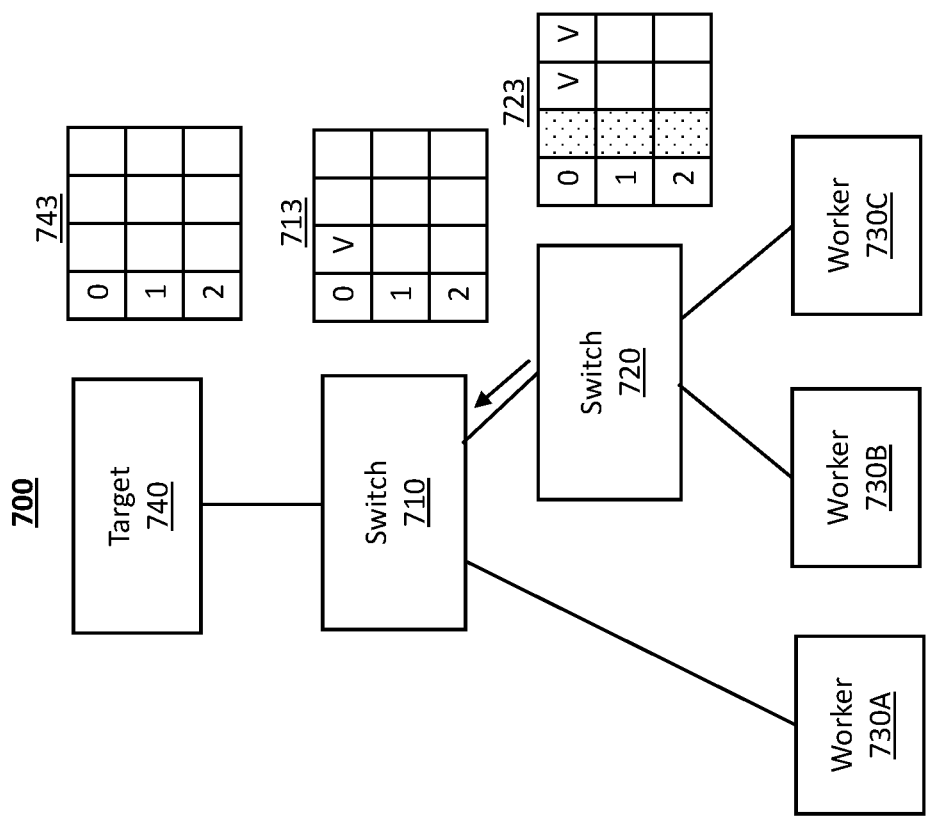

In FIG. 7C, the CSN windows 713 and 723 are updated. In the CSN window 713, the bit for the worker 310A for CSN=0 is set as the switch 710 has received the packet from the worker 310A, while the other bits are not set. In the CSN window 723, the bits for the workers 730B and 730C for CSN=0 are set as the switch 720 has received the packets from the workers 730B and 730C. As the two available bits in the first collective sequence of the CSN window 723 are both set, the CSN window 723 may advance and the open CSN range of the CSN window 723 may be changed from [0, 2] to [1, 3]. The switch 720 forms an aggregated packet by combining the packets from the workers 730B and 730C and sends the aggregated packet to the switch 710. The aggregation within the switch 720 therefore reduces data to be transferred to the switch 710, since one packet (i.e., the aggregated packet) is sent instead of two packets (i.e., the two packets from the workers 730B and 730C). After the aggregation, the bandwidth for sending one packet is required, as opposed to two packets without aggregation. Thus, the bandwidth requirement can be reduced, e.g., half. The aggregated packet from the switch 720 is a partially aggregated packet of the collective reduction operation as it does not include data from the worker 710A. While or after the switch 720 aggregates the two packets from the workers 730B and 730C, the switch 720 can generate a new header by updating the header in one of the packets. For instance, the switch 720 changes a field in the header that identifies the worker 730. Before the update, the header identifies the worker 730B or 730C. After the update, the header identifies both workers 730B and 730C.

Figure 7D:
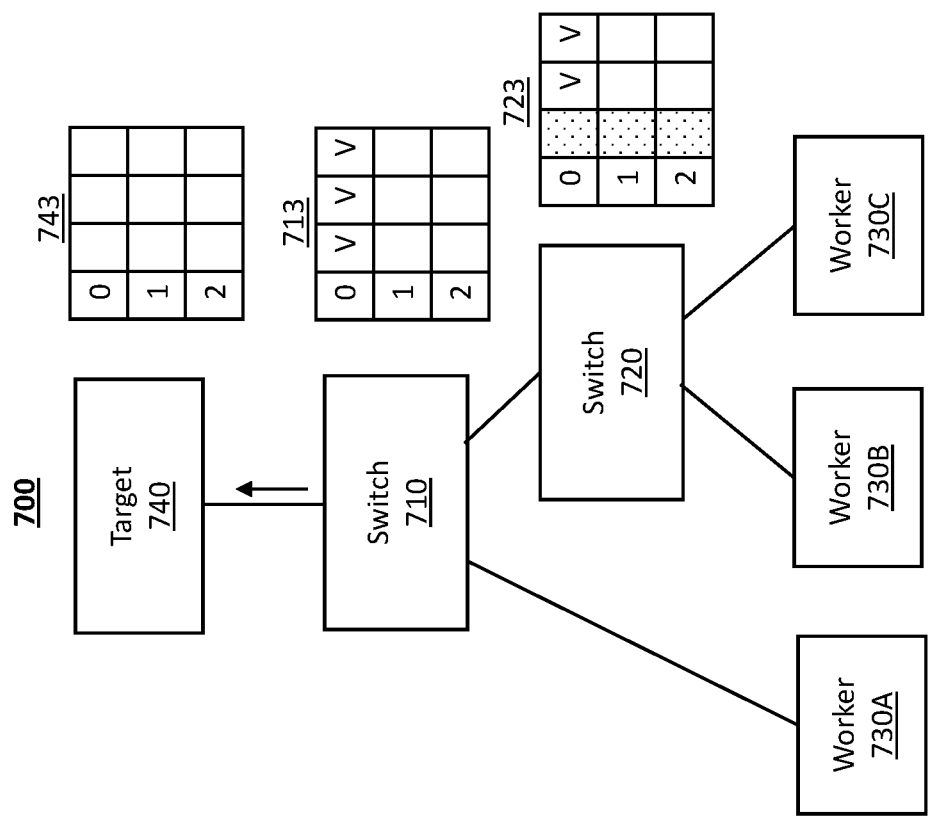

In FIG. 7D, the CSN window 713 is updated. The bits for the workers 730B and 730C for CSN=0 are set as the switch 710 has received the aggregated packet. The switch 710 can set the bits based on the header in the partially aggregated packet, e.g., based on the field that identifies both workers 730B and 730C. At this point, all the bits in the first collective sequence are set. The CSN window 713 may advance to include collective sequences having CSNs from 1 to 3. The switch 710 forms another aggregated packet by combining the data in the partially aggregated packet from the switch 720 and the packet from the worker 730A. As this aggregated packet includes data from all the three workers 730, it is a fully aggregated packet. The switch 710 sends the fully aggregated packet to the target 740. As the switch 710 is sending a single packet to the target 740, the bandwidth for sending one packet is required, as opposed to three packets without the collective reduction operation. Even though the aggregations in the collective reduction operation are done within the switches 710 and 720, the collective reduction operation may include one or more aggregations done within the target, e.g., in embodiments where the switch 710 or 720 fail to aggregate packets due to lack of free buffer, timeout, or other reasons. While or after the switch 710 aggregates the partially aggregated packet from the switch 720 and the packet from the worker 730A, the switch 710 can generate a new header by updating the header in either packet. After the update, the header identifies all the three workers 730.

Figure 7E:
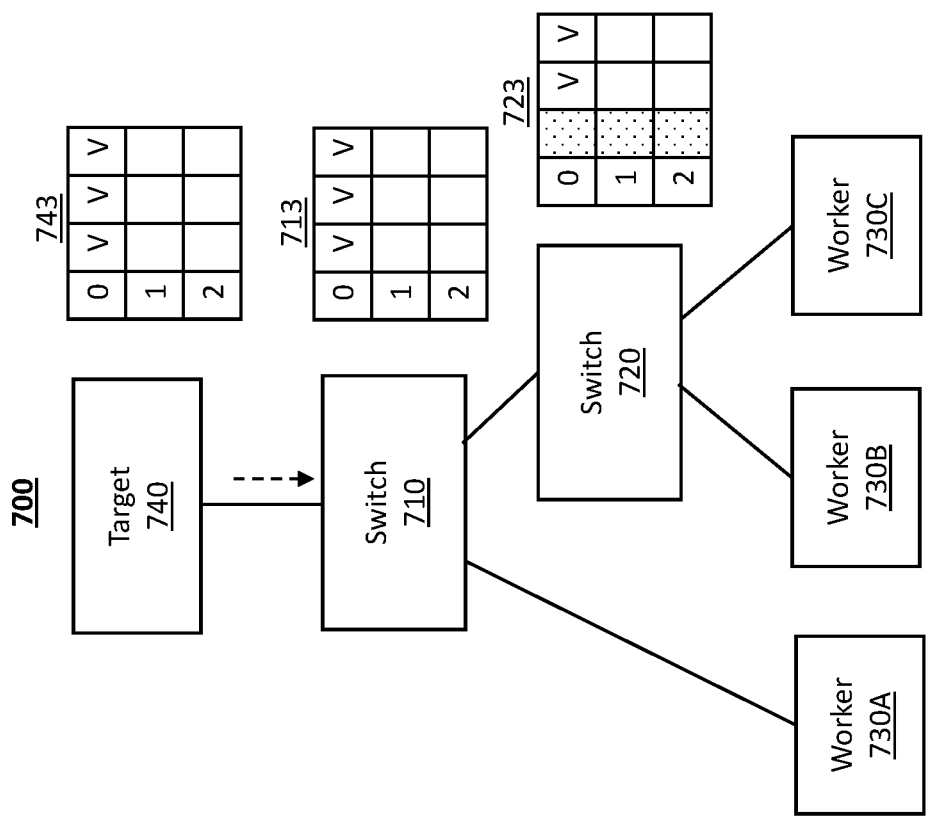

In FIG. 7E, the CSN window 743 is updated. The bits for the workers 730B and 730C for CSN=0 are set as the target 740 has received the fully aggregated packet. The target 740 can set the bits based on the header in the fully aggregated packet, e.g., based on the field that identifies all the three workers 730. The CSN window 743 may advance to include collective sequences having CSNs from 1 to 3. The target 740 sends an acknowledgement to the switch 710, which is represented by the dashed arrow in FIG. 7E. The acknowledgement may include a confirmation of the receipt of the fully aggregated packet. The acknowledgement may include information about fully aggregated packet, such as the CSN, information identifying the workers 730, etc.

Figure 7F:
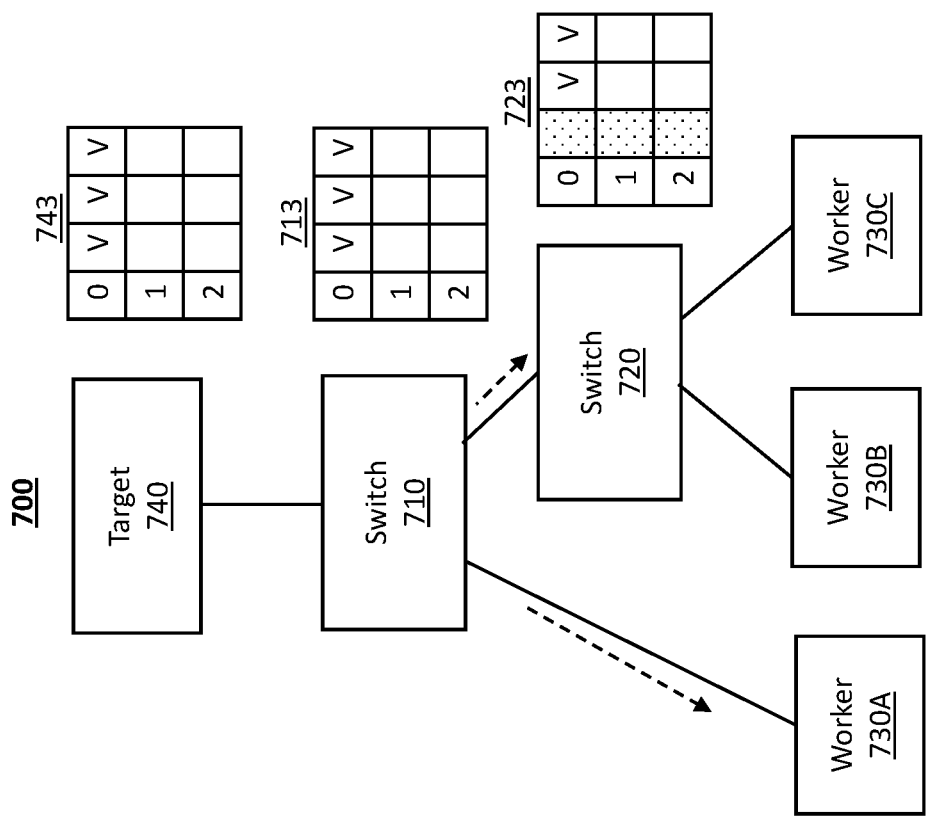

In FIG. 7F, the switch 710 has received the acknowledgement from the target 740 and processed the acknowledgement. For instance, the switch 710 determines that the acknowledgement is associated with the packet from the worker 710A and the partially aggregated packet from the switch 720. The switch 710 then sends the acknowledgement to each of the switch 710 and the worker 730A. The acknowledgement for the worker 730A may be different from the acknowledgement for the switch 710. For instance, the acknowledgement for the switch 710 may identify the workers 730B and 730C which provided the data in the partially aggregated packet.

Figure 7G:
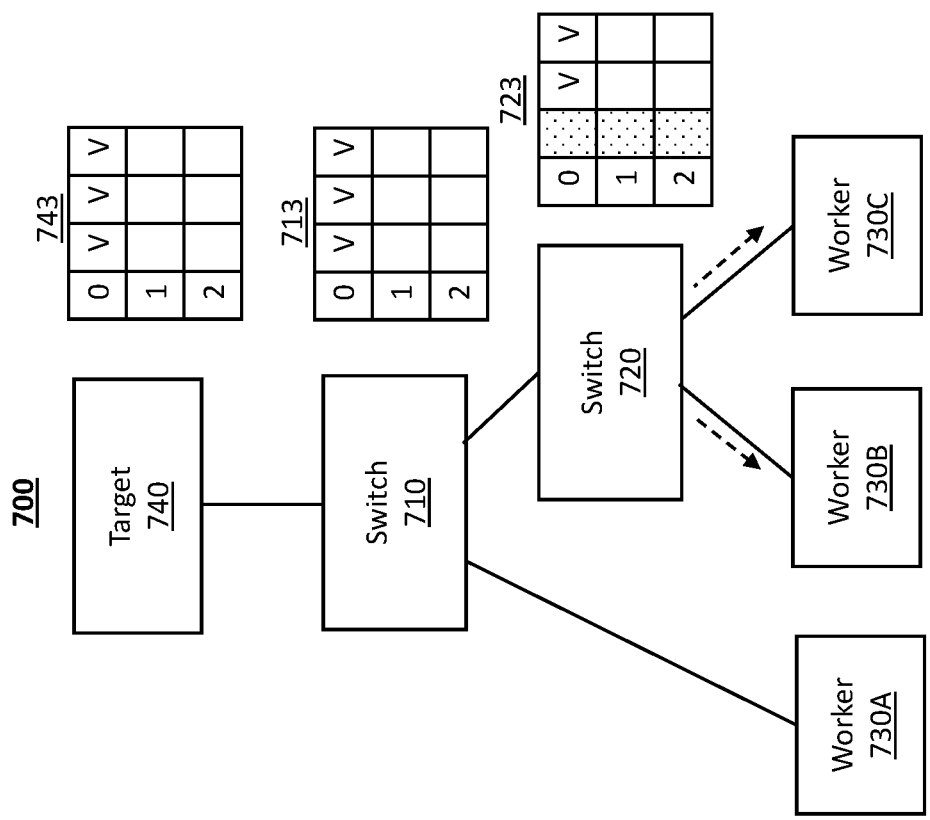

In FIG. 7G, the worker 730A and the switch 710 have received the acknowledgements from the target 740. In some embodiments, after the worker 730A receives the acknowledgement, it may stop a timer (e.g., the network timer), which, if passed, can trigger the worker 730A to re-send the packet to the switch 720. After the switch 720 receives its acknowledgement, it processes the acknowledgement. For instance, the switch 720 determines that the acknowledgement is associated with the packets from the workers 710B and 710C. The switch 720 may duplicate the acknowledgement to get two acknowledgments and multicast the two acknowledgements to the workers 710B and 710C, respectively. After the workers 710B and 710C receive the acknowledgements, they may stop their timers for re-sending their packets.

Figure 8A:
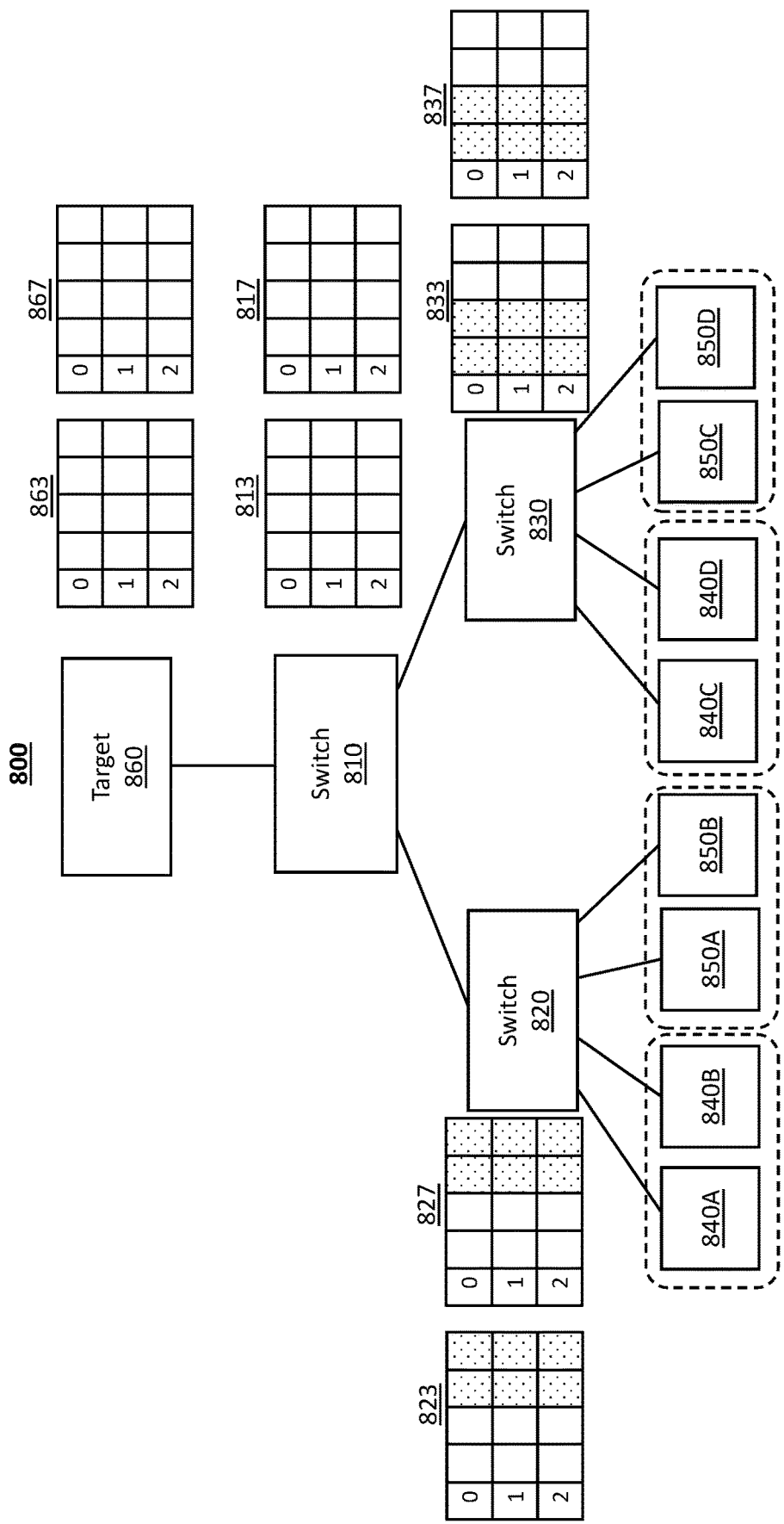
FIGS. 8A-8O illustrates collective reduction operations for multiple communication groups in a networked system, in accordance with various embodiments.
Figure 8B:
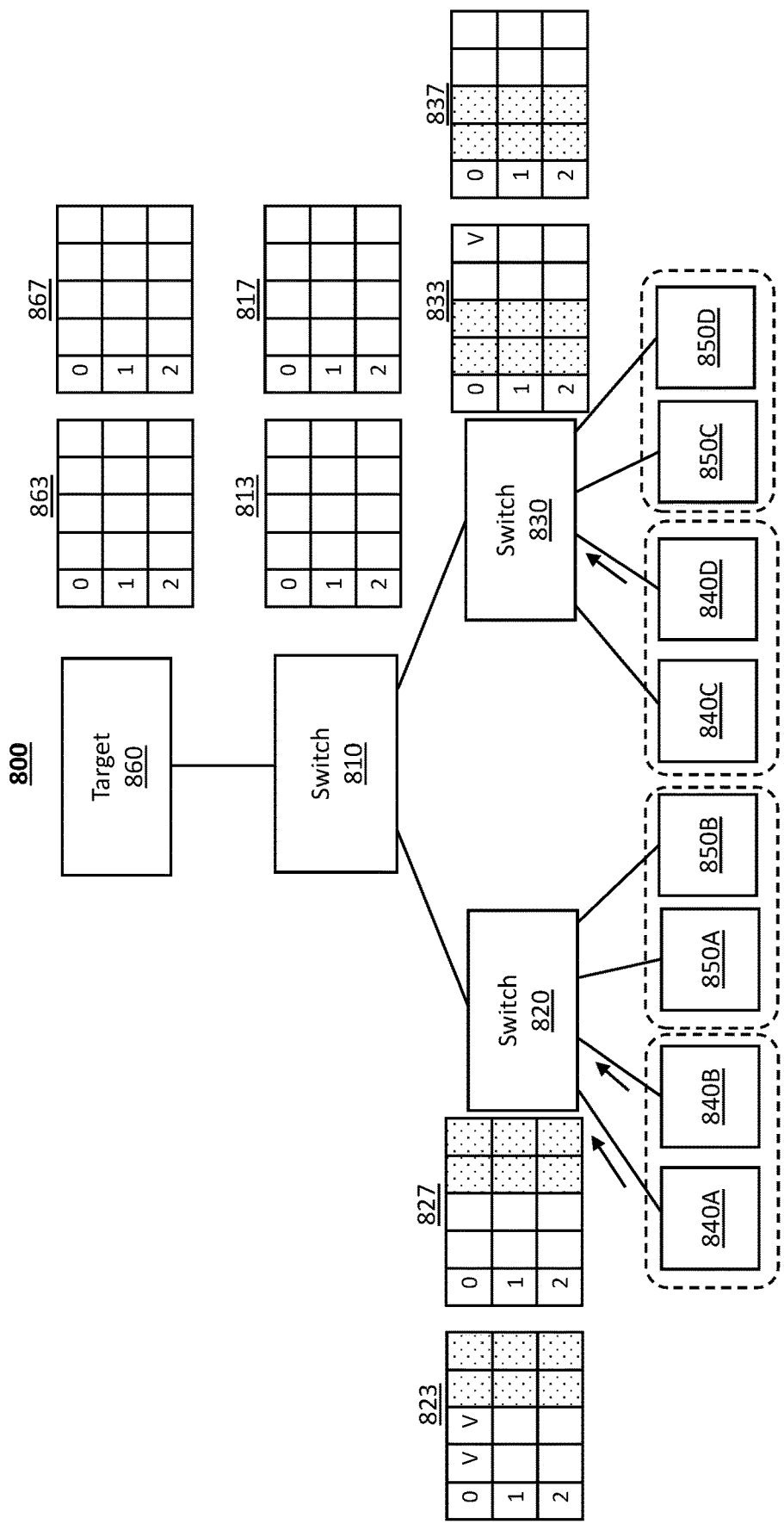

FIGS. 8A-80 illustrates collective reduction operations for multiple communication groups in a networked system 800, in accordance with various embodiments. The steps of the collective reduction operation shown in FIGS. 8B-7N are shown for the purpose of illustration. In other embodiments, the collective reduction operation may include different steps. As shown in FIG. 8A, the networked system 800 includes switches 810, 820, and 830, workers 840A-840D (collectively referred to as "workers 840" or "worker 840"), workers 850A-850D (collectively referred to as "workers 850" or "worker 850"), and a target 860. The switch 810, 820m or 830 may be an embodiment of the switch 120 in FIGS. 1 and 2, the switch 320 in FIG. 3, or the switch 420, 425, or 430 in FIG. 4. Each worker 840 or 850 may be an embodiment of the compute block 110 in FIG. 1, the worker 310 in FIG. 3, or the worker 410 or 415 in FIG. 4. The target 860 may be an embodiment of the compute block 110 in FIG. 1, the target 330 in FIG. 3, or the target 440 in FIG. 4. In the embodiments of FIGS. 8A-80, the workers 840A, 840B, 850A, and 850B are communicatively connected to the switch 820. The workers 840C, 840D, 850C, and 850D are communicatively connected to the switch 830. The switch 810 is communicatively connected to the switches 820 and 830 and the target 860.

The four workers 840 constitute a first communication group in the networked system 800. The four workers 850 constitute a second communication group in the networked system 800. Each communication group has a collective reduction operation independent from the collective reduction operation of the other communication group. For the collective reduction operation of each communication group, four packets from the four workers 840 or 850 can be aggregated (but not always) into a single packet, which will be available for target 860 to perform further computation. The collective reduction operation includes aggregations done by the switch 810, the switch 820, the switch 830, the target 860, or some combination thereof.

As shown in FIG. 8A, the switch 810 is associated with two CSN windows 813 and 817. The switch 820 is associated with two CSN windows 823 and 827. The switch 830 is associated with two CSN windows 833 and 837. The target 860 is associated with two CSN windows 863 and 867. The CSN window 813, 823, or 843 may be an embodiment of the CSN window 500 in FIG. 5. The CSN windows 813, 823, 833, and 863 can be used to track the progress of the collective reduction operation for the first communication group. The CSN windows 817, 827, 837, and 867 can be used to track the progress of the collective reduction operation for the second communication group. For the purpose of similarity and illustration, each CSN window includes three collective sequences that can be used for three collective reduction operation of the corresponding communication group. The first collective sequence in each CSN window having a CSN of zero is used for the collective reduction operation shown in FIGS. 8B-8O and is referred to as the active collective sequence. The second and third collective sequences may be used for future collective reduction operations and are referred to as subsequent collective sequences. Each collective sequence includes four bits for the four workers 840 or 850, respectively. As the switch 820 or 830 is not communicatively connected to all the workers 840 and 850, the bits for the workers that are not communicatively connected to the switch 820 or 830 are disabled in the corresponding CSN windows, which is shown by the dotted pattern in FIGS. 8A-8O.

In FIG. 8B, the workers 840A and 840B each send a packet to the switch 820. The worker 840D sends a packet to the switch 830. Each packet may include a header, an example of which is the header 600 in FIG. 6. The header includes a CSN (i.e., 0) for the collective reduction operation of the first communication group. The three packets may have the same CSN, which indicates that they are for the same collective sequence and the same collective reduction operation. The header also includes information identifying the worker 840 of the packet. Each packet also includes actual data in addition to the header. The actual data may be generated by the corresponding worker 840 through computation done by the worker 840, e.g., a deep learning operation in a layer of a DNN. The actual data is to be provided to the target 860 for further computation, e.g., another deep learning operation in the layer of the DNN or in the next layer of the DNN. The switch 820 updates the CSN window 823 by setting the two bits in CSN=0 for the workers 840A and 840B. As both of the two available bits in CSN=0 are set, the switch may close the collective sequence and advance the CSN window 823, and the open CSN range of the CSN window 823 may be changed to [1, 3]. The switch 830 updates the CSN window 833 by setting the bit in CSN=0 for the worker 840D.

Figure 8C:
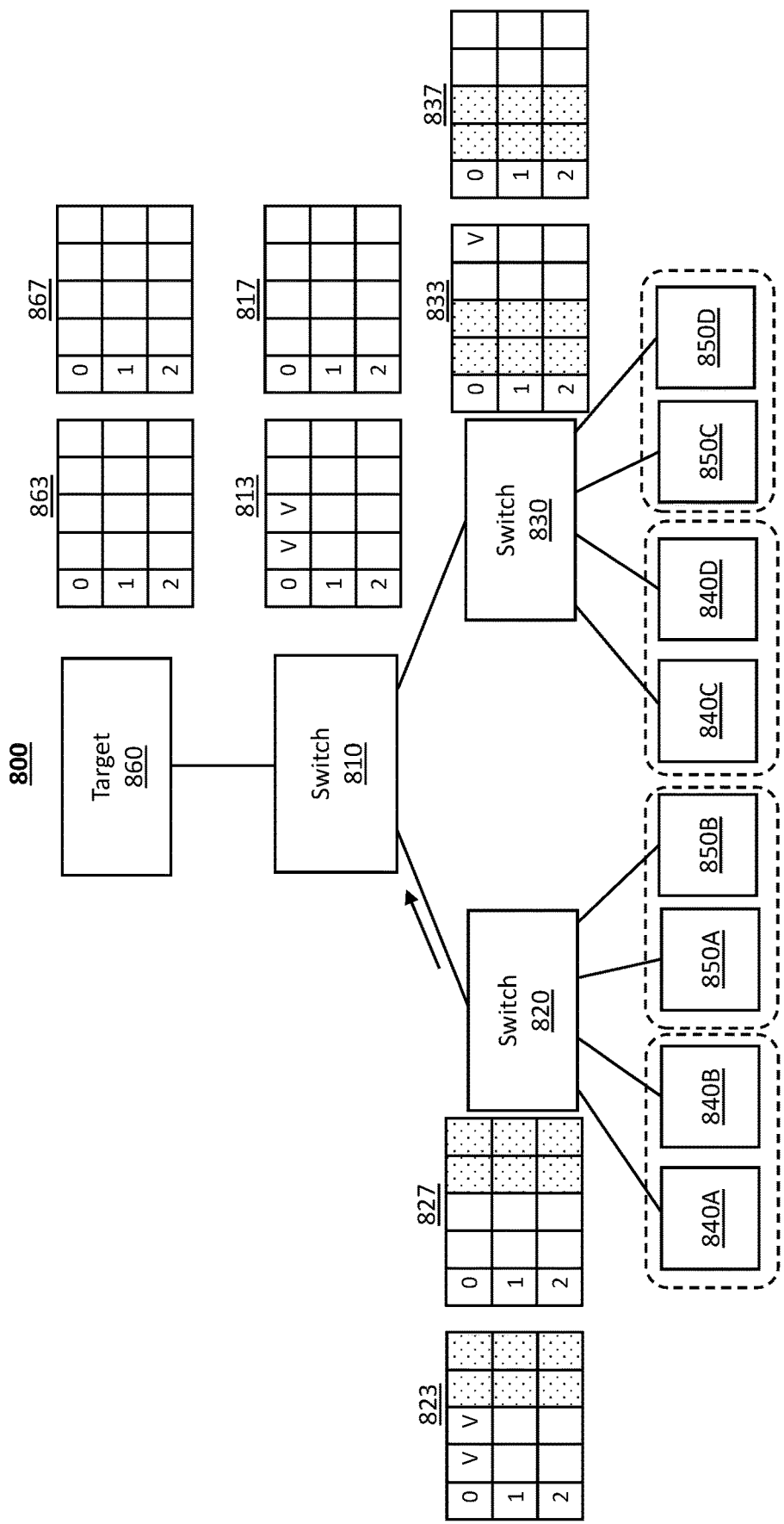

In FIG. 8C, the switch 820 forms an aggregated packet by combining the two packets. The aggregated packet is a partially aggregated packet for the first communication group as it does not have all the four packets for the first communication group, but is a fully aggregated packet for the switch 820 as the aggregated packet includes packets from both of the workers 850A and 850B that are connected to the switch 820. The switch 820 sends the aggregated packet to the switch 810. The switch 810 updates the CSN window 813 by setting the two bits in CSN=0 for the workers 840A and 840B.

Figure 8D:
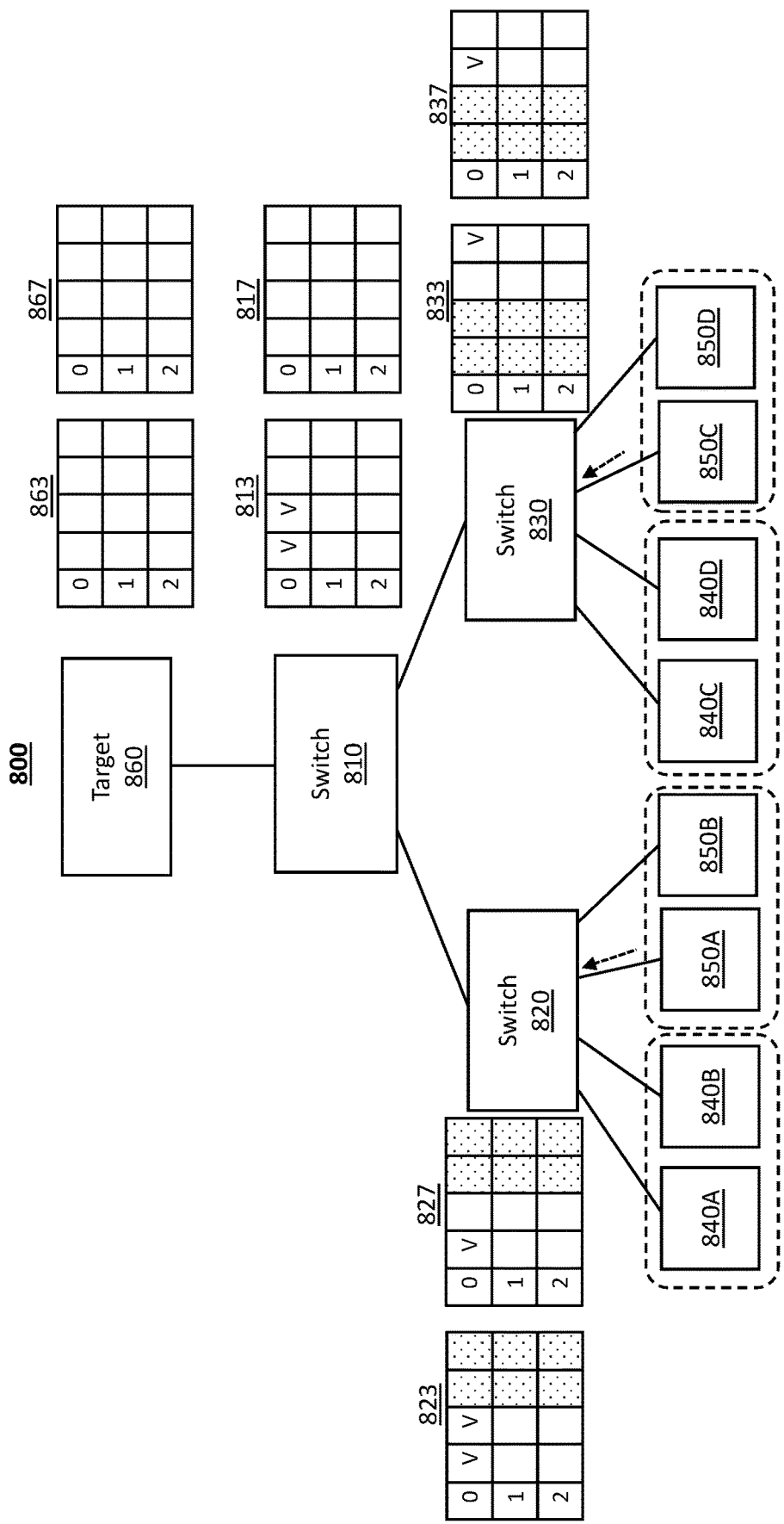

In FIG. 8D, the worker 850A, which is in the second communication group, sends a packet to the switch 820. The switch 820 updates the corresponding bit in the CSN window 827. The CSN window 827 functions independently from the CSN window 823, and the CSN window 823 is not changed in FIG. 8D. Also, the worker 850C in the second communication group sends a packet to the switch 830. The switch 830 updates the corresponding bit in the CSN window 837. The CSN window 837 functions independently from the CSN window 833, and the CSN window 833 is not changed in FIG. 8D.

Figure 8E:
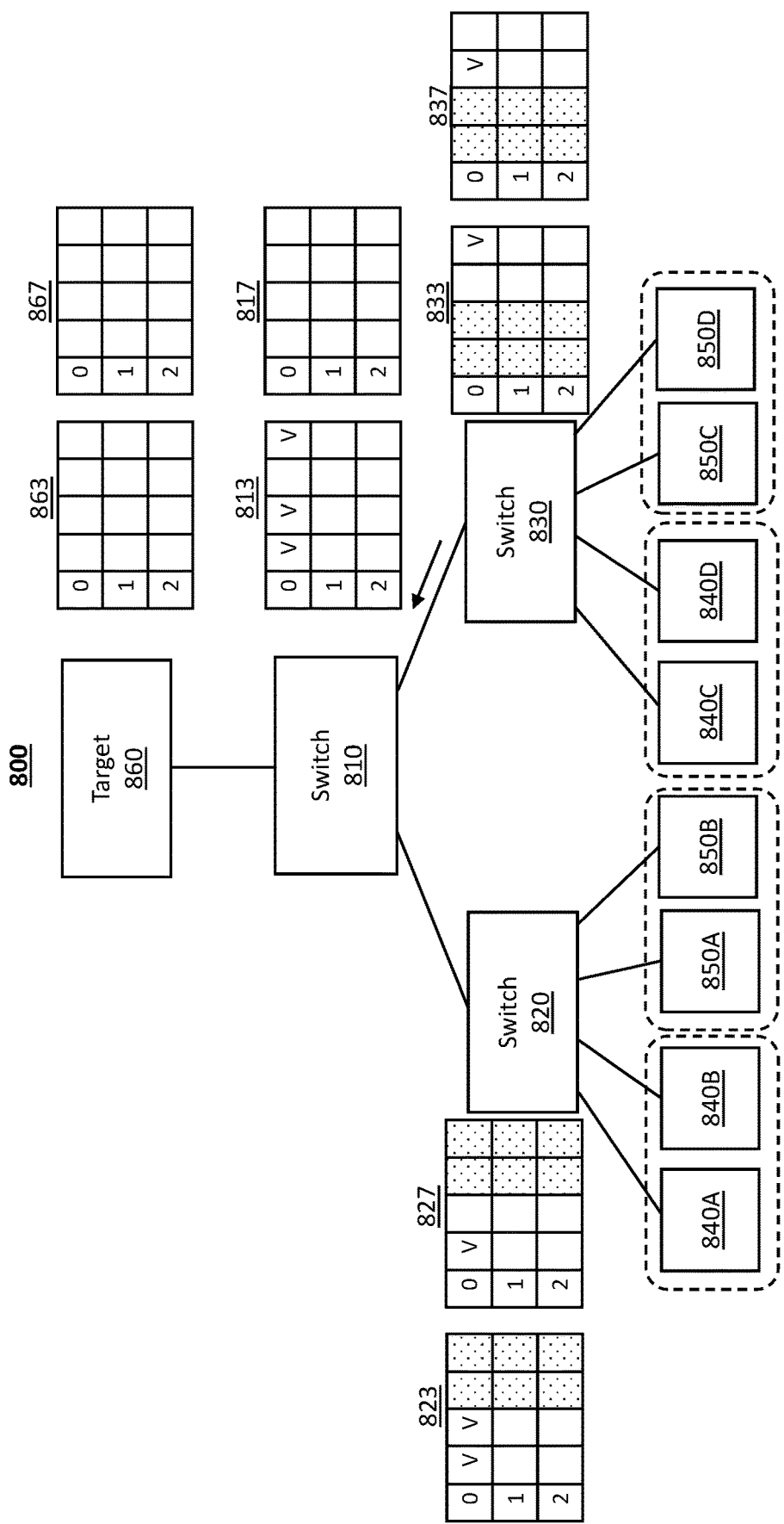

In FIG. 8E, the switch 830 sends a packet of the first communication group (i.e., the packet received from the worker 840D) to the switch 810 without aggregation. The reason why the packet is not aggregated within the switch 830 may be that the switch 830 does not have a free buffer for another packet or that a timer for the aggregation has passed. The switch 810, after receiving the packet, sets the corresponding bit in the CSN window 813.

Figure 8F:
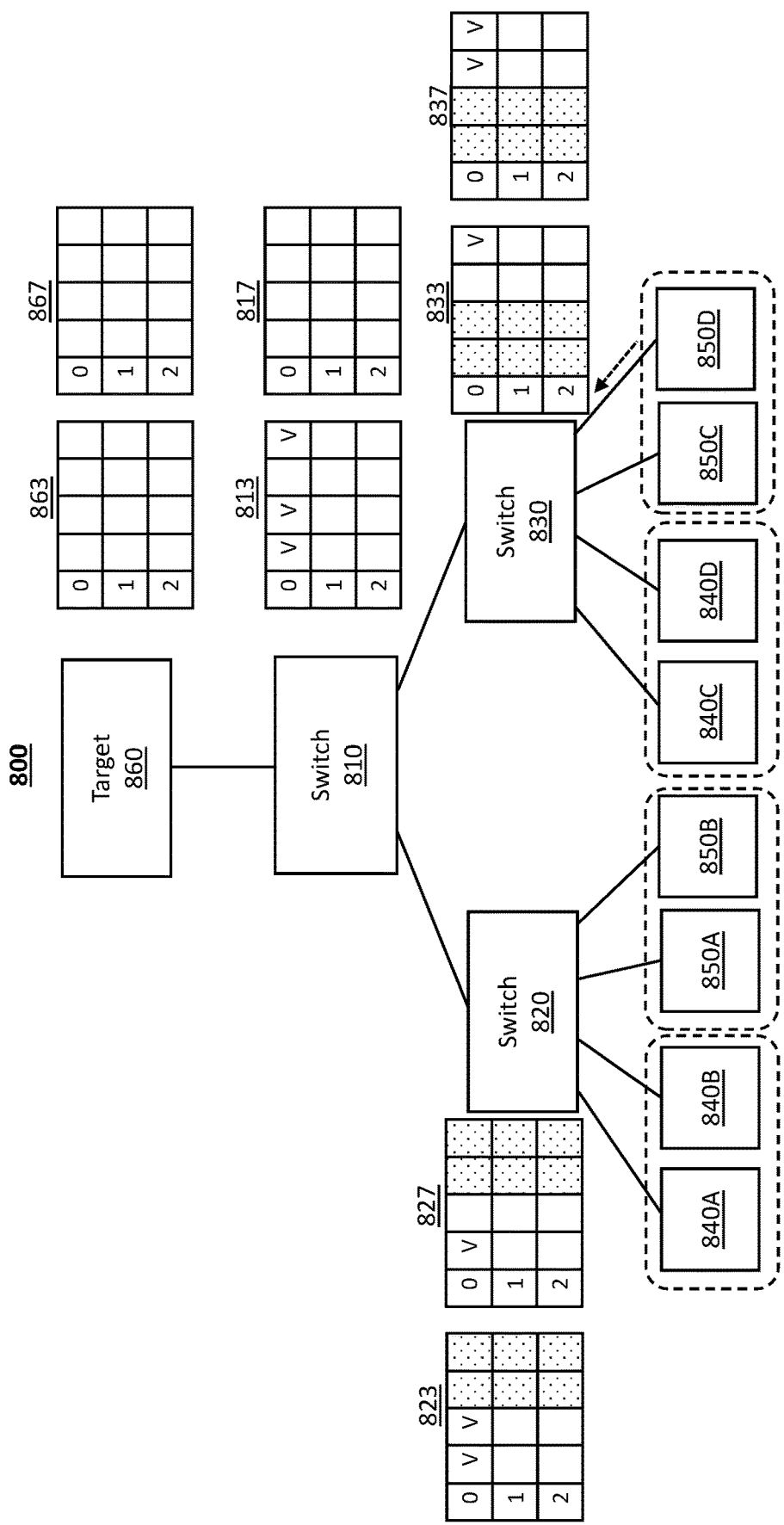

In FIG. 8F, the worker 850D sends a packet to the switch 830. The switch 830, after receiving the packet, sets the corresponding bit in the CSN window 837. As both of the two available bits in CSN=0 of the CSN window 837 are set, the switch may close the collective sequence and advance the CSN window 837, and the open CSN range of the CSN window 837 may be changed to [1, 3].

Figure 8G:
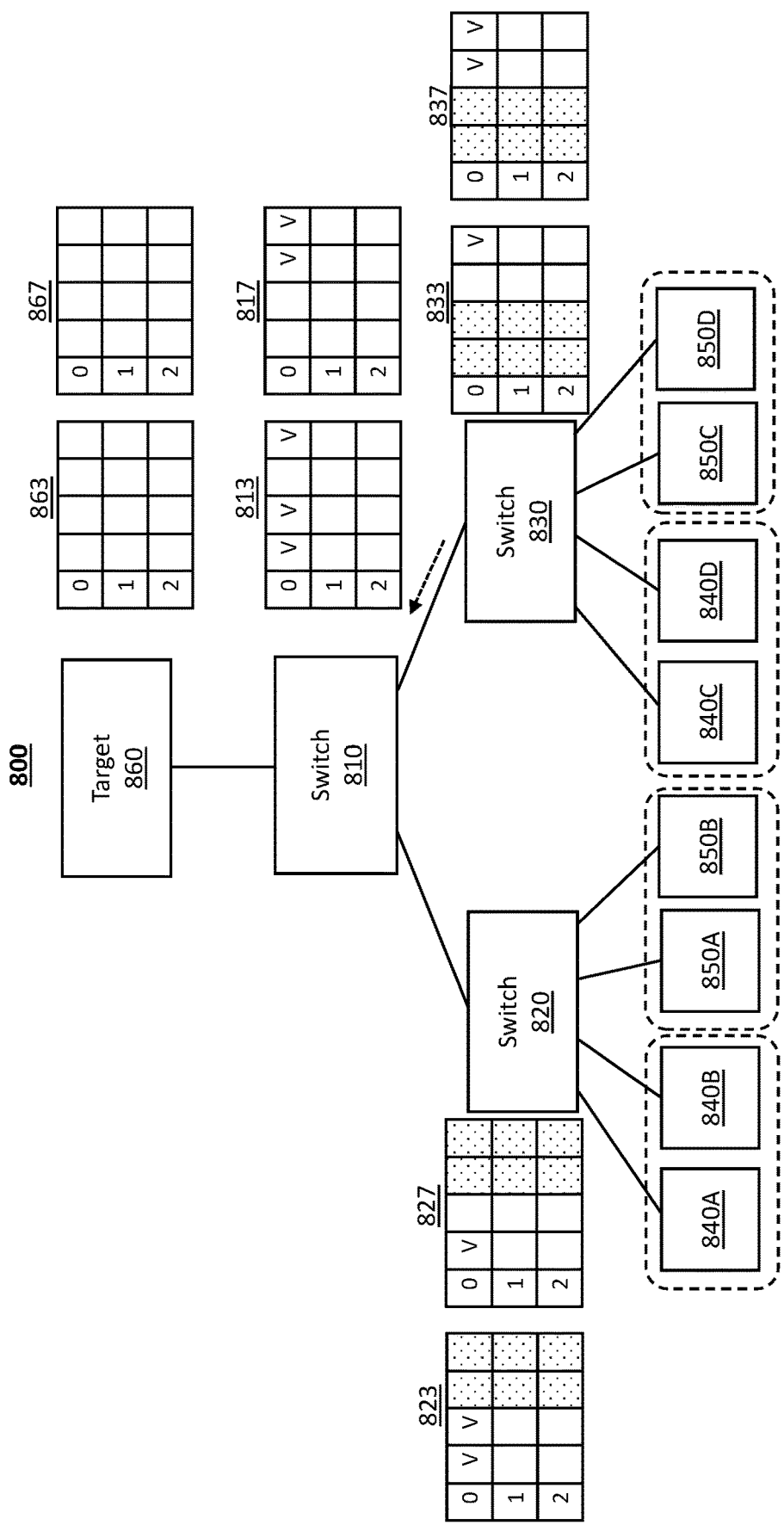

In FIG. 8G, the switch 830 aggregates the packet from the worker 850C with the packet from the worker 850D and generates an aggregate packet. The aggregated packet is a partially aggregated packet for the second communication group but a fully aggregated packet from the perspective of the switch 830. The switch 830 may generate a header for the aggregated packet, e.g., by updating the header in either worker's packet. The switch 830 sends the aggregated packet to the switch 810. After receiving the aggregated packet, the switch 810 sets the corresponding bits in the CSN window 817, while makes no change to the CSN window 813.

Figure 8H:
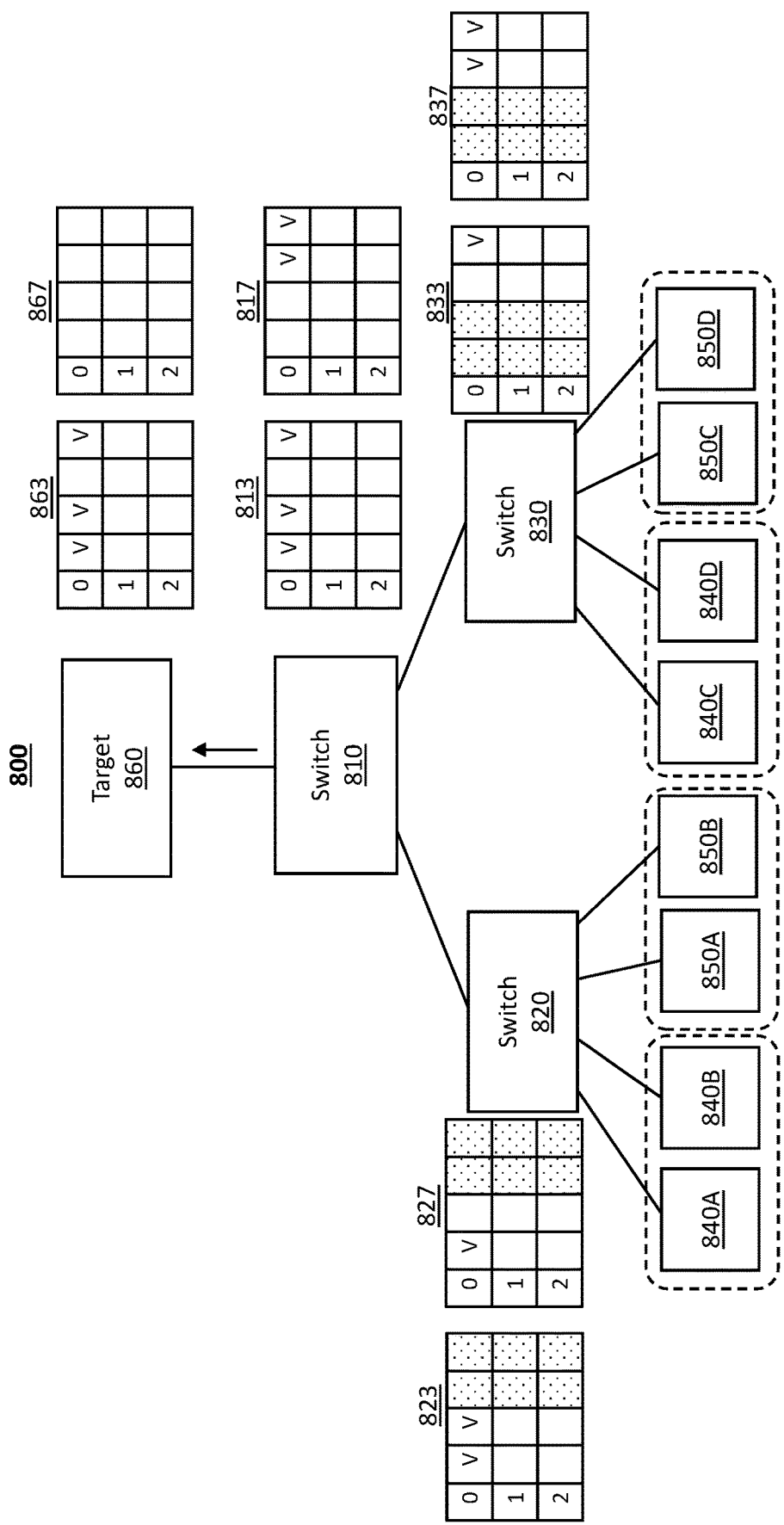

In FIG. 8H, the switch 810 generates an aggregated packet by aggregating the three packets of the first communication group: i.e., the packets from the workers 840A, 840B, and 840D. The aggregated packet is a partially aggregated packet for the first communication group and for the switch 810. The switch 810 sends the partially aggregated packet to the target 860. The reason why the switch 810 does not wait for the packet from the worker 840C to generate a fully aggregated packet may be that the switch 810 does not have a free buffer for another packet or that a timer for the aggregation has passed. The target 860 sets the corresponding bits in the CSN window 863 and makes no change to the CSN window 867.

Figure 8I:
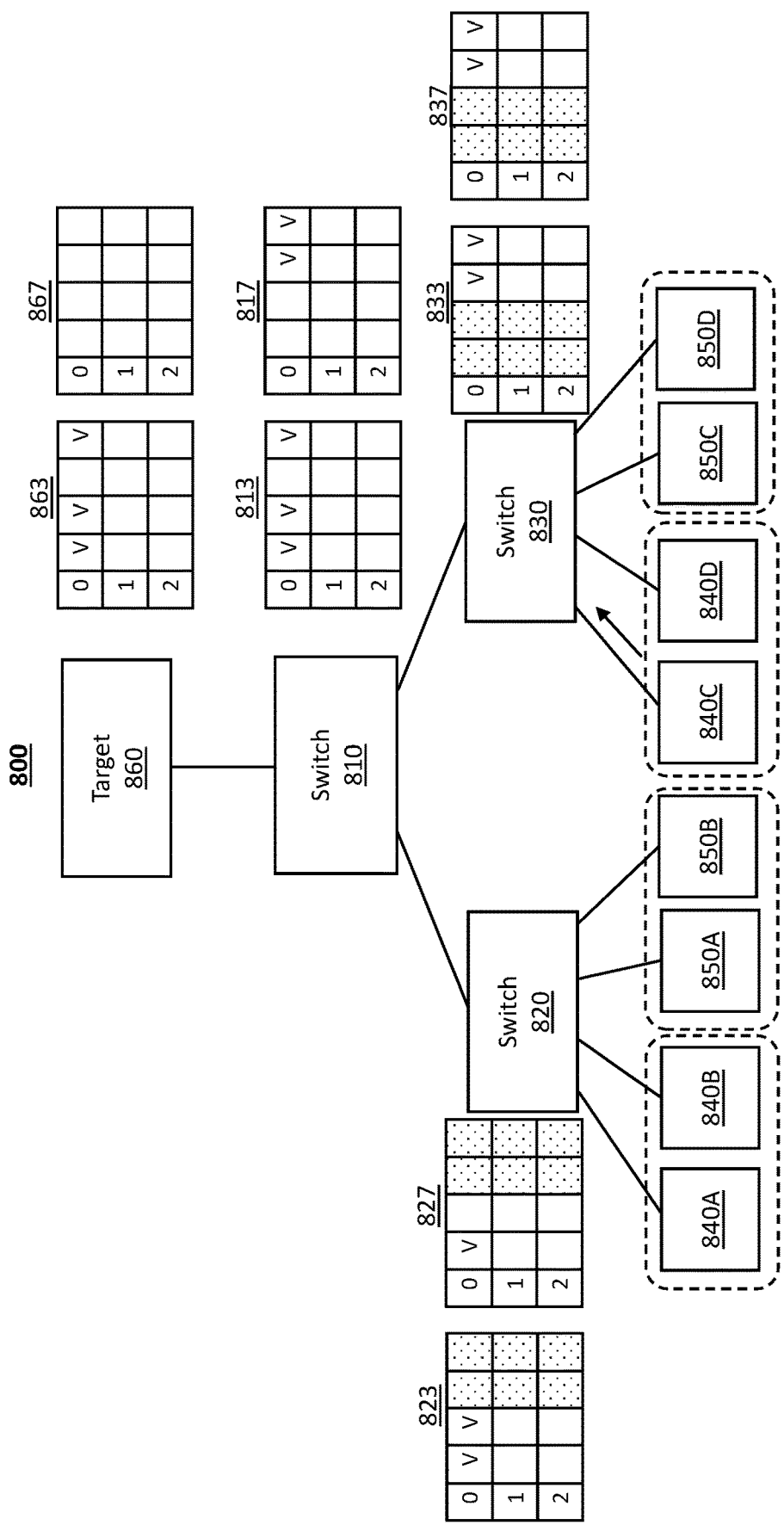

In FIG. 8I, the worker 840C sends its packet to the switch 830. The switch 830 sets the bit for the worker 840C in the active collective sequence in the CSN window 833. The switch 830 may have closed the active collective sequence since the packet from the other worker 840D in the same communication group that is in communication with the switch 820 has been forward to the switch 810. As both of the two available bits in CSN=0 of the CSN window 833 are set, the switch may close the collective sequence and advance the CSN window 833, and the open CSN range of the CSN window 833 may be changed to [1, 3].

Figure 8J:
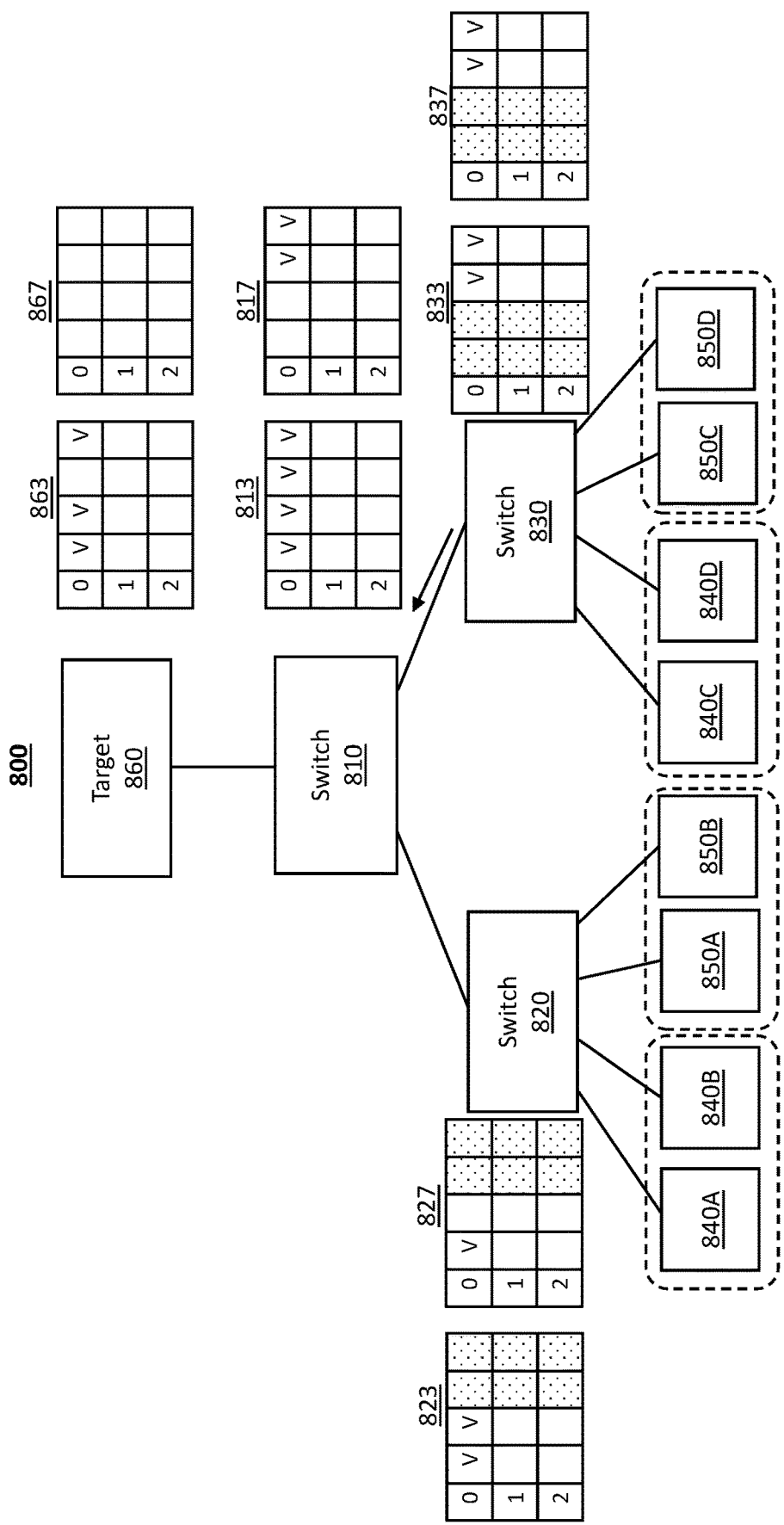

In FIG. 8J, the switch 830 sends the packet from the worker 840C to the switch 810. The switch 180 updates the corresponding bit in the CSN window 813. As all the four bits in CSN=0 of the CSN window 813 are set, the switch may close the collective sequence and advance the CSN window 813, and the open CSN range of the CSN window 813 may be changed to [1, 3].

Figure 8K:
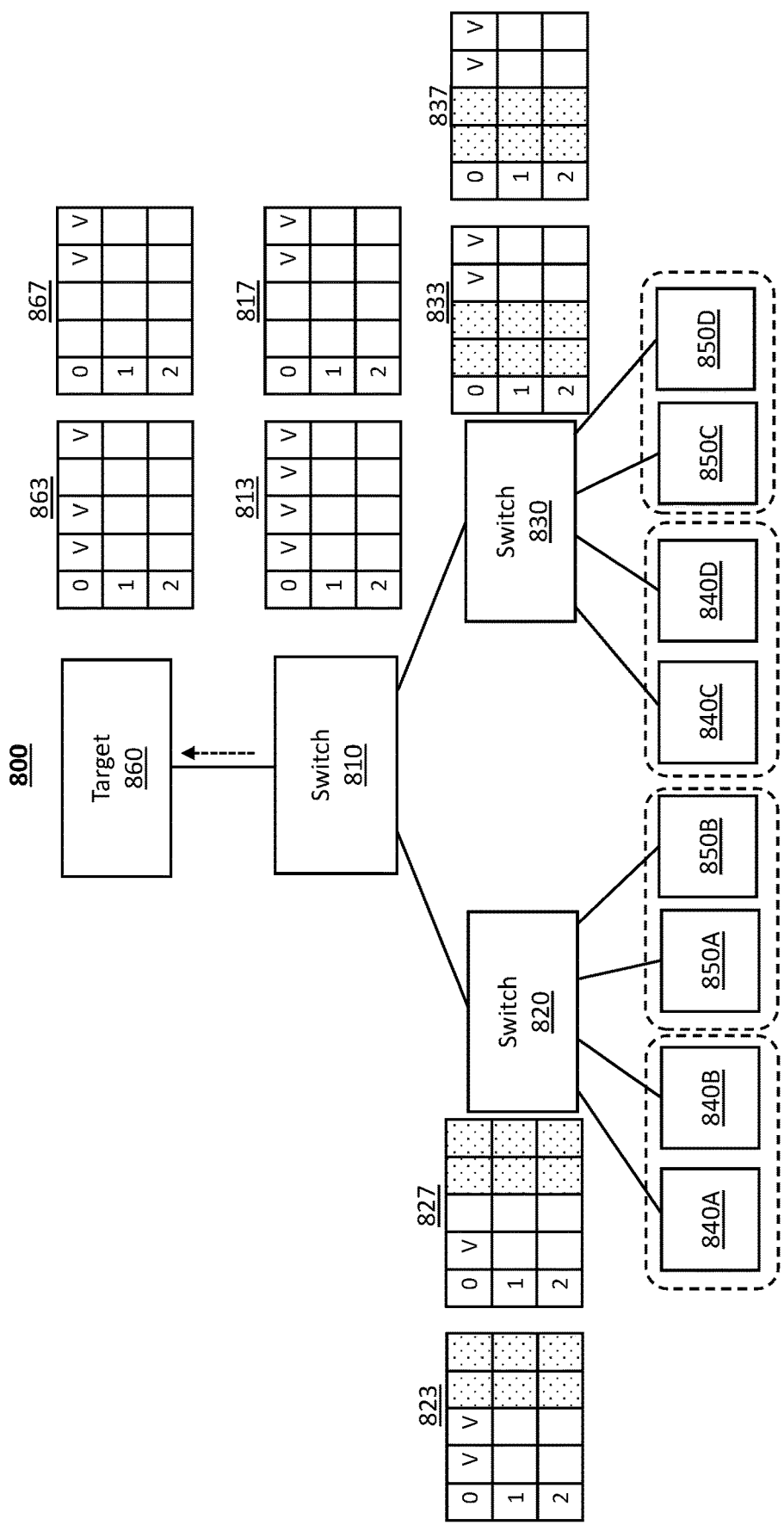

In FIG. 8K, the switch 810 generates a partially aggregated packet by aggregating the two available packets of the second communication group: i.e., the packets from the workers 850C and 850D. The switch 810 sends the partially aggregated packet to the target 860. The reason why the switch 810 does not wait for the packet from the worker 850A or 850B for further aggregation may be that the switch 810 does not have a free buffer for another packet or that a timer for the aggregation has passed. The target 860 sets the corresponding bits in the CSN window 867 and makes no change to the CSN window 863.

Figure 8L:
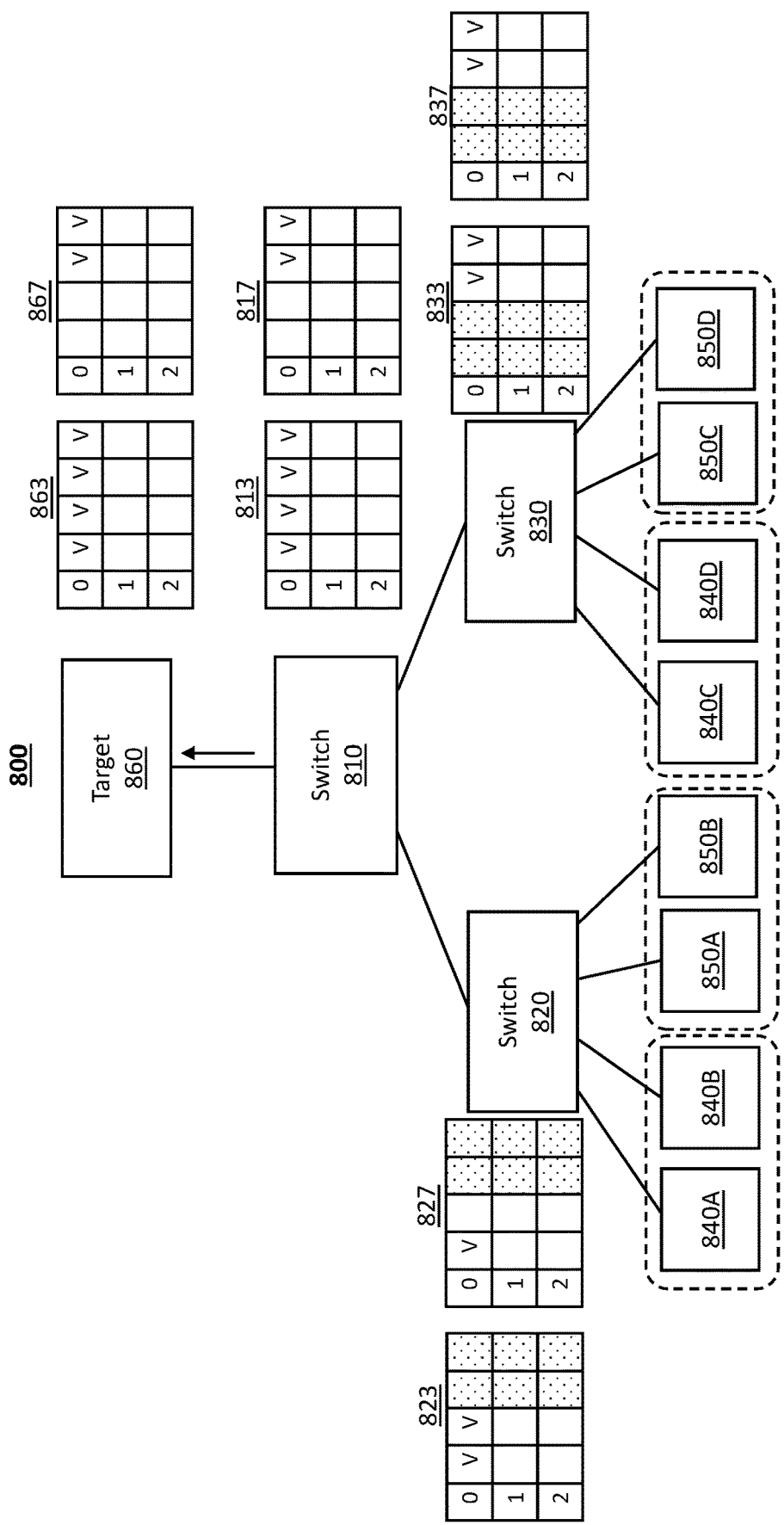

In FIG. 8L, the switch 810 sends the packet from worker 840D to the target 860. This packet is not an aggregated packet. The target sets the corresponding bits in the CSN window 863 after receiving the packet. As all the four bits in CSN=0 of the CSN window 863 are set, the switch may close the collective sequence and advance the CSN window 863, and the open CSN range of the CSN window 863 may be changed to [1, 3]. The target 860 may further aggregate the packet with the partially aggregated packet of the first communication group to form a fully aggregated packet of the first communication group. The fully aggregated packet includes data from all the four workers 840 in the first communication group. The aggregation at the target 860 can reduce the computation load of the target 860 since the target 860 can now compute one packet (i.e., the fully aggregated packet) as opposed two packets (i.e., the packet from worker 840D and the partially aggregated packet from the switch 810).

Figure 8M:
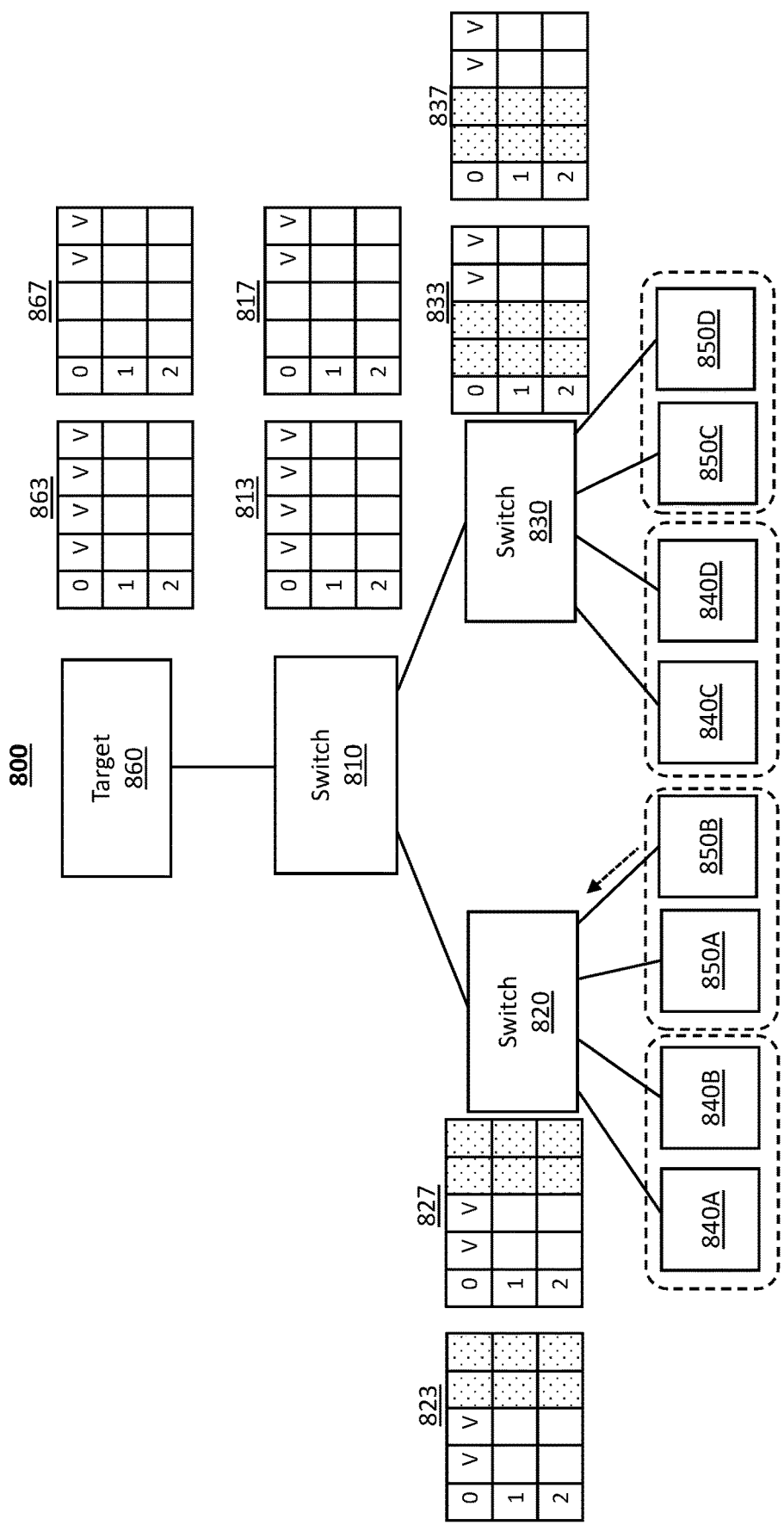

In FIG. 8M, the worker 850B sends a packet to the switch 820. The switch 820, after receiving the packets, sets the corresponding bit in the CSN window 827. As both of the two available bits in CSN=0 of the CSN window 827 are set, the switch may close the collective sequence and advance the CSN window 827, and the open CSN range of the CSN window 827 may be changed to [1, 3]. The switch 820 may store the packet in buffer. The switch 820 may also generate an aggregated packet by combining the packet from the worker 850B with the packet previously received from the worker 850A. The aggregated packet is a partially aggregated packet for the second communication group but a fully aggregated packet for the switch 820.

Figure 8N:
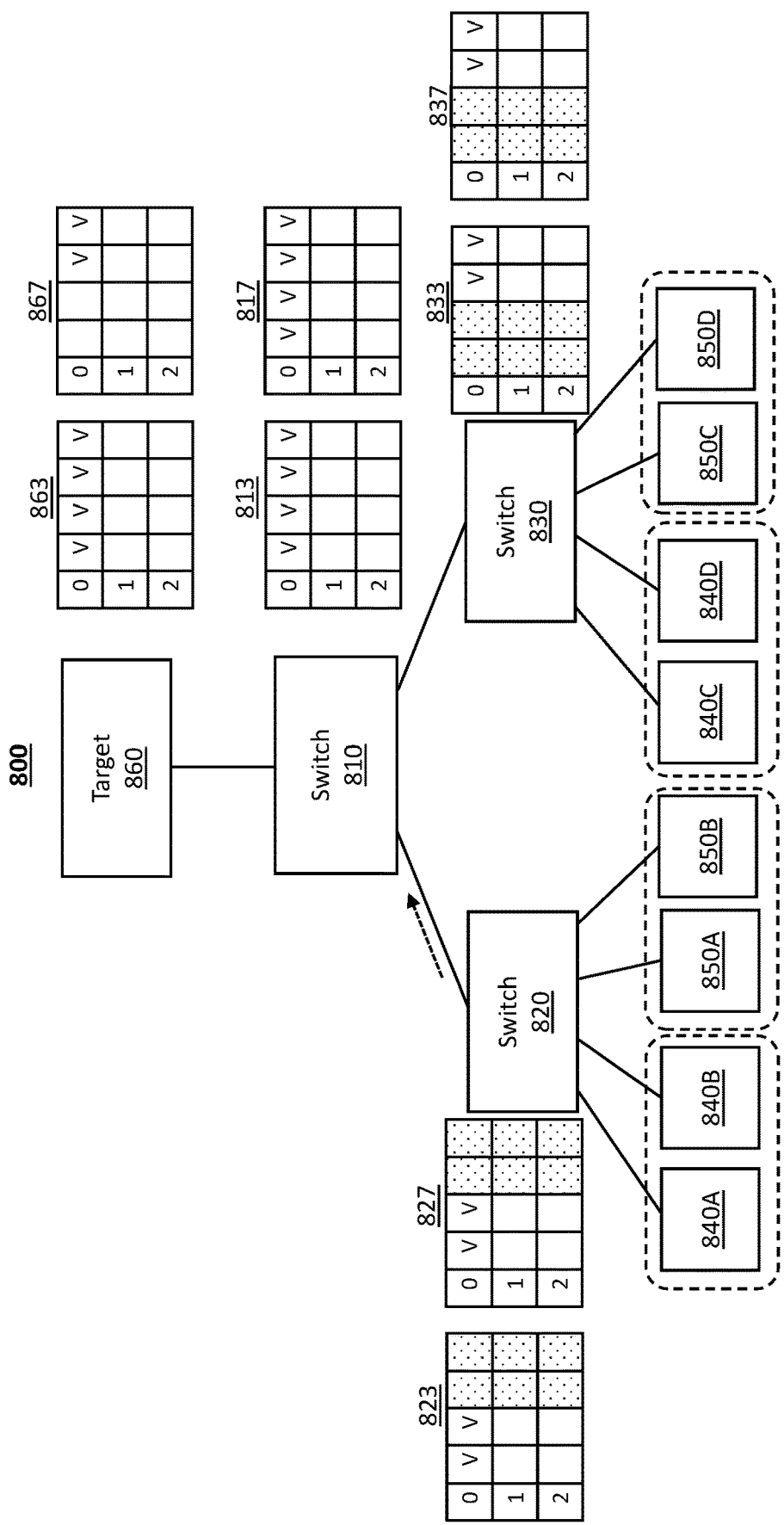

In FIG. 8N, the switch 820 sends the aggregated packet for the second communication group to the switch 810. After receiving the aggregated packet, the switch 810 sets the two bits for the workers 850A and 850B in the CSN window 817. As the aggregated packet including data from the workers 850C and 850D was sent to the target 860, the switch 810 will not generate a fully aggregated packet for the second communication group. As all the four bits in CSN=0 of the CSN window 817 are set, the switch may close the collective sequence and advance the CSN window 817, and the open CSN range of the CSN window 817 may be changed to [1, 3].

Figure 8O:
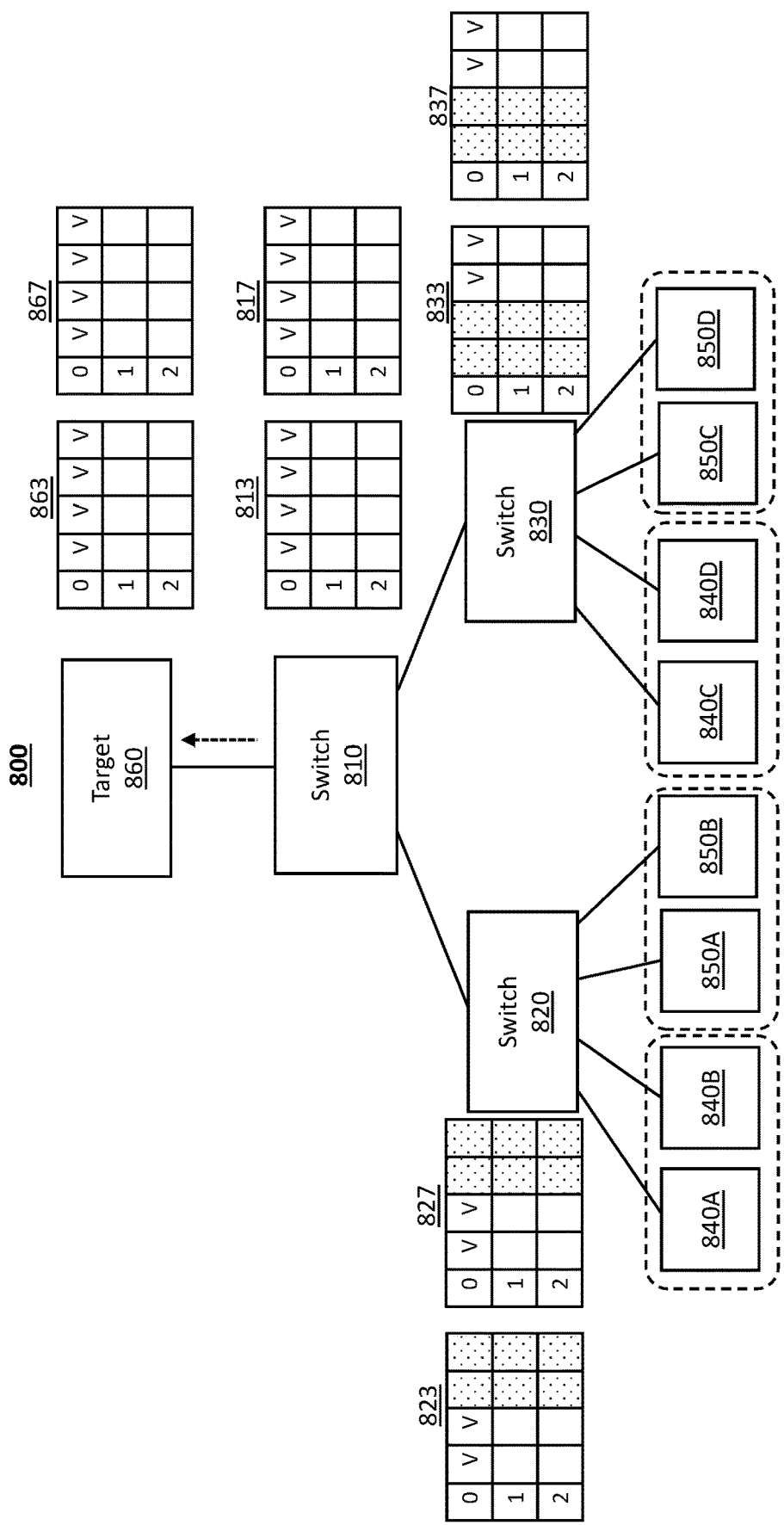

In FIG. 8O, the switch 810 forwards the aggregated packet from the switch 820 to the target 860. The target 860 sets the bits for the workers 850A and 850B in the CSN window 867. As all the four bits in CSN=0 of the CSN window 867 are set, the switch may close the collective sequence and advance the CSN window 867, and the open CSN range of the CSN window 867 may be changed to [1, 3]. Even though not shown in FIGS. 8A-8O, the target can issue an acknowledgement every time after it receives a packet from the switch 810. The switch 810 can process the acknowledgement and send corresponding acknowledgement(s) to the switch 820, 830, or both. The switch 820 or 830 can process acknowledgements from the switch 810 and send corresponding acknowledgements to the workers 840 and 850 that the switch 820 or 830 is in communication with. The acknowledgments can prevent timeout from occurring at the workers 840 and 850 to avoid duplicated transmission of same packets from the workers 840 and 850. It can avoid unnecessary bandwidth requirement or computation load of the switches 820 and 830.

Example Reduction Flow

Figure 9:
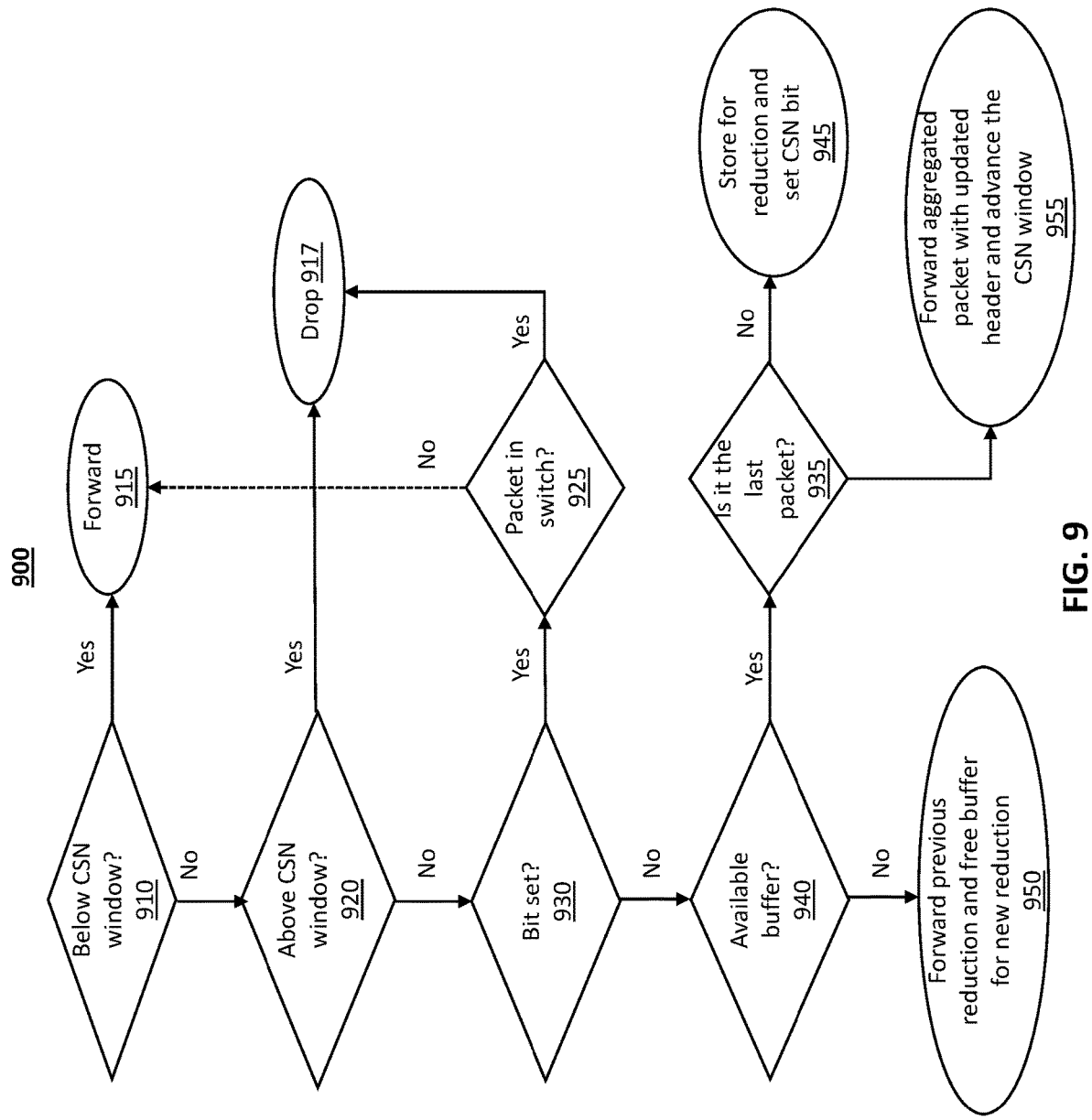
FIG. 9 illustrates a flowchart showing a reduction flow within a switch, in accordance with various embodiments.

FIG. 9 is a flowchart showing a reduction flow 900 within a switch, in accordance with various embodiments. The switch may be a switch 120 in FIG. 1, the switch 320 in FIG. 3, the switch 420, 425 or 430 in FIG. 4, the switch 710 or 720 in FIGS. 7A-7G, or the switch 810, 820, or 830 in FIGS. 8A-8O. Although the reduction flow 900 is described with reference to the flowchart illustrated in FIG. 9, many other reduction flows may alternatively be used. For example, the order of execution of the steps in FIG. 9 may be changed. As another example, some of the steps may be changed, eliminated, or combined. The reduction flow 900 may start after the switch receives a packet from a worker. The switch determines whether to aggregate the packet with one or more other packets.

In Step 910, the switch determines whether a CSN in the packet (e.g., in the header of the packet) is below a CSN window. The switch may maintain the CSN window for a communication group to perform collective reduction operations for the communication group. The CSN window may include a fixed number of collective sequences at a time, each of which can be identified by a different CSN. The switch may perform one or more aggregation for each CSN, such as one aggregation to generate a fully aggregated packet or multiple aggregations to generate multiple partially aggregated packets.

A collective sequence includes bits corresponding to workers in the communication group. After the switch receives a packet from a worker, the switch can set the bit of the worker. The collective sequence may be completed after all the bits in the collective sequence have been set. The collective sequences in the CSN window can be different at different times. The switch may determine whether the CSN of the received packet fall into the open CSN range of the CSN window. The open CSN range is the range of the CSNs of the open collective sequences that are present in the CSN window. The CSN range may change with time as the CSN window is dynamic. For instance, the open CSN range may be [0, 5] for a CSN window having a size of 6, then change to [1, 6] after the first collective sequence is closed. The switch may determine whether the packet CSN is below the CSN window by determining whether the packet CSN is below the open CSN range of the CSN window. For instance, the switch may determine whether the packet CSN is less than the CSN of the first open collective sequence of the CSN window.

In embodiments where the packet includes a CSN that is below the CSN window (e.g., the packet CSN is below the open CSN range), the switch forwards the packet to the next hop in Step 915. This can avoid the packet being aggregated multiple times. After the bit of the packet has been set, the switch will not aggregate the packet. The packet will either be forwarded to the next hop without aggregation or be dropped by the switch.

In embodiments where the packet includes a CSN that is not below the CSN window, the switch determines whether the CSN in the packet is above the CSN window in Step 920, e.g., by determining whether the packet CSN is above the open CSN range. The switch may determine whether the packet CSN is greater than the CSN of the last open collective sequence of the CSN window. The CSN in the received packet should not be above the open CSN range as the workers know the open CSN range in advance and should not put a higher CSN in any packets. In embodiments where the switch determines that the CSN in the received packet is above the open CSN range, the switch may determine that an error has occurred. The switch drops the packet in Step 917, meaning the switch does not store the packet in the buffer, does not aggregate the packet, and does not forward the packet to the next hop.

In embodiments where the switch determines that the CSN in the received packet is not above the CSN window size, the switch further determines whether the bit corresponding to the worker from which the packet was received has been set in Step 930. The switch sets a bit corresponding to a worker after it receives a packet from the worker. The bit is in the collective sequence having the CSN in the packet. In embodiments where the bit has been set, the switch had received the packet. The switch then determines whether the packet is in the switch in Step 925. For instance, the switch determines whether it is in the buffer as an individual packet or as a part of an aggregated packet. After determining that the packet is in the switch, the switch drops the packet in Step 917 as the switch does not need another copy of the packet. After determining that the packet is not in the switch, the switch forwards the packet to the next hop in Step 925. The reason why the switch selects not to aggregate the packet may be that the switch selects to avoided aggregating the same packet multiple times.

In embodiments where the bit has not been set, the switch determines whether the buffer is available to store the packet in Step 940. For instance, the switch determines whether the free storage in the buffer is sufficient for the packet. The switch may compare the size of the packet with the size of the free storage in the buffer.

After determining that the buffer is not available, the switch forwards previous reduction and frees buffer for new reduction in Step 950. The previous reduction may be an aggregated packet that the switch has generated by aggregating packets received by the switch before the switch received the packet.

In embodiments where the buffer is available, the switch determines whether the packet is the last packet in Step 935. For instance, the switch determines whether the other bits in the current collective sequence have been set. The switch may determine that the packet is the last packet based on a determination that the other bits have been set. In some embodiments, the switch can perform reduction operations in a reproducible manner, e.g., the switch may perform the aggregation in a predetermined order. For instance, the switch may have a plurality of buffers, each of which may be able to store a packet at a time. The switch may aggregate packets in the predetermined order. After the aggregation, the buffers that store the packets can be depleted and become available to store other packets. In Step 935, the switch may determine whether the packet is the last packet by determining whether the packet is the last packet in the predetermined order.

In embodiments where the packet is not the last packet, the switch stores the packet for reduction and sets the CSN bit in Step 945. The switch may aggregate the packet with one or more other packets at a later time, e.g., after the switch receives one or more other packets including the same CSN. In some embodiments (e.g., embodiments in which the switch aggregates in the reproducible manner), these packets may be stored in different buffers. A buffer may have the capacity to store a packet at a time. Buffer depletion may occur faster compared with using a single buffer for all the packets. The management of the buffers may be deployed in an upper layer to avoid buffer oversubscription at the switch. The switch may perform aggregation in the predetermined order for aggregation. In embodiments where the packet is the last packet, the switch aggregates the packets in the buffer and forwards the aggregated packet with updated header in Step 955. The aggregated packet includes the data in the packet and data in one or more other packets including the same CSN as the packet. The header in the packet may identify the worker that generated the packet. The switch updates the header in the aggregated packet. The switch also advances the CSN window in Step 955 and updates the open collective sequences in the CSN window.

Example Method of in-Network Computing

Figure 10:
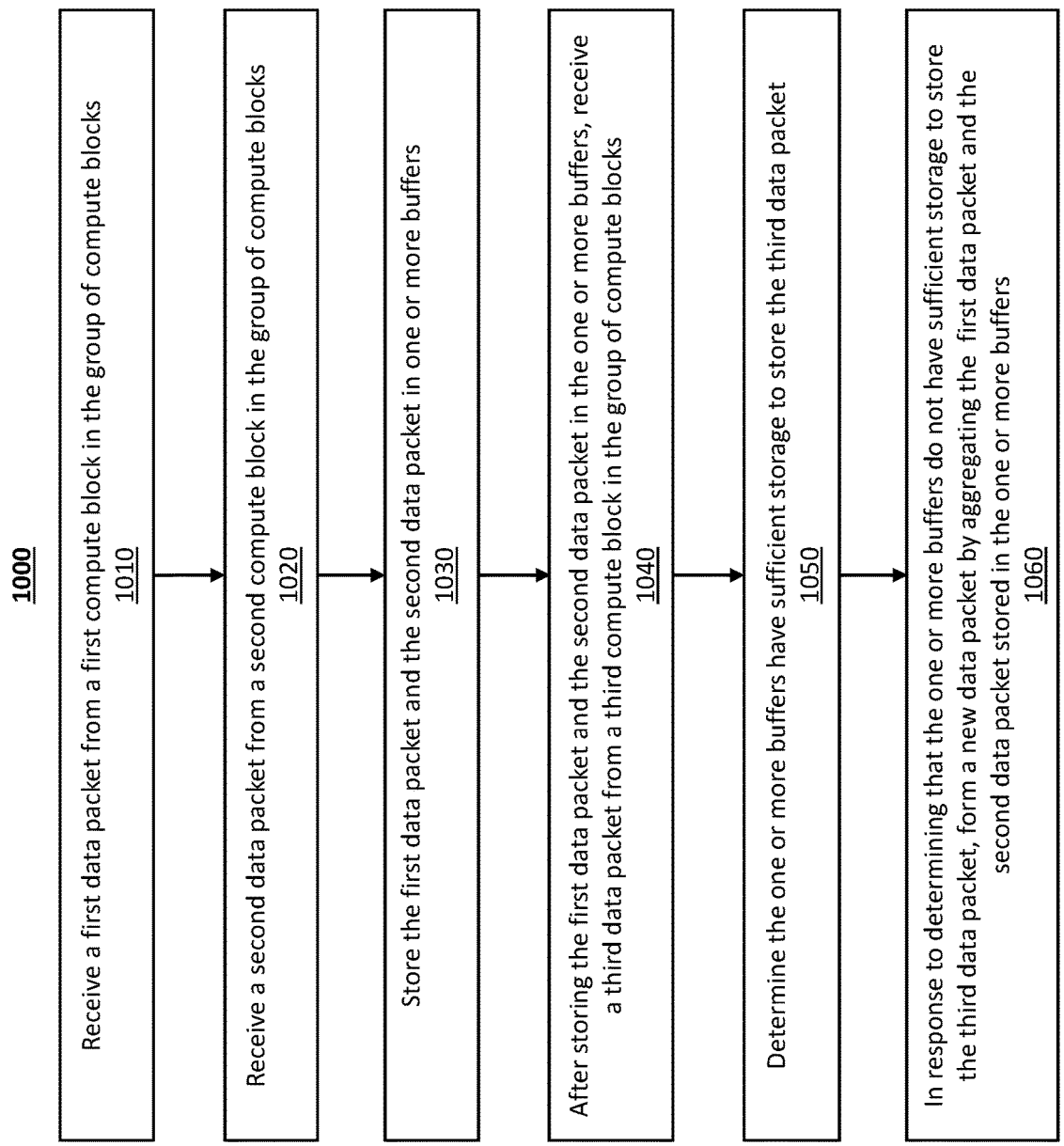
FIG. 10 is a flowchart showing a method of in-network computing, in accordance with various embodiments.

FIG. 10 is a flowchart showing a method 1000 of in-network computing, in accordance with various embodiments. The method 1000 may be performed by a switch 120 in FIG. 1. Although the method 1000 is described with reference to the flowchart illustrated in FIG. 10, many other methods for in-network computing may alternatively be used. For example, the order of execution of the steps in FIG. 10 may be changed. As another example, some of the steps may be changed, eliminated, or combined.

The switch 120 receives 1010 a first data packet from a first compute block in the group of compute blocks. The switch 120 is coupled to a group of compute blocks and TO a target compute block. The switch 120 receives 1020 a second data packet from a second compute block in the group of compute blocks. In some embodiments, the group of compute blocks constitute a communication group in a networked system, such as the networked system 300, 400, 700, or 800. In a computation cycle of the communication group, each compute block in the communication group may generate a data packet and send the data packet to the switch 120. The switch 120 may perform one or more collective reduction operations on the data packets.

The switch 120 stores 1030 the first data packet and the second data packet in one or more buffers associated with the switch. In some embodiments, the one or more buffers are at the switch, e.g., the buffers may be located in the switch. In some embodiments, a buffer may store a data packet at a time. The switch 120 may store the first data packet and the second data packet in two buffers, respectively. In other embodiments, a buffer may store multiple data packets at a time. The number of buffers associated with the switch 120 may be limited. The storage capacity of the one or more buffers may be limited.

After storing the first data packet and the second data packet in the one or more buffers, the switch 120 receives 1040 a third data packet from a third compute block in the group of compute blocks.

The switch 120 determines 1050 whether the one or more buffers have sufficient storage to store the third data packet. In some embodiments (e.g., embodiments where a buffer can store one data packet at a time), the switch 120 may determine whether there is at least one free buffer. A free buffer may be a buffer that does not store any data packet at the time.

In response to determining that the one or more buffers do not have sufficient storage to store the third data packet, the switch 120 forms 1060 a new data packet by aggregating the first data packet and the second data packet stored in the one or more buffers. The new data packet does not include data in the third data packet. As there is no available buffer storage for the third data packet, the switch 120 may forward the third data packet to the next hop, e.g., the target compute block or another switch communicatively coupled to the switch, without storing or aggregating the third data packet. The new data packet may be a partially aggregated data packet, it may include no data from all the data packets of the group of compute blocks. The new data packet may be transmitted to the target compute block.

In some embodiments, in response to determining that the one or more buffers have sufficient storage to store the third data packet, the switch 120 stores the third data packet in the one or more buffers. The switch 120 aggregates the first data packet, the second data packet, and the third data packet stored in the one or more buffers to form an aggregated data packet, which may be a fully aggregated data packet.

In some embodiments, in response to determining that the one or more buffers have sufficient storage to store the third data packet, the switch 120 determines whether the third data packet is a last data packet for the group of compute blocks. In response to determining that the third data packet is the last data packet, the switch 120 forms an aggregated data packet for the group of compute blocks. The aggregated data packet may be transmitted to the target compute block or another switch communicatively coupled to the switch. The switch 120 may determine whether the third data packet is the last data packet by determining whether all bits in a collective sequence for the group of compute blocks are set. The collective sequence comprises a plurality of bits, each of which corresponding to a respective compute block in the group of compute blocks and is set after a data packet is received from the respective compute block.

In some embodiments, the switch 120 maintains a collective sequence that comprises a plurality of bits, each of which corresponding to a respective compute block in the group of compute blocks. After receiving the first data packet or the second data packet, the switch 120 may set a bit in the collective sequence based on a determination that a CSN in the first data packet or the second data packet matches a CSN of the collective sequence and that the bit corresponds to the first compute block or the second compute block. The CSN in the data packet may be in a header of the data packet. The header may further include a field identifying the first compute block or the second compute block. The switch 120 may update the field in the header after forming the new data packet. The switch 120 may maintain another collective sequence that comprises another plurality of bits, each of which corresponding to a respective compute block in another group of compute blocks that is coupled to the switch. The other group of compute blocks may be another communication group in the networked system that includes the group of compute blocks.

The switch 120 may receive a data packet and determine whether a CSN in the data packet is lower than a CSN of the collective sequence. In response to determining that the CSN in the data packet is lower than the CSN of the collective sequence, the switch 120 may transmit the data packet to the target compute block or to another switch coupled to the target compute block. The data packet is not aggregated with any other data packet before it is transmitted to the target compute block or to the other switch.

In some embodiments, the switch 120 may determine whether a CSN in the data packet is greater than a CSN of the collective sequence. In response to determining that the CSN in the data packet is greater than the CSN of the collective sequence, the switch 120 may disregarding the data packet.

In some embodiments, after receiving a data packet, the switch 120 may determine whether a bit in the collective sequence has been set. The bit corresponds to the compute block. In response to determining that the bit has been set, the switch 120 may determine whether the data packet is stored in the one or more buffers. In response to determining that the data packet is not stored in the buffer, the switch 120 may transmit the data packet to the target compute block or to another switch coupled to the target compute block.

Example DNN

Figure 11:
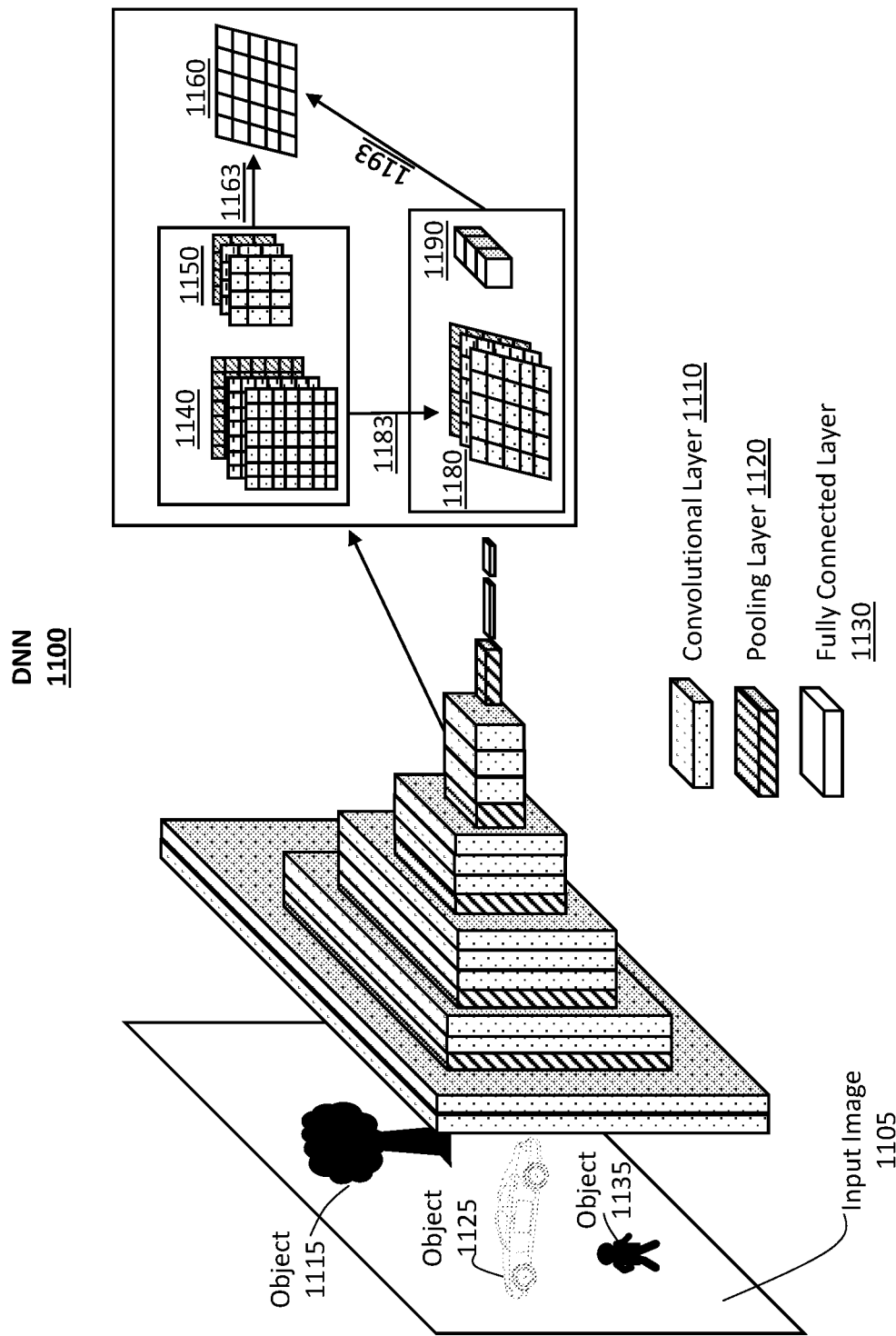
FIG. 11 illustrates an example deep neural network (DNN), in accordance with various embodiments.

FIG. 11 illustrates an example DNN 1100, in accordance with various embodiments. For purpose of illustration, the DNN 1100 in FIG. 11 is a CNN. In other embodiments, the DNN 1100 may be other types of DNNs. The DNN 1100 is trained to receive images and output classifications of objects in the images. In the embodiments of FIG. 11, the DNN 1100 receives an input image 1105 that includes objects 1115, 1125, and 1135. The DNN 1100 includes a sequence of layers comprising a plurality of convolutional layers 1110 (individually referred to as "convolutional layer 1110"), a plurality of pooling layers 1120 (individually referred to as "pooling layer 1120"), and a plurality of fully connected layers 1130 (individually referred to as "fully connected layer 1130"). In other embodiments, the DNN 1100 may include fewer, more, or different layers. In an inference of the DNN 1100, the layers of the DNN 1100 execute tensor computation that includes many tensor operations, such as convolution (e.g., multiply-accumulate (MAC) operations, etc.), pooling operations, elementwise operations (e.g., elementwise addition, elementwise multiplication, etc.), other types of tensor operations, or some combination thereof.

The convolutional layers 1110 summarize the presence of features in the input image 1105. The convolutional layers 1110 function as feature extractors. The first layer of the DNN 1100 is a convolutional layer 1110. In an example, a convolutional layer 1110 performs a convolution on an input tensor 1140 (also referred to as input feature map (IFM) 1140) and a filter 1150. As shown in FIG. 11, the IFM 1140 is represented by a 7×7×3 three-dimensional (3D) matrix. The IFM 1140 includes 3 input channels, each of which is represented by a 7×7 two-dimensional (2D) matrix. The 7×7 2D matrix includes 7 input elements (also referred to as input points) in each row and 7 input elements in each column. The filter 1150 is represented by a 3×3×3 3D matrix. The filter 1150 includes 3 kernels, each of which may correspond to a different input channel of the IFM 1140. A kernel is a 2D matrix of weights, where the weights are arranged in columns and rows. A kernel can be smaller than the IFM. In the embodiments of FIG. 11, each kernel is represented by a 3×3 2D matrix. The 3×3 kernel includes 3 weights in each row and 3 weights in each column. Weights can be initialized and updated by backpropagation using gradient descent. The magnitudes of the weights can indicate importance of the filter 1150 in extracting features from the IFM 1140.

The convolution includes MAC operations with the input elements in the IFM 1140 and the weights in the filter 1150. The convolution may be a standard convolution 1163 or a depthwise convolution 1183. In the standard convolution 1163, the whole filter 1150 slides across the IFM 1140. All the input channels are combined to produce an output tensor 1160 (also referred to as output feature map (OFM) 1160). The OFM 1160 is represented by a 5×5 2D matrix. The 5×5 2D matrix includes 5 output elements (also referred to as output points) in each row and 5 output elements in each column. For purpose of illustration, the standard convolution includes one filter in the embodiments of FIG. 11. In embodiments where there are multiple filters, the standard convolution may produce multiple output channels in the OFM 1160.

The multiplication applied between a kernel-sized patch of the IFM 1140 and a kernel may be a dot product. A dot product is the elementwise multiplication between the kernel-sized patch of the IFM 1140 and the corresponding kernel, which is then summed, always resulting in a single value. Because it results in a single value, the operation is often referred to as the "scalar product." Using a kernel smaller than the IFM 1140 is intentional as it allows the same kernel (set of weights) to be multiplied by the IFM 1140 multiple times at different points on the IFM 1140. Specifically, the kernel is applied systematically to each overlapping part or kernel-sized patch of the IFM 1140, left to right, top to bottom. The result from multiplying the kernel with the IFM 1140 one time is a single value. As the kernel is applied multiple times to the IFM 1140, the multiplication result is a 2D matrix of output elements. As such, the 2D output matrix (i.e., the OFM 1160) from the standard convolution 1163 is referred to as an OFM.

In the depthwise convolution 1183, the input channels are not combined. Rather, MAC operations are performed on an individual input channel and an individual kernel and produce an output channel. As shown in FIG. 11, the depthwise convolution 1183 produces a depthwise output tensor 1180. The depthwise output tensor 1180 is represented by a 5×5×3 3D matrix. The depthwise output tensor 1180 includes 3 output channels, each of which is represented by a 5×5 2D matrix. The 5×5 2D matrix includes 5 output elements in each row and 5 output elements in each column. Each output channel is a result of MAC operations of an input channel of the IFM 1140 and a kernel of the filter 1150. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 1193 is then performed on the depthwise output tensor 1180 and a 11×1×3 tensor 1190 to produce the OFM 1160.

The OFM 1160 is then passed to the next layer in the sequence. In some embodiments, the OFM 1160 is passed through an activation function. An example activation function is the rectified linear activation function (ReLU). ReLU is a calculation that returns the value provided as input directly, or the value zero if the input is zero or less. The convolutional layer 1110 may receive several images as input and calculate the convolution of each of them with each of the kernels. This process can be repeated several times. For instance, the OFM 1160 is passed to the subsequent convolutional layer 1110 (i.e., the convolutional layer 1110 following the convolutional layer 1110 generating the OFM 1160 in the sequence). The subsequent convolutional layers 1110 performs a convolution on the OFM 1160 with new kernels and generates a new feature map. The new feature map may also be normalized and resized. The new feature map can be kernelled again by a further subsequent convolutional layer 1110, and so on.

In some embodiments, a convolutional layer 1110 has 4 hyperparameters: the number of kernels, the size F kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 1110). The convolutional layers 1110 may perform various types of convolutions, such as 2-dimensional convolution, dilated or atrous convolution, spatial separable convolution, depthwise separable convolution, transposed convolution, and so on. The DNN 1100 includes 116 convolutional layers 1110. In other embodiments, the DNN 1100 may include a different number of convolutional layers.

The pooling layers 1120 down-sample feature maps generated by the convolutional layers, e.g., by summarizing the presence of features in the patches of the feature maps. A pooling layer 1120 is placed between 2 convolution layers 1110: a preceding convolutional layer 1110 (the convolution layer 1110 preceding the pooling layer 1120 in the sequence of layers) and a subsequent convolutional layer 1110 (the convolution layer 1110 subsequent to the pooling layer 1120 in the sequence of layers). In some embodiments, a pooling layer 1120 is added after a convolutional layer 1110, e.g., after an activation function (e.g., ReLU) has been applied to the OFM 1160.

A pooling layer 1120 receives feature maps generated by the preceding convolution layer 1110 and applies a pooling operation to the feature maps. The pooling operation reduces the size of the feature maps while preserving their important characteristics. Accordingly, the pooling operation improves the efficiency of the DNN and avoids over-learning. The pooling layers 1120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 1120 applied to a feature map of 6×6 results in an output pooled feature map of 3×3. The output of the pooling layer 1120 is inputted into the subsequent convolution layer 1110 for further feature extraction. In some embodiments, the pooling layer 1120 operates upon each feature map separately to create a new set of the same number of pooled feature maps.

The fully connected layers 1130 are the last layers of the DNN. The fully connected layers 1130 may be convolutional or not. The fully connected layers 1130 receive an input operand. The input operand defines the output of the convolutional layers 1110 and pooling layers 1120 and includes the values of the last feature map generated by the last pooling layer 1120 in the sequence. The fully connected layers 1130 apply a linear combination and an activation function to the input operand and generate a vector. The vector may contain as many elements as there are classes: element i represents the probability that the image belongs to class i. Each element is therefore between 0 and 11, and the sum of all is worth one. These probabilities are calculated by the last fully connected layer 1130 by using a logistic function (binary classification) or a softmax function (multi-class classification) as an activation function.

In some embodiments, the fully connected layers 1130 classify the input image 1105 and return an operand of size N, where N is the number of classes in the image classification problem. In the embodiments of FIG. 11, N equals 3, as there are 3 objects 1115, 1125, and 1135 in the input image. Each element of the operand indicates the probability for the input image 1105 to belong to a class. To calculate the probabilities, the fully connected layers 1130 multiply each input element by weight, make the sum, and then apply an activation function (e.g., logistic if N=2, softmax if N>2). This is equivalent to multiplying the input operand by the matrix containing the weights. In an example, the vector includes 3 probabilities: a first probability indicating the object 1115 being a tree, a second probability indicating the object 1125 being a car, and a third probability indicating the object 1135 being a person. In other embodiments where the input image 1105 includes different objects or a different number of objects, the individual values can be different.

Example MAC Array

Figure 12:
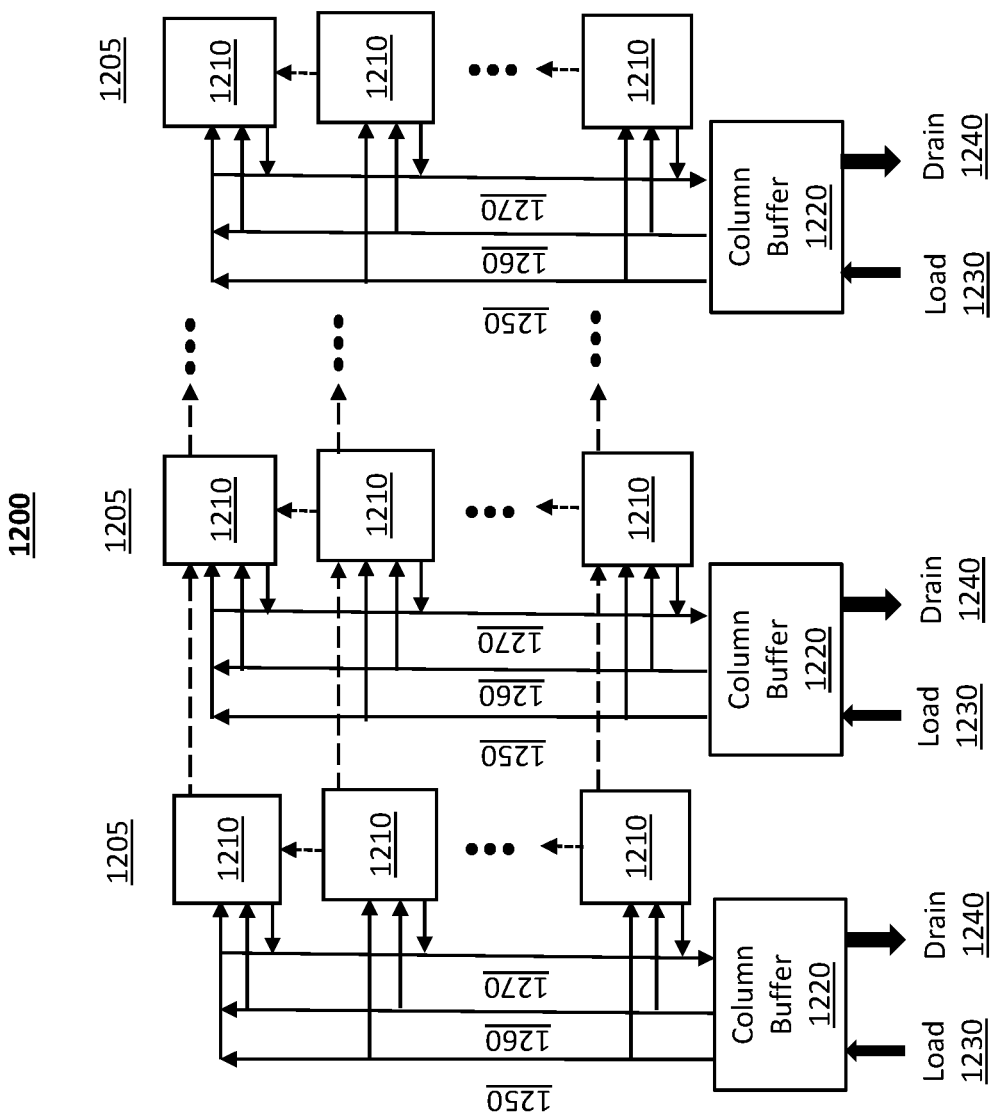
FIG. 12 illustrates an example compute array, in accordance with various embodiments.

FIG. 12 illustrates an example compute array 1200, in accordance with various embodiments. The compute array 1200 is an embodiment of the compute array 380 in FIG. 3. The compute array 1200 includes a plurality of compute units 1210 (individually referred to as "compute unit 1210"). The compute units 1210 perform MAC operations, such as integer MAC operations, floating-point MAC operations, and so on. The compute units 1210 may also be referred to as neurons or nodes in the DNN. Each compute unit 1210 has 2 input signals 1260 and 1260 and an output signal 1270. The input signal 1260 is at least a portion of an input tensor of a convolution. The input signal 1260 is at least a portion of a filter of the convolution. In some embodiments, the input signal 1260 of a compute unit 1210 includes one or more input operands, and the input signal 1260 includes one or more weight operands.

Each compute unit 1210 performs an MAC operation on the input signals 1260 and 1260 and outputs the output signal 1270, which is a result of the MAC operation. Some or all of the input signals 1260 and 1260 and the output signal 1270 may be in an integer format, such as INT8, or floating-point format, such as FP16 or BF16. For purpose of simplicity and illustration, the input signals and output signal of all the compute units 1210 have the same reference numbers, but the compute units 1210 may receive different input signals and output different output signals from each other. Also, a compute unit 1210 may be different from another compute unit 1210, e.g., including more, fewer, or different components. A compute unit 1210 may include one or more multipliers and one or more adders.

As shown in FIG. 12, the compute units 1210 are connected to each other, as indicated by the dash arrows in FIG. 12. The output signal 1270 of a compute unit 1210 may be sent to many other compute units 1210 (and possibly back to itself) as input signals via the interconnections between compute units 1210. In some embodiments, the output signal 1270 of a compute unit 1210 may incorporate the output signals of one or more other compute units 1210 through an accumulate operation of the compute unit 1210 and generate an internal partial sum of the compute array. Certain aspects of the compute units 1210 are described below in conjunction with FIG. 5.

In the embodiments of FIG. 12, the compute units 1210 are arranged into columns 1205 (individually referred to as "column 1205" or "compute column 1205"). The input and weights of the layer may be distributed to the compute units 1210 based on the columns 1205. Each column 1205 has a column buffer 1220. The column buffer 1220 stores data provided to the compute units 1210 in the column 1205 for a short amount of time. The column buffer 1220 may also store data output by the last compute unit 1210 in the column 1205. The output of the last compute unit 1210 may be a sum of the MAC operations of all the compute units 1210 in the column 1205, which is a column-level internal partial sum of the compute array 1200. In other embodiments, input and weights may be distributed to the compute units 1210 based on rows in the compute array 1200. The compute array 1200 may include row buffers in lieu of column buffers 1220. A row buffer may store input signals of the MACs in the corresponding row and may also store a row-level internal partial sum of the compute array 1200.

As shown in FIG. 12, each column buffer 1220 is associated with a load 1230 and a drain 1240. The data provided to the column 1205 is transmitted to the column buffer 1220 through the load 1230, e.g., through upper memory hierarchies, e.g., a memory external to the compute tile. The data generated by the column 1205 is extracted from the column buffers 1220 through the drain 1240. In some embodiments, data extracted from a column buffer 1220 is sent to upper memory hierarchies, e.g., a memory external to the compute tile, through the drain operation. In some embodiments, the drain operation does not start until all the compute units 1210 in the column 1205 have finished their MAC operations.

Example DNN System

Figure 13:
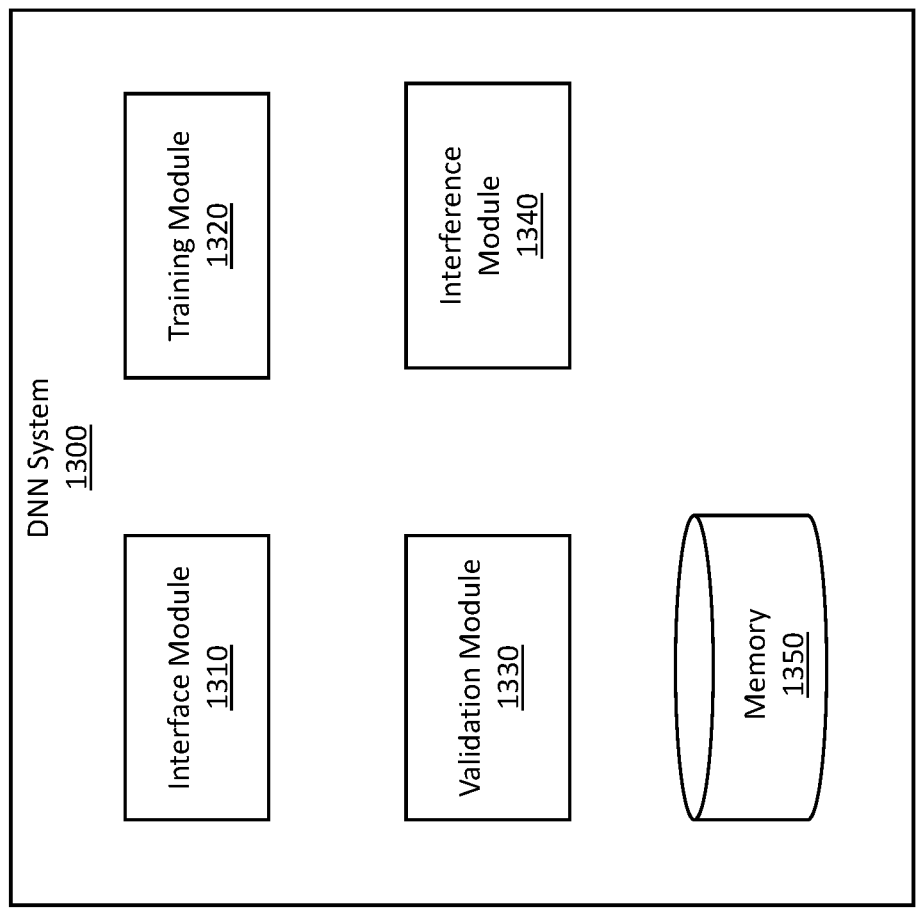
FIG. 13 is a block diagram of a DNN system, in accordance with various embodiments.

FIG. 13 is a block diagram of an example DNN system 1300, in accordance with various embodiments. The whole DNN system 1300 or a part of the DNN system 1300 may be implemented in the computing device 1400 in FIG. 14. The DNN system 1300 trains DNNs for various tasks, such as image classification, learning relationships between biological cells (e.g., DNA, proteins, etc.), control behaviors for devices (e.g., robots, machines, etc.), and so on. The DNN system 1300 includes an interface module 1310, a training module 1320, a validation module 1330, an inference module 1340, and a memory 1350. In other embodiments, alternative configurations, different or additional components may be included in the DNN system 1300. Further, functionality attributed to a component of the DNN system 1300 may be accomplished by a different component included in the DNN system 1300 or a different system. The DNN system 1300 or a component of the DNN system 1300 (e.g., the training module 1320 or inference module 1340) may include the computing device 2300.

The interface module 1310 facilitates communications of the DNN system 1300 with other systems. For example, the interface module 1310 establishes communications between the DNN system 1300 with an external database to receive data that can be used to train DNNs or input into DNNs to perform tasks. As another example, the interface module 1310 supports the DNN system 1300 to distribute DNNs to other systems, e.g., computing devices configured to apply DNNs to perform tasks.

The training module 1320 trains DNNs by using a training dataset. The training module 1320 forms the training dataset. In an embodiment where the training module 1320 trains an DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 1330 to validate performance of a trained DNN. The portion of the training dataset not including the tuning subset and the validation subset may be used to train the DNN.

The training module 1320 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 13, 130, 500, 1300, or even larger.

The training module 1320 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include 3 channels). A pooling layer is used to reduce the spatial volume of input image after convolution. It is used between 2 convolution layers. A fully connected layer involves weights, biases, and neurons. It connects neurons in one layer to neurons in another layer. It is used to classify images between different category by training.

In the process of defining the architecture of the DNN, the training module 1320 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 1320 defines the architecture of the DNN, the training module 1320 inputs a training dataset into the DNN. The training dataset includes a plurality of training samples. An example of a training sample includes an object in an image and a ground-truth label of the object. The training module 1320 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 1320 uses a cost function to minimize the error.

The training module 1320 may train the DNN for a predetermined number of epochs. The number of epochs is a hyperparameter that defines the number of times that the deep learning algorithm will work through the entire training dataset. One epoch means that each sample in the training dataset has had an opportunity to update internal parameters of the DNN. After the training module 1320 finishes the predetermined number of epochs, the training module 1320 may stop updating the parameters in the DNN. The DNN having the updated parameters is referred to as a trained DNN.

The validation module 1330 verifies accuracy of trained DNNs. In some embodiments, the validation module 1330 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1330 may determine an accuracy score measuring the precision, recall, or a combination of precision and recall of the DNN. The validation module 1330 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1330 may compare the accuracy score with a threshold score. In an example where the validation module 1330 determines that the accuracy score of the augmented model is lower than the threshold score, the validation module 1330 instructs the training module 1320 to re-train the DNN. In one embodiment, the training module 1320 may iteratively re-train the DNN until the occurrence of a stopping condition, such as the accuracy measurement indication that the DNN may be sufficiently accurate, or a number of training rounds having taken place.

The inference module 1340 applies the trained or validated DNN to perform tasks. For instance, the inference module 1340 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 1340 distributes the DNN to other systems, e.g., computing devices in communication with the DNN system 1300, for the other systems to apply the DNN to perform the tasks.

The memory 1350 stores data received, generated, used, or otherwise associated with the DNN system 1300. For example, the memory 1350 stores the datasets used by the training module 1320 and validation module 1330. The memory 1350 may also store data generated by the training module 1320 and validation module 1330, such as the hyperparameters for training DNNs, internal parameters of trained DNNs (e.g., values of tunable parameters of activation functions, such as Fractional Adaptive Linear Units (FALUs)), etc. In the embodiment of FIG. 13, the memory 1350 is a component of the DNN system 1300. In other embodiments, the memory 1350 may be external to the DNN system 1300 and communicate with the DNN system 1300 through a network.

Example Computing Device

Figure 14:
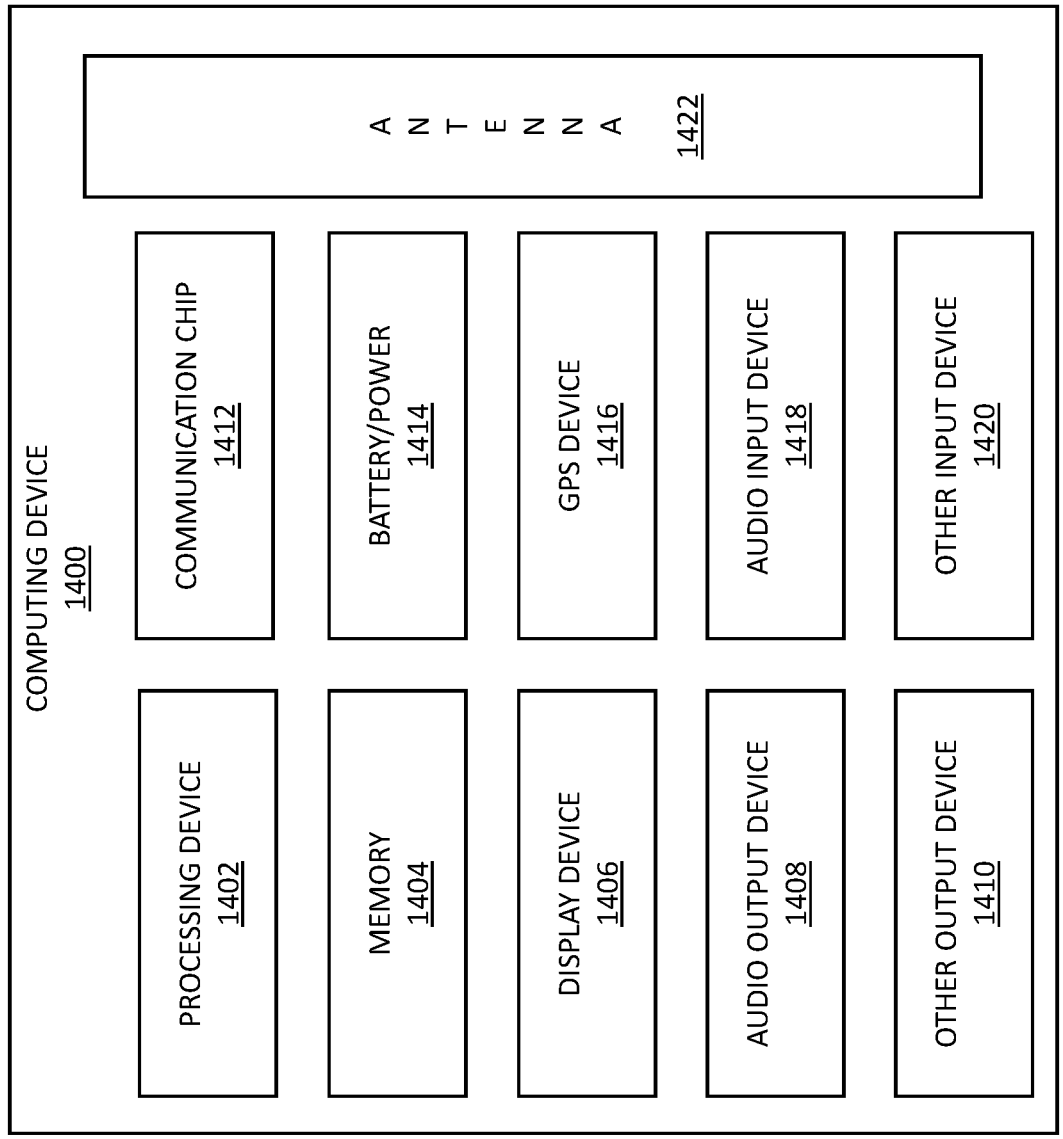
FIG. 14 is a block diagram of an example computing device, in accordance with various embodiments.

FIG. 14 is a block diagram of an example computing device 1400, in accordance with various embodiments. In some embodiments, the computing device 1400 may be used as at least part of the DNN system 1300 in FIG. 13. A number of components are illustrated in FIG. 14 as included in the computing device 1400, but any one or more of these components may be omitted or duplicated, as suitable for the application. In some embodiments, some or all of the components included in the computing device 1400 may be attached to one or more motherboards. In some embodiments, some or all of these components are fabricated onto a single system on a chip (SoC) die. Additionally, in various embodiments, the computing device 1400 may not include one or more of the components illustrated in FIG. 14, but the computing device 1400 may include interface circuitry for coupling to the one or more components. For example, the computing device 1400 may not include a display device 1406, but may include display device interface circuitry (e.g., a connector and driver circuitry) to which a display device 1406 may be coupled. In another set of examples, the computing device 1400 may not include an audio input device 1418 or an audio output device 1408, but may include audio input or output device interface circuitry (e.g., connectors and supporting circuitry) to which an audio input device 1418 or audio output device 1408 may be coupled.

The computing device 1400 may include a processing device 1402 (e.g., one or more processing devices). The processing device 1402 processes electronic data from registers and/or memory to transform that electronic data into other electronic data that may be stored in registers and/or memory. The computing device 1400 may include a memory 1404, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1404 may include memory that shares a die with the processing device 1402. In some embodiments, the memory 1404 includes one or more non-transitory computer-readable media storing instructions executable to perform in-network computing, e.g., the method 1000 described above in conjunction with FIG. 10, or some operations performed by the switch 120 described above in conjunction with FIGS. 1 and 2. The instructions stored in the one or more non-transitory computer-readable media may be executed by the processing device 1402.

In some embodiments, the computing device 1400 may include a communication chip 1412 (e.g., one or more communication chips). For example, the communication chip 1412 may be configured for managing wireless communications for the transfer of data to and from the computing device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1412 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1412 may operate in accordance with code-division multiple access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1412 may operate in accordance with other wireless protocols in other embodiments. The computing device 1400 may include an antenna 1422 to facilitate wireless communications and/or to receive other wireless communications (such as AM or FM radio transmissions).

In some embodiments, the communication chip 1412 may manage wired communications, such as electrical, optical, or any other suitable communication protocols (e.g., the Ethernet). As noted above, the communication chip 1412 may include multiple communication chips. For instance, a first communication chip 1412 may be dedicated to shorter-range wireless communications such as Wi-Fi or Bluetooth, and a second communication chip 1412 may be dedicated to longer-range wireless communications such as global positioning system (GPS), EDGE, GPRS, CDMA, WiMAX, LTE, EV-DO, or others. In some embodiments, a first communication chip 1412 may be dedicated to wireless communications, and a second communication chip 1412 may be dedicated to wired communications.

The computing device 1400 may include battery/power circuitry 1414. The battery/power circuitry 1414 may include one or more energy storage devices (e.g., batteries or capacitors) and/or circuitry for coupling components of the computing device 1400 to an energy source separate from the computing device 1400 (e.g., AC line power).

The computing device 1400 may include a display device 1406 (or corresponding interface circuitry, as discussed above). The display device 1406 may include any visual indicators, such as a heads-up display, a computer monitor, a projector, a touchscreen display, a liquid crystal display (LCD), a light-emitting diode display, or a flat panel display, for example.

The computing device 1400 may include an audio output device 1408 (or corresponding interface circuitry, as discussed above). The audio output device 1408 may include any device that generates an audible indicator, such as speakers, headsets, or earbuds, for example.

The computing device 1400 may include an audio input device 1418 (or corresponding interface circuitry, as discussed above). The audio input device 1418 may include any device that generates a signal representative of a sound, such as microphones, microphone arrays, or digital instruments (e.g., instruments having a musical instrument digital interface (MIDI) output).

The computing device 1400 may include a GPS device 1416 (or corresponding interface circuitry, as discussed above). The GPS device 1416 may be in communication with a satellite-based system and may receive a location of the computing device 1400, as known in the art.

The computing device 1400 may include another output device 1410 (or corresponding interface circuitry, as discussed above). Examples of the other output device 1410 may include an audio codec, a video codec, a printer, a wired or wireless transmitter for providing information to other devices, or an additional storage device.

The computing device 1400 may include another input device 1420 (or corresponding interface circuitry, as discussed above). Examples of the other input device 1420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1400 may have any desired form factor, such as a handheld or mobile computer system (e.g., a cell phone, a smart phone, a mobile internet device, a music player, a tablet computer, a laptop computer, a netbook computer, an ultrabook computer, a PDA (personal digital assistant), an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1400 may be any other electronic device that processes data.

SELECT EXAMPLES

The following paragraphs provide various examples of the embodiments disclosed herein.

Example 1 provides a method for in-network computing, including receiving, by a switch coupled to a group of compute blocks and to a target compute block, a first data packet from a first compute block in the group of compute blocks; receiving, by the switch, a second data packet from a second compute block in the group of compute blocks; storing, by the switch, the first data packet and the second data packet in one or more buffers associated with the switch; after storing the first data packet and the second data packet in the one or more buffers, receiving, by the switch, a third data packet from a third compute block in the group of compute blocks; determining, by the switch, whether the one or more buffers have sufficient storage to store the third data packet; and in response to determining that the one or more buffers do not have sufficient storage to store the third data packet, forming, by the switch, a new data packet by aggregating the first data packet and the second data packet stored in the one or more buffers.

Example 2 provides the method of example 1, further including in response to determining that the one or more buffers have sufficient storage to store the third data packet: storing the third data packet in the one or more buffers, and aggregating the first data packet, the second data packet, and the third data packet stored in the one or more buffers.

Example 3 provides the method of example 1 or 2, further including in response to determining that the one or more buffers have sufficient storage to store the third data packet, determining whether the third data packet is a last data packet for the group of compute blocks; and in response to determining that the third data packet is the last data packet, forming an aggregated data packet for the group of compute blocks.

Example 4 provides the method of example 3, where determining whether the third data packet is the last data packet includes determining whether all bits in a collective sequence for the group of compute blocks are set, wherein the collective sequence comprising a plurality of bits, each of which corresponding to a respective compute block in the group of compute blocks and is set after a data packet is received from the respective compute block.

Example 5 provides the method of any of the preceding examples, further including maintaining, by the switch, a collective sequence that comprises a plurality of bits, each of which corresponding to a respective compute block in the group of compute blocks; and after receiving the first data packet or the second data packet, setting, by the switch, a bit in the collective sequence based on a determination that a CSN in the first data packet or the second data packet matches a CSN of the collective sequence and that the bit corresponds to the first compute block or the second compute block.

Example 6 provides the method of example 5, where the CSN in the first data packet or the second data packet is in a header of the first data packet or the second data packet; the header further includes a field identifying the first compute block or the second compute block; and the method further comprises after forming the new data packet, updating the field in the header.

Example 7 provides the method of example 5 or 6, where the switch is coupled to another group of compute blocks, and the method further includes maintaining, by the switch, another collective sequence that comprises another plurality of bits, each of which corresponding to a respective compute block in the another group of compute blocks.

Example 8 provides the method of any of the preceding examples, further including maintaining, by the switch, a collective sequence that comprises a plurality of bits, each of which corresponding to a respective compute block in the group of compute blocks; receiving, by the switch, a data packet; determining, by the switch, whether a CSN in the data packet is lower than a CSN of the collective sequence; and in response to determining that the CSN in the data packet is lower than the CSN of the collective sequence, transmitting, by the switch, the data packet to the target compute block or to another switch coupled to the switch, wherein the data packet is not aggregated with any other data packet before it is transmitted to the target compute block or to the another switch.

Example 9 provides the method of any of the preceding examples, further including maintaining, by the switch, a collective sequence comprising a number of bits, each of which corresponding to a respective compute block in the group of compute blocks; receiving, by the switch, a data packet; determining, by the switch, whether a CSN in the data packet is greater than a CSN of the collective sequence; and in response to determining that the CSN in the data packet is greater than the CSN of the collective sequence, disregarding, by the switch, the data packet.

Example 10 provides the method of any of the preceding examples, further including maintaining, by the switch, a collective sequence that comprises a plurality of bits, each of which corresponding to a respective compute block in the group of compute blocks; receiving, by the switch from a compute block in the group of compute blocks, a data packet; determining, by the switch, whether a bit in the collective sequence has been set, the bit corresponding to the compute block; in response to determining that the bit has been set, determining whether the data packet is stored in the one or more buffers; and in response to determining that the data packet is not stored in the one or more buffers, transmitting, by the switch, the data packet to the target compute block or to another switch coupled to the switch.

Example 11 provides one or more non-transitory computer-readable media storing instructions executable to perform operations for in-network computing, the operations including receiving, by a switch coupled to a group of compute blocks and to a target compute block, a first data packet from a first compute block in the group of compute blocks; receiving, by the switch, a second data packet from a second compute block in the group of compute blocks; storing, by the switch, the first data packet and the second data packet in one or more buffers associated with the switch; after storing the first data packet and the second data packet in the one or more buffers, receiving, by the switch, a third data packet from a third compute block in the group of compute blocks; determining, by the switch, whether the one or more buffers have sufficient storage to store the third data packet; and in response to determining that the one or more buffers do not have sufficient storage to store the third data packet, forming, by the switch, a new data packet by aggregating the first data packet and the second data packet stored in the one or more buffers.

Example 12 provides the one or more non-transitory computer-readable media of example 11, where the operations further include in response to determining that the one or more buffers have sufficient storage to store the third data packet: storing the third data packet in the one or more buffers, and aggregating the first data packet, the second data packet, and the third data packet stored in the one or more buffers.

Example 13 provides the one or more non-transitory computer-readable media of example 11 or 12, where the operations further include in response to determining that the one or more buffers have sufficient storage to store the third data packet, determining whether the third data packet is a last data packet for the group of compute blocks; and in response to determining that the third data packet is the last data packet, forming an aggregated data packet for the group of compute blocks.

Example 14 provides the one or more non-transitory computer-readable media of example 13, where determining whether the third data packet is the last data packet includes determining whether all bits in a collective sequence for the group of compute blocks are set, wherein the collective sequence comprising a plurality of bits, each of which corresponding to a respective compute block in the group of compute blocks and is set after a data packet is received from the respective compute block.

Example 15 provides the one or more non-transitory computer-readable media of any one of examples 11-14, where the operations further include maintaining, by the switch, a collective sequence that comprises a plurality of bits, each of which corresponding to a respective compute block in the group of compute blocks; and after receiving the first data packet or the second data packet, setting, by the switch, a bit in the collective sequence based on a determination that a CSN in the first data packet or the second data packet matches a CSN of the collective sequence and that the bit corresponds to the first compute block or the second compute block.

Example 16 provides the one or more non-transitory computer-readable media of example 15, where the CSN in the first data packet or the second data packet is in a header of the first data packet or the second data packet; the header further includes a field identifying the first compute block or the second compute block; and the method further comprises after forming the new data packet, updating the field in the header.

Example 17 provides the one or more non-transitory computer-readable media of example 15 or 16, where the switch is coupled to another group of compute blocks, and the operations further includes maintaining, by the switch, another collective sequence that comprises another plurality of bits, each of which corresponding to a respective compute block in the another group of compute blocks.

Example 18 provides the one or more non-transitory computer-readable media of any one of examples 11-17, where the operations further include maintaining, by the switch, a collective sequence that comprises a plurality of bits, each of which corresponding to a respective compute block in the group of compute blocks; receiving, by the switch, a data packet; determining, by the switch, whether a CSN in the data packet is lower than a CSN of the collective sequence; and in response to determining that the CSN in the data packet is lower than the CSN of the collective sequence, transmitting, by the switch, the data packet to the target compute block or to another switch coupled to the switch, wherein the data packet is not aggregated with any other data packet before it is transmitted to the target compute block or to the another switch.

Example 19 provides the one or more non-transitory computer-readable media of any one of examples 11-18, where the operations further include maintaining, by the switch, a collective sequence comprising a number of bits, each of which corresponding to a respective compute block in the group of compute blocks; receiving, by the switch, a data packet; determining, by the switch, whether a CSN in the data packet is greater than a CSN of the collective sequence; and in response to determining that the CSN in the data packet is greater than the CSN of the collective sequence, disregarding, by the switch, the data packet.

Example 20 provides the one or more non-transitory computer-readable media of any one of examples 11-19, where the operations further include, further including maintaining, by the switch, a collective sequence that comprises a plurality of bits, each of which corresponding to a respective compute block in the group of compute blocks; receiving, by the switch from a compute block in the group of compute blocks, a data packet; determining, by the switch, whether a bit in the collective sequence has been set, the bit corresponding to the compute block; in response to determining that the bit has been set, determining whether the data packet is stored in the one or more buffers; and in response to determining that the data packet is not stored in the one or more buffers, transmitting, by the switch, the data packet to the target compute block or to another switch coupled to the switch.

Example 21 provides an apparatus, including a computer processor for executing computer program instructions; and a non-transitory computer-readable memory storing computer program instructions executable by the computer processor to perform operations including receiving, by a switch coupled to a group of compute blocks and to a target compute block, a first data packet from a first compute block in the group of compute blocks, receiving, by the switch, a second data packet from a second compute block in the group of compute blocks, storing, by the switch, the first data packet and the second data packet in one or more buffers associated with the switch, after storing the first data packet and the second data packet in the one or more buffers, receiving, by the switch, a third data packet from a third compute block in the group of compute blocks, determining, by the switch, whether the one or more buffers have sufficient storage to store the third data packet, and in response to determining that the one or more buffers do not have sufficient storage to store the third data packet, forming, by the switch, a new data packet by aggregating the first data packet and the second data packet stored in the one or more buffers.

Example 22 provides the apparatus of example 21, where the operations further include in response to determining that the one or more buffers have sufficient storage to store the third data packet: storing the third data packet in the one or more buffers, and aggregating the first data packet, the second data packet, and the third data packet stored in the one or more buffers.

Example 23 provides the apparatus of example 21 or 22, where the operations further include in response to determining that the one or more buffers have sufficient storage to store the third data packet, determining whether the third data packet is a last data packet for the group of compute blocks; and in response to determining that the third data packet is the last data packet, forming an aggregated data packet for the group of compute blocks.

Example 24 provides the apparatus of any one of examples 21-23, where the operations further include maintaining, by the switch, a collective sequence that comprises a plurality of bits, each of which corresponding to a respective compute block in the group of compute blocks; and after receiving the first data packet or the second data packet, setting, by the switch, a bit in the collective sequence based on a determination that a CSN in the first data packet or the second data packet matches a CSN of the collective sequence and that the bit corresponds to the first compute block or the second compute block.

Example 25 provides the apparatus of any one of examples 21-24, where the operations further include maintaining, by the switch, a collective sequence that comprises a plurality of bits, each of which corresponding to a respective compute block in the group of compute blocks; receiving, by the switch, a data packet; determining, by the switch, whether a CSN in the data packet is lower than a CSN of the collective sequence; and in response to determining that the CSN in the data packet is lower than the CSN of the collective sequence, transmitting, by the switch, the data packet to the target compute block or to another switch coupled to the switch, wherein the data packet is not aggregated with any other data packet before it is transmitted to the target compute block or to the another switch.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method for in-network computing, comprising:
   receiving, by a switch coupled to a group of compute blocks and to a target compute block, a first data packet from a first compute block in the group of compute blocks;
   receiving, by the switch, a second data packet from a second compute block in the group of compute blocks;
   storing, by the switch, the first data packet and the second data packet in one or more buffers associated with the switch;
   after storing the first data packet and the second data packet in the one or more buffers, receiving, by the switch, a third data packet from a third compute block in the group of compute blocks;
   determining, by the switch, whether the one or more buffers have sufficient storage to store the third data packet;
   in response to determining that the one or more buffers do not have sufficient storage to store the third data packet, forming, by the switch, a new data packet by aggregating the first data packet and the second data packet stored in the one or more buffers;
   maintaining, by the switch, a collective sequence comprising a number of bits, each of which corresponding to a respective compute block in the group of compute blocks;
   determining, by the switch, whether a collective sequence number in a fourth data packet is greater than a collective sequence number of the collective sequence; and
   in response to determining that the collective sequence number in the fourth data packet is greater than the collective sequence number of the collective sequence, disregarding, by the switch, the fourth data packet.

2. The method of claim 1, further comprising:
   in response to determining that the one or more buffers have sufficient storage to store the third data packet:
      storing the third data packet in the one or more buffers, and
      aggregating the first data packet, the second data packet, and the third data packet stored in the one or more buffers.

3. The method of claim 1, further comprising:
   in response to determining that the one or more buffers have sufficient storage to store the third data packet, determining whether the third data packet is a last data packet for the group of compute blocks; and
   in response to determining that the third data packet is the last data packet, forming an aggregated data packet for the group of compute blocks.

4. The method of claim 3, wherein determining whether the third data packet is the last data packet comprises:
   determining whether all bits in a collective sequence for the group of compute blocks are set, wherein the collective sequence comprising a plurality of bits, each of which corresponding to a respective compute block in the group of compute blocks and is set after a data packet is received from the respective compute block.

5. The method of claim 1, further comprising:
   maintaining, by the switch, a collective sequence that comprises a plurality of bits, each of which corresponding to a respective compute block in the group of compute blocks; and
   after receiving the first data packet or the second data packet, setting, by the switch, a bit in the collective sequence based on a determination that a collective sequence number in the first data packet or the second data packet matches a collective sequence number of the collective sequence and that the bit corresponds to the first compute block or the second compute block.

6. The method of claim 5, wherein:
   the collective sequence number in the first data packet or the second data packet is in a header of the first data packet or the second data packet;
   the header further includes a field identifying the first compute block or the second compute block; and
   the method further comprises after forming the new data packet, updating the field in the header.

7. The method of claim 5, wherein the switch is coupled to another group of compute blocks, and the method further comprises:
   maintaining, by the switch, another collective sequence that comprises another plurality of bits, each of which corresponding to a respective compute block in the another group of compute blocks.

8. The method of claim 1, further comprising:
   maintaining, by the switch, a collective sequence that comprises a plurality of bits, each of which corresponding to a respective compute block in the group of compute blocks;
   receiving, by the switch, a data packet;
   determining, by the switch, whether a collective sequence number in the data packet is lower than a collective sequence number of the collective sequence; and
   in response to determining that the collective sequence number in the data packet is lower than the collective sequence number of the collective sequence, transmitting, by the switch, the data packet to the target compute block or to another switch coupled to the switch,
   wherein the data packet is not aggregated with any other data packet before it is transmitted to the target compute block or to the another switch.

9. The method of claim 1, further comprising:
   maintaining, by the switch, a collective sequence that comprises a plurality of bits, each of which corresponding to a respective compute block in the group of compute blocks;
   receiving, by the switch from a compute block in the group of compute blocks, a data packet;
   determining, by the switch, whether a bit in the collective sequence has been set, the bit corresponding to the compute block;
   in response to determining that the bit has been set, determining whether the data packet is stored in the one or more buffers; and
   in response to determining that the data packet is not stored in the one or more buffers, transmitting, by the switch, the data packet to the target compute block or to another switch coupled to the switch.

10. One or more non-transitory computer-readable media storing instructions executable by one or more computer processors to perform operations for in-network computing, the operations comprising:
  receiving, by a switch coupled to a group of compute blocks and to a target compute block, a first data packet from a first compute block in the group of compute blocks;
  receiving, by the switch, a second data packet from a second compute block in the group of compute blocks;
  storing, by the switch, the first data packet and the second data packet in one or more buffers associated with the switch;
  after storing the first data packet and the second data packet in the one or more buffers, receiving, by the switch, a third data packet from a third compute block in the group of compute blocks;
  determining, by the switch, whether the one or more buffers have sufficient storage to store the third data packet;
  in response to determining that the one or more buffers do not have sufficient storage to store the third data packet, forming, by the switch, a new data packet by aggregating the first data packet and the second data packet stored in the one or more buffers;
  maintaining, by the switch, a collective sequence comprising a number of bits, each of which corresponding to a respective compute block in the group of compute blocks;
  determining, by the switch, whether a collective sequence number in a fourth data packet is greater than a collective sequence number of the collective sequence; and
  in response to determining that the collective sequence number in the fourth data packet is greater than the collective sequence number of the collective sequence, disregarding, by the switch, the fourth data packet.

11. The one or more non-transitory computer-readable media of claim 10, wherein the operations further comprise:
  in response to determining that the one or more buffers have sufficient storage to store the third data packet:
    storing the third data packet in the one or more buffers; and
    aggregating the first data packet, the second data packet, and the third data packet stored in the one or more buffers.

12. The one or more non-transitory computer-readable media of claim 10, wherein the operations further comprise:
  in response to determining that the one or more buffers have sufficient storage to store the third data packet, determining whether the third data packet is a last data packet for the group of compute blocks; and
  in response to determining that the third data packet is the last data packet, forming an aggregated data packet for the group of compute blocks.

13. The one or more non-transitory computer-readable media of claim 12, wherein determining whether the third data packet is the last data packet comprises:
  determining whether all bits in a collective sequence for the group of compute blocks are set, wherein the collective sequence comprising a plurality of bits, each of which corresponding to a respective compute block in the group of compute blocks and is set after a data packet is received from the respective compute block.

14. The one or more non-transitory computer-readable media of claim 10, wherein the operations further comprise:
  maintaining, by the switch, a collective sequence that comprises a plurality of bits, each of which corresponding to a respective compute block in the group of compute blocks; and
  after receiving the first data packet or the second data packet, setting, by the switch, a bit in the collective sequence based on a determination that a collective sequence number in the first data packet or the second data packet matches a collective sequence number of the collective sequence and that the bit corresponds to the first compute block or the second compute block.

15. The one or more non-transitory computer-readable media of claim 14, wherein:
  the collective sequence number in the first data packet or the second data packet is in a header of the first data packet or the second data packet;
  the header further includes a field identifying the first compute block or the second compute block; and
  the method further comprises after forming the new data packet, updating the field in the header.

16. The one or more non-transitory computer-readable media of claim 14, wherein the switch is coupled to another group of compute blocks, and the operations further comprise:
  maintaining, by the switch, another collective sequence that comprises another plurality of bits, each of which corresponding to a respective compute block in the another group of compute blocks.

17. The one or more non-transitory computer-readable media of claim 10, wherein the operations further comprise:
  maintaining, by the switch, a collective sequence that comprises a plurality of bits, each of which corresponding to a respective compute block in the group of compute blocks;
  receiving, by the switch, a data packet;
  determining, by the switch, whether a collective sequence number in the data packet is lower than a collective sequence number of the collective sequence; and
  in response to determining that the collective sequence number in the data packet is lower than the collective sequence number of the collective sequence, transmitting, by the switch, the data packet to the target compute block or to another switch coupled to the switch,
  wherein the data packet is not aggregated with any other data packet before it is transmitted to the target compute block or to the another switch.

18. The one or more non-transitory computer-readable media of claim 10, wherein the operations further comprise, further comprising:
  maintaining, by the switch, a collective sequence that comprises a plurality of bits, each of which corresponding to a respective compute block in the group of compute blocks;
  receiving, by the switch from a compute block in the group of compute blocks, a data packet;
  determining, by the switch, whether a bit in the collective sequence has been set, the bit corresponding to the compute block;
  in response to determining that the bit has been set, determining whether the data packet is stored in the one or more buffers; and
  in response to determining that the data packet is not stored in the one or more buffers, transmitting, by the switch, the data packet to the target compute block or to another switch coupled to the switch.

19. An apparatus, comprising:
a computer processor for executing computer program instructions; and
a non-transitory computer-readable memory storing computer program instructions executable by the computer processor to perform operations comprising:
receiving, by a switch coupled to a group of compute blocks and to a target compute block, a first data packet from a first compute block in the group of compute blocks,
receiving, by the switch, a second data packet from a second compute block in the group of compute blocks,
storing, by the switch, the first data packet and the second data packet in one or more buffers associated with the switch,
after storing the first data packet and the second data packet in the one or more buffers, receiving, by the switch, a third data packet from a third compute block in the group of compute blocks,
determining, by the switch, whether the one or more buffers have sufficient storage to store the third data packet,
in response to determining that the one or more buffers do not have sufficient storage to store the third data packet, forming, by the switch, a new data packet by aggregating the first data packet and the second data packet stored in the one or more buffers,
maintaining, by the switch, a collective sequence comprising a number of bits, each of which corresponding to a respective compute block in the group of compute blocks,
determining, by the switch, whether a collective sequence number in a fourth data packet is greater than a collective sequence number of the collective sequence, and
in response to determining that the collective sequence number in the fourth data packet is greater than the collective sequence number of the collective sequence, disregarding, by the switch, the fourth data packet.

20. The apparatus of claim 19, wherein the operations further comprise:
in response to determining that the one or more buffers have sufficient storage to store the third data packet:
storing the third data packet in the one or more buffers, and
aggregating the first data packet, the second data packet, and the third data packet stored in the one or more buffers.

21. The apparatus of claim 19, wherein the operations further comprise:
in response to determining that the one or more buffers have sufficient storage to store the third data packet, determining whether the third data packet is a last data packet for the group of compute blocks; and
in response to determining that the third data packet is the last data packet, forming an aggregated data packet for the group of compute blocks.

22. The apparatus of claim 19, wherein the operations further comprise:
maintaining, by the switch, a collective sequence that comprises a plurality of bits, each of which corresponding to a respective compute block in the group of compute blocks; and
after receiving the first data packet or the second data packet, setting, by the switch, a bit in the collective sequence based on a determination that a collective sequence number in the first data packet or the second data packet matches a collective sequence number of the collective sequence and that the bit corresponds to the first compute block or the second compute block.

23. The apparatus of claim 19, wherein the operations further comprise:
maintaining, by the switch, a collective sequence that comprises a plurality of bits, each of which corresponding to a respective compute block in the group of compute blocks;
receiving, by the switch, a data packet;
determining, by the switch, whether a collective sequence number in the data packet is lower than a collective sequence number of the collective sequence; and
in response to determining that the collective sequence number in the data packet is lower than the collective sequence number of the collective sequence, transmitting, by the switch, the data packet to the target compute block or to another switch coupled to the switch,
wherein the data packet is not aggregated with any other data packet before it is transmitted to the target compute block or to the another switch.

* * * * *